US011732063B2

(12) United States Patent
Goryunov et al.

(10) Patent No.: US 11,732,063 B2
(45) Date of Patent: Aug. 22, 2023

(54) LEWIS BASE CATALYSTS AND METHODS THEREOF

(71) Applicant: ExxonMobil Chemical Patents Inc., Baytown, TX (US)

(72) Inventors: Georgy P. Goryunov, Moscow (RU); Mikhail I. Sharikov, Moscow (RU); Vladislav A. Popov, Moscow (RU); Dmitry V. Uborsky, Moscow (RU); Alexander Z. Voskoboynikov, Moscow (RU); John R. Hagadorn, Houston, TX (US); Jo Ann M. Canich, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 217 days.

(21) Appl. No.: 17/173,926

(22) Filed: Feb. 11, 2021

(65) Prior Publication Data

US 2021/0269559 A1    Sep. 2, 2021

Related U.S. Application Data

(60) Provisional application No. 62/980,814, filed on Feb. 24, 2020.

(51) Int. Cl.
*C08F 4/64*    (2006.01)
*C07F 7/00*    (2006.01)
*C08F 4/642*    (2006.01)
*C08F 210/16*    (2006.01)

(52) U.S. Cl.
CPC ........ *C08F 4/64151* (2013.01); *C08F 4/6428* (2013.01); *C08F 210/16* (2013.01); *C07F 7/003* (2013.01)

(58) Field of Classification Search
CPC .............................. C07F 7/003; C08F 4/64151
See application file for complete search history.

(56) References Cited

U.S. PATENT DOCUMENTS

| 7,030,256 B2 | 4/2006 | Boussie et al. ................ 556/54 |
| 8,592,615 B2 | 11/2013 | Kuhlman et al. ............... 556/51 |
| 10,150,821 B2 | 12/2018 | Hagadorn et al. .. C08F 4/62141 |

FOREIGN PATENT DOCUMENTS

| JP | 2015/199919 | 11/2015 | ............. C08F 10/00 |
| WO | WO2011/011040 | 1/2011 | ............. C08F 10/00 |
| WO | WO2018/005201 | 1/2018 | ................ C07F 7/00 |
| WO | WO2018/022249 | 2/2018 | ................ C07F 7/00 |
| WO | WO 2018/022249 A1 * | 2/2018 | ................ C07F 7/00 |

OTHER PUBLICATIONS

Despagnet-Ayoub, E. et al. (2013) "Group 4 Transition-Metal Complexes of an Aniline-Carbene-Phenol Ligand," *Organometallics*, v.32(19), pp. 2934-2938.
Baier, M. C. et al. (2014) "Post-Metallocenes in the Industrial Production of Poly-olefins," *Angew. Chem. Int. Ed.*, v.53, pp. 9722-9744.
CAS 1241906-25-1.
CAS 1821304-39-5.
Tole, T.; et al. (2018) "Synthesis and Application of the Transition Metal Complexes of α-Pyridinyl Alcohols, α-Bipyridinyl Alcohols, α,α'-Pyridinyl Diols and α,α'-Bipyridinyl Diols in Homogeneous Catalysis," *Molecules*, v.23, 60 pgs.

\* cited by examiner

*Primary Examiner* — Rip A Lee

(57) ABSTRACT

The present disclosure relates to Lewis base catalysts. Catalysts, catalyst systems, and processes of the present disclosure can provide high temperature ethylene polymerization, propylene polymerization, or copolymerization. In at least one embodiment, the catalyst compounds belong to a family of compounds comprising amido-phenolate-heterocyclic ligands coordinated to group 4 transition metals. The tridendate ligand may include a central neutral hetrocyclic donor group, an anionic phenolate donor, and an anionic amido donor. In some embodiments, the present disclosure provides a catalyst system comprising an activator and a catalyst of the present disclosure. In some embodiments, the present disclosure provides a polymerization process comprising a) contacting one or more olefin monomers with a catalyst system comprising: i) an activator and ii) a catalyst of the present disclosure.

29 Claims, No Drawings

LEWIS BASE CATALYSTS AND METHODS THEREOF

CROSS REFERENCE TO RELATED APPLICATIONS

This application claims the priority benefit of U.S. Provisional Application No. 62/980,814, filed Feb. 24, 2020, the disclosure of which is incorporated herein by reference.

FIELD

The present disclosure relates to Lewis base transition metal complexes, catalyst systems including Lewis base transition metal complexes, and polymerization processes to produce polyolefin polymers such as polyethylene based polymers and polypropylene based polymers.

BACKGROUND

Olefin polymerization catalysts are of great use in industry and polyolefins are widely used commercially because of their robust physical properties. Hence, there is interest in finding new catalyst systems that increase the marketing value of the catalyst and allow the production of new as well as currently offered polymers at greater efficiency and higher catalyst productivity at high reactor temperatures. The physical properties (such as transition temperature, viscosity, etc.) and mechanical properties (such as strength, stiffness, and toughness) depend on the molecular weight of the polymer and vary depending on the application.

Polyolefins with high molecular weight, such as high-molecular-weight polyethylene (HMWPE) or ultra-high-molecular-weight polyethylene (UHMWPE), generally have valuable mechanical properties. However, challenges remain for the development of highly active catalysts capable of operating at high reactor temperatures for the production of controllable molecular weight polyolefins.

Furthermore, melt temperature (Tm) of a polymer is indicative of crystallinity of the polymer. For example, a polymer having a high Tm value typically provides a harder and more thermally stable material as compared to a polymer having a lower Tm value. Thus, mechanical properties of the polymers can be tailored by the Tm of the polymer. In a semi-crystalline thermoplastic polymer, for example, the crystalline structure may contribute to strength properties of the material formed from the polymer (e.g., crystalline materials can be tough and hard, and may require high stresses in order to be broken). Furthermore, an increase in crystallinity can lead to an increase in density, stiffness, strength, toughness, specific gravity and elastic modulus, for example. Crystallinity may also affect the optical properties of materials formed from the polymer, which can be important for optical fiber production. However, examples of catalysts achieving the production of polymers having high melting points and glass transition temperatures are limited. Furthermore, production of high melting point polymers, such as polypropylenes in particular, using non-metallocene catalysts is typically difficult.

Additionally, pre-catalysts (neutral, unactivated complexes) should be thermally stable at and above ambient temperature, as they are often stored for weeks before being used. The performance of a given catalyst is closely influenced by the reaction conditions, such as the monomer concentrations and temperature. For instance, the solution process, which benefits from being run at temperatures above 100° C., or 120° C. is particularly challenging for catalyst development. At such high reactor temperatures, it is often difficult to maintain high catalyst activity which quite consistently declines with an increase of reactor temperature. With a wide range of polyolefin products desired, from high density polyethylene (HDPE) to elastomers (e.g., thermoplastic elastomers (TPE); ethylene-propylene-diene (EPDM)), many different catalyst systems may be needed, as it is unlikely that a single catalyst will be able to address all the needs for the production of these various polyolefin products. The strict set of requirements needed for the development and production of new polyolefin products makes the identification of suitable catalysts for a given product and production process a highly challenging endeavor.

There is a need for new and improved catalysts, catalyst systems, and processes for the polymerization of olefins in order to achieve polymer properties such as high melting points, high melt temperatures, while controlling the molecular weight of the polymer (such as high molecular weight). Furthermore, there is a need for catalysts, catalyst systems, and processes for the polymerization of olefins in order to provide polymers having desired melting points based on a facile tuning of the chemical structure of the catalyst (e.g., non-metallocene catalyst).

References of interest include: American Chemical Society (ACS), "The Scientific & Technical Information Network" (STN™) Registry Nos. 1821304-39-5 and 1241906-25-1; Japanese Patent JP2015/199919; U.S. Pat. No. 8,592,615; and Tole, T.; et al. (2018) "Synthesis and Application of the Transition Metal Complexes of α-Pyridinyl Alcohols, α-Bipyridinyl Alcohols, α,α'-Pyridinyl Diols and α,α'-Bipyridinyl Diols in Homogeneous Catalysis," *Molecules*, v.23(4), 60 pgs.

SUMMARY

The present disclosure relates to catalyst compounds represented by Formula (I):

wherein:
M is a group 3, 4, 5, or 6 metal;
each of $A^1$ and $A^2$ are independently selected from the group consisting of aryl, substituted aryl, heteroaryl group, and substituted heteroaryl group;
J comprises a heterocyclic Lewis base;
$E^1$ is selected from the group consisting of hydrocarbyl, substituted hydrocarbyl, silyl, and substituted silyl, wherein J and $E^1$ are optionally joined to form one or more hydrocarbyl rings, substituted hydrocarbyl rings, heterocyclic rings, or substituted heterocyclic rings;
each L is independently a Lewis base;
each X is independently an anionic ligand;
n is 1, 2 or 3;
m is 0, 1, or 2;
n+m is not greater than 4;
$R^1$ is selected from the group consisting of $C_1$-$C_{40}$ hydrocarbyl, substituted $C_1$-$C_{40}$ hydrocarbyl, a heteroatom-containing group, and substituted heteroatom-containing group;

any two L groups may be joined together to form a bidentate Lewis base;

an X group may be joined to an L group to form a monoanionic bidentate group; and any two X groups may be joined together to form a dianionic ligand group.

In at least one embodiment, the catalyst compounds belong to a family of compounds comprising amido-phenolate-heterocyclic ligands coordinated to group 4 transition metals. The tridendate ligand comprises a central neutral hetrocyclic donor group, an anionic phenolate donor, and an anionic amido donor.

In some embodiments, the present disclosure provides a catalyst system comprising an activator and a catalyst of the present disclosure.

In some embodiments, the present disclosure provides a polymerization process comprising a) contacting one or more olefin monomers with a catalyst system comprising: i) an activator and ii) a catalyst of the present disclosure.

In some embodiments, the present disclosure provides a polyolefin formed by a catalyst system and or method of the present disclosure.

In some embodiments, the present disclosure provides for a process for the production of an ethylene alpha-olefin copolymer comprising polymerizing ethylene and (optionally) at least one $C_3$-$C_{20}$ alpha-olefin by contacting the ethylene and (optionally) the at least one $C_3$-$C_{20}$ alpha-olefin with a catalyst system, preferably in at least one continuous stirred tank reactor or loop reactor.

In some embodiments, the present disclosure provides for a process for the production of a propylene alpha-olefin copolymer comprising polymerizing propylene and (optionally) at least one ethylene and/or (optionally) $C_4$-$C_{20}$ alpha-olefin by contacting the propylene and the at least one ethylene and/or at least one $C_4$-$C_{20}$ alpha-olefin with a catalyst system, preferably in at least one continuous stirred tank reactor or loop reactor.

In at least one embodiment, the catalyst compounds represented by Formula (I) feature one eight-membered and one five-membered metallocycle rings. The eight-membered metallocycle rings contain the atoms from the metal M, an oxygen atom (typically part of a group, such as phenolate), two atoms of the aryl or heteroaryl group $A^1$, two atoms of the aryl or heteroaryl $A^2$, and two atoms from the bridging Lewis base group J. The five-membered metallocycle ring contains the atoms from the metal M, a nitrogen, an atom from the hydrocarbyl or silyl group $E^1$, and two atoms from the bridging Lewis base group J.

In at least one embodiment, the catalyst compounds represented by Formula (I) feature one eight-membered and one five-membered metallocycle rings. The eight-membered metallocycle rings contain the atoms from the metal M, a phenolate oxygen, two atoms of the aryl or heteroaryl group $A^1$, two atoms of the aryl or heteroaryl $A^2$, and two atoms from the bridging Lewis base group J. The five-membered metallocycle ring contains the atoms from the metal M, a nitrogen, an atom from the hydrocarbyl or silyl group $E^1$, and two atoms from the bridging Lewis base group J.

DETAILED DESCRIPTION

The present disclosure relates to novel catalyst compounds and methods to polymerize olefins comprising contacting the novel catalyst compound with an activator and one or more monomers. The novel catalyst compounds include a Lewis base tridendate ligand which coordinates to a transition metal center, forming an eight-membered ring and a five-membered ring, catalyst systems including such catalyst compounds, and uses thereof. Catalyst compounds of the present disclosure can be a group 4 transition metal-containing compound having amido-phenolate-heterocyclic ligands and a Lewis base. In another class of embodiments, the present disclosure is directed to polymerization processes to produce polyolefin polymers from catalyst systems including one or more olefin polymerization catalysts, at least one activator, and an optional support. Polyolefin polymers can be polyethylene polymers or polypropylene polymers.

The Lewis base tridentate ligand is a class of tridentate ligands that may use heterocycles such as a pyridine group or a benzimidazole. These ligands coordinate to a transition metal in a "tridentate" fashion, which means that the ligand forms three different bonds to the metal center. A feature of the amido-phenolate-heterocyclic complexes, for example, is that the ligand binds in a tridentate fashion with the formation of an eight-membered and a five-membered metallocycle ring. This novel aspect creates asymmetry of the opposing sides of the metal center of the catalyst.

With the ligand coordinated to the metal in this fashion, the complex is thought to lack symmetry. Without being bound by theory, it has been discovered that when using these complexes as catalyst components for the production of polyethylene and other polymers of $C_2$ and higher alpha olefins, the lack of symmetry is advantageous for the production of poly(alpha olefins) because it enhances the ability of the catalyst to produce polymers of high tacticity. Additionally, the particular structural feature of having a 5- and an 8-membered ring may yield high catalyst activity at high reactor temperatures, while maintaining the ability to tailor polymer properties such as increasing molecular weight with narrow molecular weight distribution.

The inventors have discovered that when a pyridyl-amido group is used with a phenolate group, a new family of catalysts is provided having improved performance in polymer synthesis.

Catalysts, catalyst systems, and processes of the present disclosure can provide high temperature ethylene polymerization, propylene polymerization, ethylene alpha-olefin (e.g., ethylene-1-octene) copolymerization, or propylene alpha-olefin copolymerization as the Lewis base catalysts, such as amido-phenolate-heterocyclic Lewis base catalysts, are stable at high polymerization temperatures and have good activity at the high polymerization temperatures. The stable catalysts with good activity can provide formation of polymers having high melting points, high isotacticity, and the ability to make an increased amount of polymer in a given reactor, as compared to conventional catalysts, because polymerizations in general occur at a higher rate at higher temperatures. Furthermore, the stable catalysts with good activity can also provide formation of polymers having low to very low molecular weights, as compared to conventional catalysts, because polymerizations in general occur at a higher rate at higher temperatures.

For the purposes of the present disclosure, the numbering scheme for the Periodic Table Groups is used as described in *Chemical and Engineering News*, v.63(5), pg. 27 (1985). Therefore, a "group 4 metal" is an element from group 4 of the Periodic Table, e.g., Hf, Ti, or Zr. As used herein, unless otherwise specified, all abbreviations are used as described in the Periodic Table. For example, Pd refers to palladium, Cl refers to chlorine, Hf refers to hafnium, and Zr refers to zirconium.

The following abbreviations may be used herein: Me is methyl, Et is ethyl, iPr is isopropyl, Ph is phenyl, nBu is normal butyl, tBu is tertiary butyl, MAO is methylalumoxane, MOMCl is chloromethyl methyl ether, THF is tetrahydrofuran, PDI is polydispersity index which is defined as weight-average molecular weight divided by number-average molecular weight, NMR is nuclear magnetic resonance, t is time, s is second, h is hour, psi is pounds per square inch, psig is pounds per square inch gauge, equiv is equivalent, RPM is rotation per minute.

The specification describes transition metal complexes. The term complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which, without being bound by theory, is believed to create a cation as a result of the removal of an anionic group, often referred to as a leaving group, from the transition metal.

As used herein, "olefin polymerization catalyst(s)" refers to any catalyst, such as an organometallic complex or compound that is capable of coordination polymerization addition where successive monomers are added in a monomer chain at the organometallic active center.

The terms "substituent," "radical," "group," and "moiety" may be used interchangeably.

"Conversion" is the amount of monomer that is converted to polymer product, and is reported as mol % and is calculated based on the polymer yield and the amount of monomer fed into the reactor.

"Catalyst activity" is a measure of the level of activity of the catalyst and is reported as the mass of product polymer (P) produced per mole (or mmol) of transition metal catalyst (Cat) used (kgP/molCat or gP/mmolCat or kgP/mmolCat), and catalyst activity can also be expressed per unit of time, for example, per hour (hr), e.g., (kg P/mmol Cat/h).

The term "heteroatom" refers to any group 13-17 element, excluding carbon. A heteroatom may include B, Si, Ge, Sn, N, P, As, O, S, Se, Te, F, Cl, Br, and I. The term "heteroatom-containing group" may include the aforementioned elements with hydrogens attached, such as BH, $BH_2$, $SiH_2$, OH, NH, $NH_2$, etc. The term "substituted heteroatom-containing group" describes a heteroatom-containing group that has one or more hydrogen atoms replaced by a hydrocarbyl or substituted hydrocarbyl group(s).

An "olefin," alternatively referred to as "alkene," is a linear, branched, or cyclic compound of carbon and hydrogen having at least one double bond. For purposes of this specification and the claims appended thereto, when a polymer or copolymer is referred to as including an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" is used to refer to mer units indicates that the mer units differ from each other by at least one atom or are different isomerically. Accordingly, the definition of copolymer, as used herein, includes terpolymers. An "ethylene polymer" or "ethylene copolymer" is a polymer or copolymer including at least 50 mol % ethylene derived units, a "propylene polymer" or "propylene copolymer" is a polymer or copolymer including at least 50 mol % propylene derived units, and so on.

The term "alpha-olefin" refers to an olefin having a terminal carbon-to-carbon double bond in the structure thereof (($R^1R^2$)—C=$CH_2$, where $R^1$ and $R^2$ can be independently hydrogen or any hydrocarbyl group; such as $R^1$ is hydrogen and $R^2$ is an alkyl group). A "linear alpha-olefin" is an alpha-olefin defined in this paragraph wherein $R^1$ is hydrogen, and $R^2$ is hydrogen or a linear alkyl group.

For the purposes of this present disclosure, ethylene shall be considered an α-olefin.

As used herein, and unless otherwise specified, the term "$C_n$" means hydrocarbon(s) having n carbon atom(s) per molecule, wherein n is a positive integer. The term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n. Likewise, a "Cm-Cy" group or compound refers to a group or compound comprising carbon atoms at a total number thereof in the range from m to y. Thus, a $C_1$-$C_{50}$ alkyl group refers to an alkyl group comprising carbon atoms at a total number thereof in the range from 1 to 50.

Unless otherwise indicated, (e.g., the definition of "substituted hydrocarbyl", "substituted aromatic", etc.), the term "substituted" means that at least one hydrogen atom has been replaced with at least one non-hydrogen group, such as a hydrocarbyl group, a heteroatom, or a heteroatom containing group, such as halogen (such as Br, Cl, F or I) or at least one functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, where each $R^*$ is independently a hydrocarbyl or halocarbyl radical, and two or more $R^*$ may join together to form a substituted or unsubstituted completely saturated, partially unsaturated, or aromatic cyclic or polycyclic ring structure), or where at least one heteroatom has been inserted within a hydrocarbyl ring.

The term "substituted hydrocarbyl" means a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g., —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, where each $R^*$ is independently a hydrocarbyl or halocarbyl radical, and two or more $R^*$ may join together to form a substituted or unsubstituted completely saturated, partially unsaturated, or aromatic cyclic or polycyclic ring structure), or where at least one heteroatom has been inserted within a hydrocarbyl ring.

The term "hydrocarbyl substituted phenyl" means a phenyl group having 1, 2, 3, 4 or 5 hydrogen groups replaced by a hydrocarbyl or substituted hydrocarbyl group. In at least one embodiment, the "hydrocarbyl substituted phenyl" group can be represented by the formula:

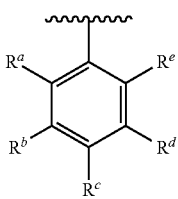

where each of $R^a$, $R^b$, $R^c$, $R^d$, and $R^e$ can be independently selected from hydrogen, $C_1$-$C_{40}$ hydrocarbyl or $C_1$-$C_{40}$ substituted hydrocarbyl, a heteroatom or a heteroatom-containing group (provided that at least one of $R^a$, $R^b$, $R^e$, $R^d$, and $R^e$ is not H), or two or more of $R^a$, $R^b$, $R^c$, $R^d$, and $R^e$ can be joined together to form a $C_4$-$C_{62}$ cyclic or polycyclic hydrocarbyl ring structure, or a combination thereof.

For purposes herein, the use of symbol ⁓ indicates connection to another group.

The term "substituted aromatic," means an aromatic group having 1 or more hydrogen groups replaced by a hydrocarbyl, substituted hydrocarbyl, heteroatom or heteroatom containing group.

The term "substituted phenyl," mean a phenyl group having 1 or more hydrogen groups replaced by a hydrocarbyl, substituted hydrocarbyl, heteroatom or heteroatom containing group.

The term "substituted carbazole," means a carbazolyl group having 1 or more hydrogen groups replaced by a hydrocarbyl, substituted hydrocarbyl, heteroatom or heteroatom containing group.

The term "substituted naphthyl," means a naphthyl group having 1 or more hydrogen groups replaced by a hydrocarbyl, substituted hydrocarbyl, heteroatom or heteroatom containing group.

The term "substituted benzyl" means a benzyl group having 1 or more hydrogen groups replaced by a hydrocarbyl, substituted hydrocarbyl, heteroatom or heteroatom containing group, such as a substituted benzyl group is represented by the formula:

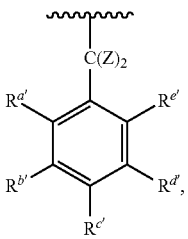

where each of $R^{a'}$, $R^{b'}$, $R^{c'}$, $R^{d'}$, and $R^{e'}$ and Z is independently selected from hydrogen, $C_1$-$C_{40}$ hydrocarbyl or $C_1$-$C_{40}$ substituted hydrocarbyl, a heteroatom or a heteroatom-containing group (provided that at least one of $R^{a'}$, $R^{b'}$, $R^{c'}$, $R^{d'}$, and $R^{e'}$ and Z is not H), or two or more of $R^{a'}$, $R^{b'}$, $R^{c'}$, $R^{d'}$, and $R^{e'}$ and Z may be joined together to form a $C_4$-$C_{62}$ cyclic or polycyclic ring structure, or a combination thereof.

The terms "alkoxy" and "alkoxide" mean an alkyl or aryl group bound to an oxygen atom, such as an alkyl ether or aryl ether group/radical connected to an oxygen atom and can include those where the alkyl/aryl group is a $C_1$ to $C_{10}$ hydrocarbyl. The alkyl group may be straight chain, branched, or cyclic. The alkyl group may be saturated or unsaturated. Examples of suitable alkoxy radicals can include methoxy, ethoxy, n-propoxy, iso-propoxy, n-butoxy, iso-butoxy, sec-butoxy, tert-butoxy, phenoxyl. Substituted alkoxy radicals are radicals in which at least one hydrogen atom of the alkoxy radical has been substituted with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, or —PbR*$_3$, and each R* is independently a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "alkenyl" means a straight-chain, branched-chain, or cyclic hydrocarbon radical having one or more double bonds. These alkenyl radicals may be optionally substituted. Examples of suitable alkenyl radicals can include ethenyl, propenyl, allyl, 1,4-butadienyl cyclopropenyl, cyclobutenyl, cyclopentenyl, cyclohexenyl, cyclooctenyl, including their substituted analogues.

The terms "alkyl radical," and "alkyl" are used interchangeably throughout this disclosure. For purposes of this disclosure, "alkyl radical" is defined to be $C_1$-$C_{100}$ alkyls, that may be linear, branched, or cyclic. Examples of such radicals can include methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, including their substituted analogues. Substituted alkyl radicals are radicals in which at least one hydrogen atom of the alkyl radical has been substituted with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, or —PbR*$_3$, and each R* is independently a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "aryl" or "aryl group" means an aromatic ring such as phenyl. Likewise, heteroaryl means an aryl group where a ring carbon atom (or two or three ring carbon atoms) has been replaced with a heteroatom or substituted heteroatom, such as N P, B, NH, or NMe. A "substituted aryl group" is an aryl group containing a non-hydrogen, non-carbon atom such as 2-methyl-phenyl, xylyl, and 4-bromo-xylyl. As used herein, the term "aromatic" also refers to pseudoaromatic heterocycles which are heterocyclic substituents that have similar properties and structures (nearly planar) to aromatic heterocyclic ligands, but are not by definition aromatic. The term "silyl group" means a group containing silicon and optionally hydrogen and or carbon. A silyl group can be saturated or unsaturated, linear or branched, cyclic or acyclic, aromatic or non-aromatic, and with the silicon atom being within and/or pendant to the cyclic/aromatic rings. A "substituted silyl group" is a silyl group containing a non-hydrogen, non-carbon atom.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom-substituted ring. Other examples of heterocycles may include pyridine, imidazole, and thiazole. A substituted heterocyclic ring is a heterocyclic ring where a hydrogen on a ring atom is replaced with a heteroatom.

The terms "hydrocarbyl radical," "hydrocarbyl group," or "hydrocarbyl" may be used interchangeably and are defined to mean a group consisting of hydrogen and carbon atoms only. For example, a hydrocarbyl can be a $C_1$-$C_{100}$ radical that may be linear, branched, or cyclic, and when cyclic, aromatic or non-aromatic. Examples of such radicals may include, but are not limited to, alkyl groups such as methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, and aryl groups, such as phenyl, benzyl naphthyl.

Unless otherwise indicated, as used herein, "low comonomer content" is defined as a polyolefin having less than 8 wt % of comonomer based upon the total weight of the polyolefin. As used herein, "high comonomer content" is defined as a polyolefin having greater than or equal to 8 wt % of comonomer based upon the total weight of the polyolefin.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), and is defined to be Mw divided by Mn. Unless otherwise noted, all molecular weight units (e.g., Mw, Mn, Mz) are g/mol.

Unless otherwise indicated, as used herein, "high molecular weight" is defined as a weight average molecular weight (Mw) value of 50,000 g/mol or more. "Low molecular weight" is defined as an Mw value of less than 50,000 g/mol.

Unless otherwise noted, all melting points (Tm) are differential scanning calorimetry (DSC) second melt.

A "catalyst system" is a combination of at least one catalyst compound, at least one activator, an optional coactivator, and an optional support material. The terms "catalyst compound", "catalyst complex", "transition metal complex", "transition metal compound", "precatalyst compound", and "precatalyst complex" are used interchangeably. When "catalyst system" is used to describe such a pair before activation, it means the unactivated catalyst complex (precatalyst) together with an activator and, optionally, a coactivator. When it is used to describe such a pair after activation, it means the activated complex and the activator or other charge-balancing moiety. The transition metal compound may be neutral as in a precatalyst, or a charged species with a counter ion as in an activated catalyst system. For the purposes of the present disclosure and the claims thereto, when catalyst systems are described as comprising neutral stable forms of the components, it is well understood by one of ordinary skill in the art, that the ionic form of the component is the form that reacts with the monomers to produce polymers. A polymerization catalyst system is a catalyst system that can polymerize monomers to polymer. Furthermore, catalyst compounds and activators represented by formulae herein are intended to embrace both neutral and ionic forms of the catalyst compounds and activators.

In the description herein, the catalyst may be described as a catalyst, a catalyst precursor, a pre-catalyst compound, catalyst compound or a transition metal compound, and these terms are used interchangeably.

An "anionic ligand" is a negatively charged ligand which donates one or more pairs of electrons to a metal ion. A "Lewis base" is a neutrally charged ligand which donates one or more pairs of electrons to a metal ion. Examples of Lewis bases may include ethylether, trimethylamine, pyridine, tetrahydrofuran, dimethylsulfide, and triphenylphosphine. The term "heterocyclic Lewis base" refers to Lewis bases that are also heterocycles. Examples of heterocyclic Lewis bases may include pyridine, imidazole, thiazole, and furan. The amido-phenolate-heterocyclic Lewis base ligands are tridentate ligands that bind to the metal via two anionic donors (e.g., phenolate and amido) and one central, neutral heterocyclic donor (e.g., pyridinyl group).

A scavenger is a compound that can be added to facilitate polymerization by scavenging impurities. Some scavengers may also act as activators and may be referred to as coactivators. A coactivator, that is not a scavenger, may also be used in conjunction with an activator in order to form an active catalyst. In at least one embodiment, a coactivator can be pre-mixed with the transition metal compound to form an alkylated transition metal compound.

Non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. A Lewis acid is defined to be a compound or element that can react with an electron donor to form a bond. An NCA coordinates weakly enough that a Lewis base, such as an olefin monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

The term "continuous" means a system that operates without interruption or cessation. For example a continuous process to produce a polymer would be one where the reactants are continually introduced into one or more reactors and polymer product is continually withdrawn.

A solution polymerization means a polymerization process in which the polymer is dissolved in a liquid polymerization medium, such as an inert solvent or monomer(s) or their blends. A solution polymerization can be homogeneous. A homogeneous polymerization is one where the polymer product is dissolved in the polymerization medium. Suitable systems may be not turbid as described in Oliveira, J. V. et al. (2000) *Ind. Eng. Chem. Res.*, v.29, p. 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, such as less than 10 wt %, such as less than 1 wt %, such as 0 wt %.

Transition Metal Complexes

In at least one embodiment, the present disclosure relates to novel catalyst compounds having a Lewis base tridentate ligand which coordinates to a group 3, 4, 5, or 6 transition metal center, forming a five-membered metallocyclic ring and an eight-membered metallocyclic ring.

For example, the phenolate group is part of an eight-membered group joined with the metal center. For example, the phenolate group is a phenyl-phenolate. Alternatively, the phenolate group is a tert-butyl phenolate. A neutral heterocyclic donor and an anion donor can each coordinate to the transition metal center. The neutral heterocyclic donor can be a pyridyl group, and the anion donor can be an amido and/or phenolate groups. In some embodiments, the five-membered metallocyclic ring includes a pyridyl-amido portion. For example, the pyridyl group is joined with the amido group by a methylene bridge. Alternatively, the pyridyl group is joined with the amido group by a methylene bridge substituted with 2-isopropylphenyl.

In some aspects of the present disclosure, the five-membered metallocyclic ring features a benzimidazole-amido group. For example, the neutral heterocyclic donor can be a benzimidazole, and the anion donors are the amido and/or phenolate groups. For example, the phenolate group can be a phenyl-phenolate. For example, the phenolate group can be a tert-butyl phenolate. This aspect further creates asymmetry from the opposing side of the catalyst which features a five-membered metallocyclic ring which includes the benzimidazole-amido portion. Without being bound by theory, it is believed that the use of, for example, the benzimidazole group adjacent to the amido group enhances catalyst stability. Thus, productivity at high temperatures in polymerization processes may be achieved. For example, the benzimidazole group is bound directly to the amido nitrogen and does not have a linker such as a methylene bridge. In some polymerization processes, especially at high reactor temperatures, a linker, such as a methylene bridge, can be an area of high reactivity and prone to degradation under certain circumstances. Thus, the inventors have found that catalysts produced with the benzimidazole group are highly productive at high temperatures and less prone to degradation.

A catalyst compound of the present disclosure can be represented by Formula (I):

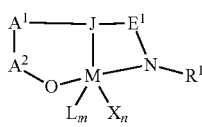
(I)

wherein:
M is a group 3, 4, 5, or 6 metal;
each of $A^1$ and $A^2$ are independently selected from the group consisting of aryl, substituted aryl, heteroaryl group, and substituted heteroaryl group;
J comprises a heterocyclic Lewis base;
$E^1$ is selected from the group consisting of hydrocarbyl, substituted hydrocarbyl, silyl, and substituted silyl, wherein J and $E^1$ are optionally joined to form one or more hydrocarbyl rings, substituted hydrocarbyl rings, heterocyclic rings, or substituted heterocyclic rings;

each L is independently a Lewis base;
each X is independently an anionic ligand;
n is 1, 2 or 3;
m is 0, 1, or 2;
n+m is not greater than 4;
$R^1$ is selected from the group consisting of $C_1$-$C_{40}$ hydrocarbyl, substituted $C_1$-$C_{40}$ hydrocarbyl, a heteroatom-containing group, and substituted heteroatom-containing group;
any two L groups may be joined together to form a bidentate Lewis base;
an X group may be joined to an L group to form a monoanionic bidentate group; and
any two X groups may be joined together to form a dianionic ligand group.

In at least one embodiment, each L of the catalysts represented by Formula (I) can be independently selected from the group consisting of ethers, amines, phosphines, thioethers, esters, $Et_2O$, MeOtBu, $Et_3N$, $PhNMe_2$, $MePh_2N$, tetrahydrofuran, and dimethylsulfide. In at least one embodiment, m of the catalysts represented by Formula (I) is 0. In at least one embodiment, each X the catalysts represented by Formula (I) can be independently selected from the group consisting of methyl, benzyl, trimethylsilyl, neopentyl, ethyl, propyl, butyl, phenyl, hydrido, chloro, fluoro, bromo, iodo, trifluoromethanesulfonate, dimethylamido, diethylamido, dipropylamido, and diisopropylamido, such as chloro, such as methyl. In at least one embodiment, n of the catalysts represented by Formula (I) is 2.

In some embodiments, $E^1$ can be selected from the group consisting of $C(R^8)(R^9)$ and $Si(R^8)(R^9)$. Each of $R^8$ and $R^9$ may be independently selected from the group consisting of hydrogen, $C_1$-$C_{40}$ hydrocarbyl, substituted $C_1$-$C_{40}$ hydrocarbyl, a heteroatom, heteroatom containing group, and substituted heteroatom-containing group, or $R^8$ and $R^9$ may be joined to form one or more $C_3$-$C_{20}$ alkyl groups, hydrocarbyl rings, substituted hydrocarbyl rings, heterocyclic rings, or substituted heterocyclic rings each having 5, 6, 7, or 8 ring atoms, and where substitutions on the ring can join to form additional rings. In some embodiments, $R^1$ can be $C_1$-$C_{40}$ hydrocarbyl or substituted $C_1$-$C_{40}$ hydrocarbyl. In at least one embodiment, $R^1$ is selected from the group consisting of a tert-butylphenyl group, a di-tert-butylphenyl group, and a tri-tert-butylphenyl group. Alternatively, $R^1$ is selected from the group consisting of methyl, ethyl, and all isomers of propyl, butyl, pentyl, hexyl, heptyl, octyl, nonyl, and decyl.

In at least one embodiment, J of Formula (I) can be represented by the formula:

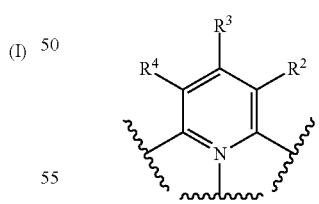

wherein each of $R^2$, $R^3$, and $R^4$ is independently selected from the group consisting of hydrogen, $C_1$-$C_{40}$ hydrocarbyl, substituted $C_1$-$C_{40}$ hydrocarbyl, a heteroatom, and heteroatom-containing group, or one or more of $R^2$ and $R^3$ or $R^3$ and $R^4$ may be joined to form one or more hydrocarbyl rings, substituted hydrocarbyl rings, heterocyclic rings, or substituted heterocyclic rings each having 5, 6, 7, or 8 ring atoms, and where substitutions on the ring can join to form additional rings. In at least one embodiment, each of $R^2$, $R^3$, and $R^4$ is independently selected from the group consisting of hydrogen and $C_1$-$C_{10}$ alkyl. In at least one embodiment, each of $R^2$, $R^3$, and $R^4$ is independently selected from the group consisting of hydrogen, methyl, ethyl, and all isomers of propyl, butyl, pentyl, hexyl, heptyl, octyl, nonyl, and decyl.

In at least one embodiment, J and $E^1$ of Formula (I) are joined to form a ring represented by the formula:

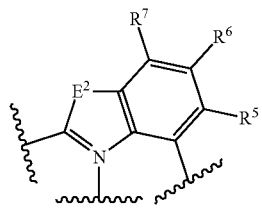

wherein $E^2$ is selected from the group consisting of O, S, and $N(R^{10})$, wherein each of $R^5$, $R^6$, $R^7$, and $R^{10}$ is independently selected from the group consisting of hydrogen, $C_1$-$C_{40}$ hydrocarbyl, substituted $C_1$-$C_{40}$ hydrocarbyl, a heteroatom, heteroatom-containing group, and substituted heteroatom-containing group, or one or more of $R^5$ and $R^6$ or $R^6$ and $R^7$ may be joined to form one or more hydrocarbyl rings, substituted hydrocarbyl rings, heterocyclic rings, or substituted heterocyclic rings each having 5, 6, 7, or 8 ring atoms, and where substitutions on the ring can join to form additional rings. In at least one embodiment, each of $R^5$, $R^6$, $R^7$, and $R^{10}$ is independently selected from the group consisting of hydrogen and $C_1$-$C_{10}$ alkyl. In at least one embodiment, each of $R^5$, $R^6$, $R^7$, and $R^{10}$ is independently selected from the group consisting of hydrogen, methyl, ethyl, and all isomers of propyl, butyl, pentyl, hexyl, heptyl, octyl, nonyl, and decyl.

In at least one embodiment, $E^2$ is selected from the group consisting of NH, $C_1$-$C_{20}$ alkyl-N, and $C_4$-$C_{20}$ aryl-N. In at least one embodiment, $E^2$ is $C_1$-$C_{20}$ alkyl-N where $C_1$-$C_{20}$ alkyl is selected from the group consisting of methyl, ethyl, propyl, butyl, pentyl, hexyl, heptyl, octyl, nonyl, and decyl. In at least one embodiment, $E^2$ is $C_4$-$C_{20}$ aryl-N where $C_4$-$C_{20}$ aryl is selected from the group consisting of phenyl and substituted phenyl.

In at least one embodiment, J and $E^1$ are joined to form a ring represented by the formula:

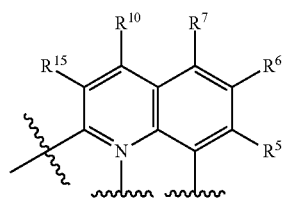

wherein each of $R^5$, $R^6$, $R^7$, $R^{10}$ and $R^{15}$ is independently selected from the group consisting of hydrogen, $C_1$-$C_{40}$ hydrocarbyl, substituted $C_1$-$C_{40}$ hydrocarbyl, a heteroatom, heteroatom-containing group, and substituted heteroatom-containing group, or one or more of $R^5$ and $R^6$ or $R^6$ and $R^7$ or $R^7$ and $R^{10}$ or $R^{10}$ and $R^{15}$ may be joined to form one or more hydrocarbyl rings, substituted hydrocarbyl rings, heterocyclic rings, or substituted heterocyclic rings each having 5, 6, 7, or 8 ring atoms, and where substitutions on the ring can join to form additional rings. In at least one embodiment, each of $R^5$, $R^6$, $R^7$, $R^{10}$ and $R^{15}$ is independently selected from the group consisting of hydrogen, $C_1$-$C_{40}$ hydrocarbyl, and substituted $C_1$-$C_{40}$ hydrocarbyl. In at least one embodiment, each of $R^5$, $R^6$, $R^7$, $R^{10}$ and $R^{15}$ is independently selected from the group consisting of hydrogen, methyl, ethyl, and all isomers of propyl, butyl, pentyl, hexyl, heptyl, octyl, nonyl, and decyl.

In at least one embodiment $A^1$ of Formula (I) is aryl or substituted aryl. For example, in some embodiments, $A^1$ of Formula (I) is phenyl or substituted phenyl.

In at least one embodiment, $A^2$ of Formula (I) is represented by the formula:

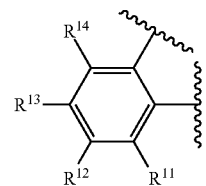

wherein each of $R^{11}$, $R^{12}$, $R^{13}$, and $R^{14}$ is independently selected from the group consisting of hydrogen, $C_1$-$C_{40}$ hydrocarbyl, substituted $C_1$-$C_{40}$ hydrocarbyl, a heteroatom, heteroatom-containing group, and a substituted heteroatom-containing group. In at least one embodiment, each of $R^{11}$, $R^{12}$, $R^{13}$, and $R^{14}$ is independently selected from the group consisting of hydrogen and $C_1$-$C_{10}$ alkyl. In at least one embodiment, each of $R^{11}$, $R^{12}$, $R^{13}$, and $R^{14}$ is independently selected from the group consisting of hydrogen, methyl, ethyl, and all isomers of propyl, butyl, pentyl, hexyl, heptyl, octyl, nonyl, and decyl. In some embodiments, $R^{11}$ is a $C_1$-$C_{20}$ hydrocarbyl or substituted hydrocarbyl, such as 9-methylfluorenyl. In some embodiments, $R^{11}$ can be $C_1$-$C_{10}$ alkyl, such as tert-butyl, or $R^{11}$ can be substituted $C_1$-$C_{10}$ alkyl. Alternatively, $R^{11}$ can be aryl or substituted aryl, such as a di-tert-butylphenyl group. In some embodiments, $R^{11}$ is:

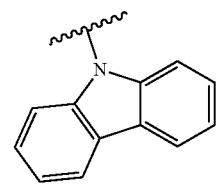

In at least one embodiment, $E^1$ of Formula (I) can be $C(R^8)(R^9)$, where $R^8$ and $R^9$ are independently selected from hydrogen, alkyl, and substituted alkyl. In some embodiments, $R^8$ and $R^9$ are independently selected from the group consisting of hydrogen, methyl, ethyl, propyl, butyl, pentyl, hexyl, heptyl, octyl, nonyl, and decyl. In at least one embodiment, $R^8$ is hydrogen and $R^9$ is a tert-butylphenyl group. Alternatively, $E^1$ can be $CH_2$.

In at least one embodiment, M of Formula (I) is a group 4 transition metal, such as titanium, hafnium, or zirconium. In some embodiments, M of Formula (I) can be zirconium or hafnium.

In at least one embodiment, the catalyst compound of Formula (I) is selected from the group consisting of:
1
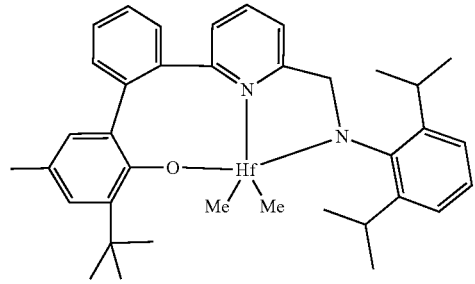
2
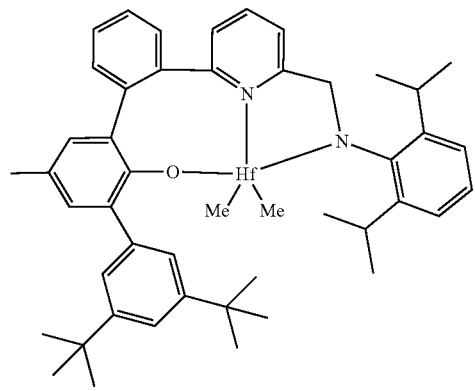
3
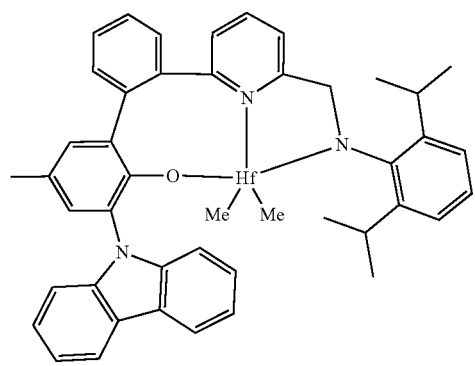
4
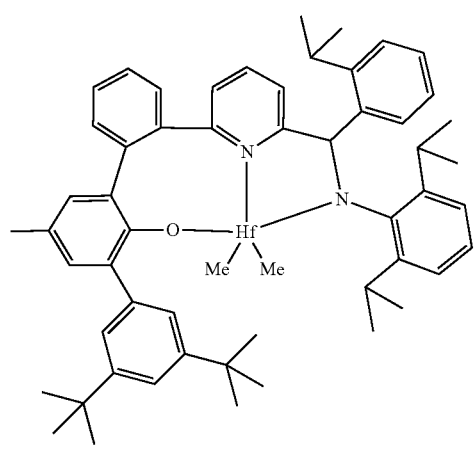
5
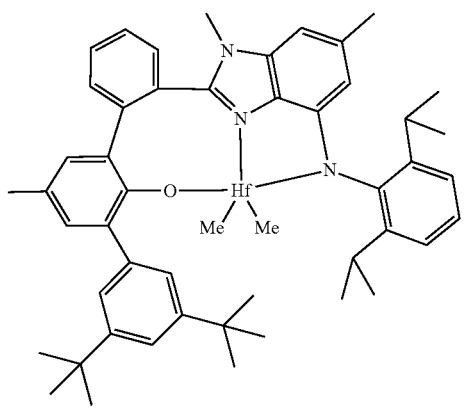
6
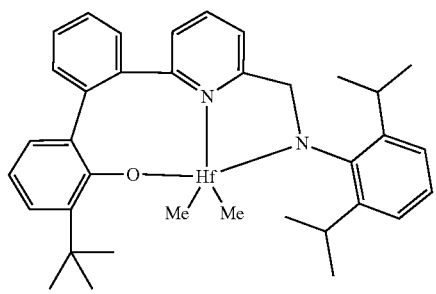
7
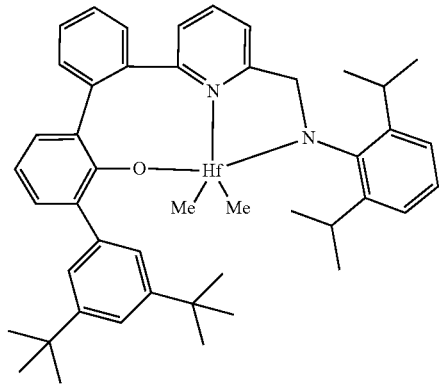
8
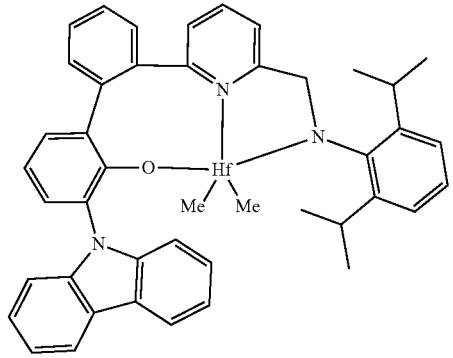

-continued
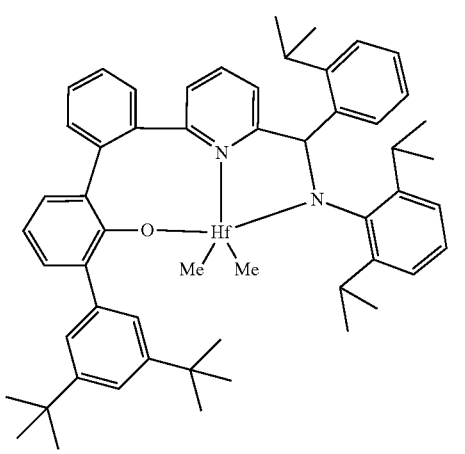
9
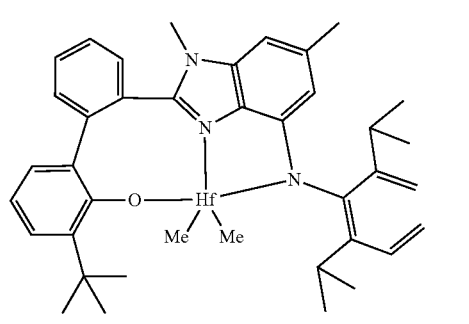
10
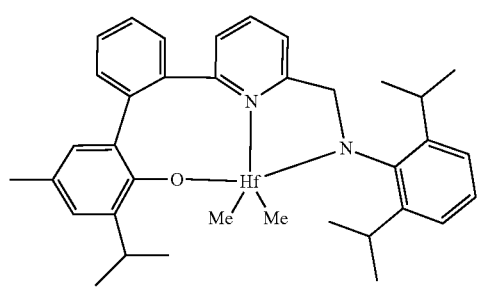
11
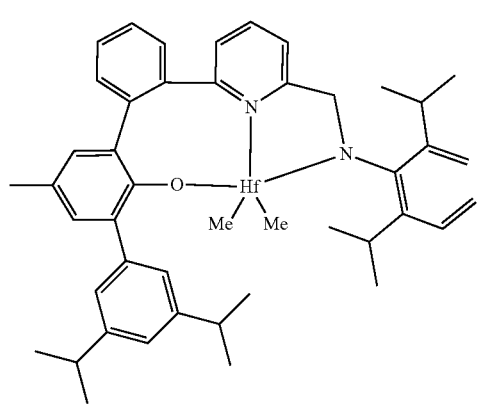
12
-continued
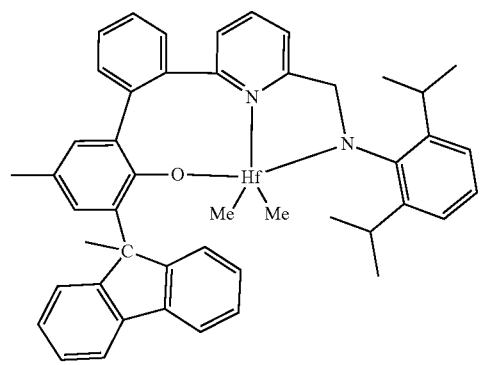
13
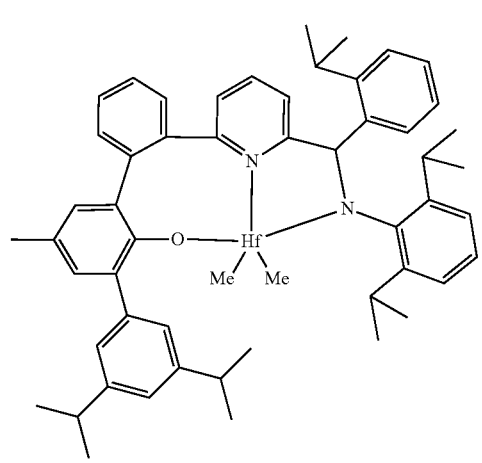
14
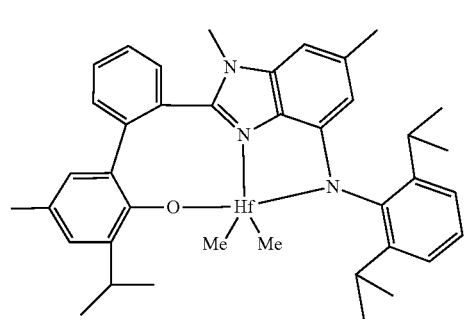
15
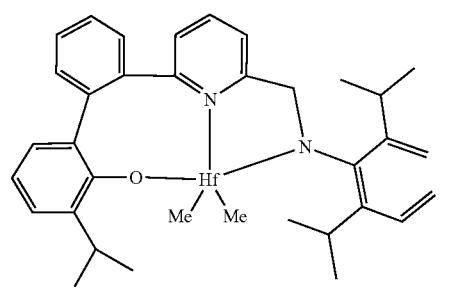
16

-continued

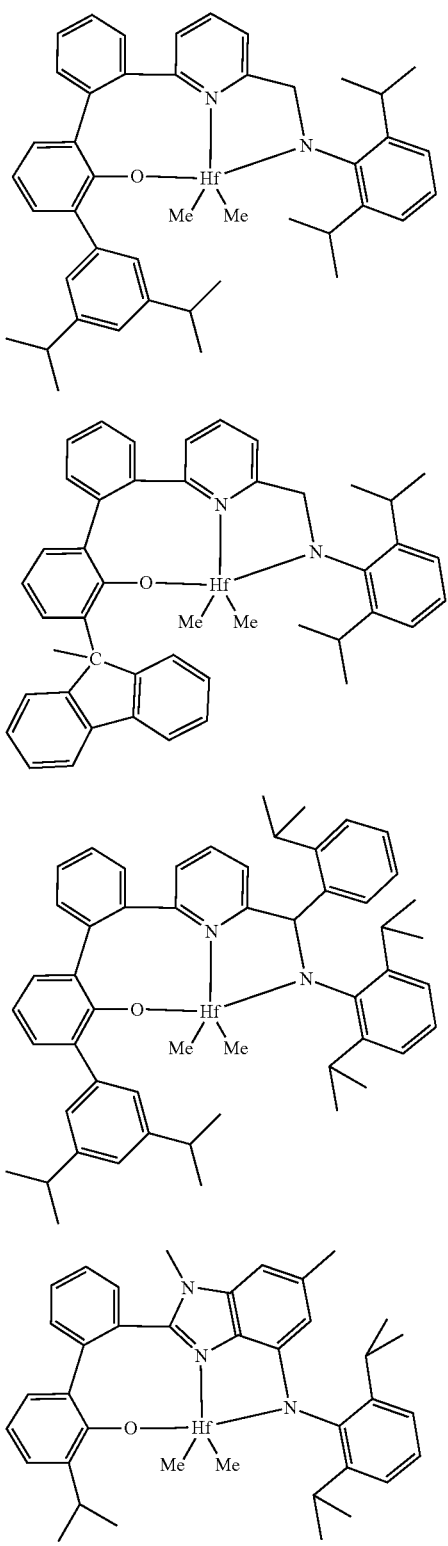

Methods to Prepare the Catalyst Compounds

The following is a generic scheme to prepare a catalyst described herein and further exemplified in the examples. As a representative example, Scheme 1 illustrates amido-phenolate-heterocyclic Lewis base complexes, the free ligand, and the key fragments of the free ligand. Catalyst compounds of this type can be synthesized as shown below, where the free ligand can be obtained via a multiple reaction process using coupling reactions in order to join together the three fragments (i.e., heterocyclic group, amido group, and phenolate group).

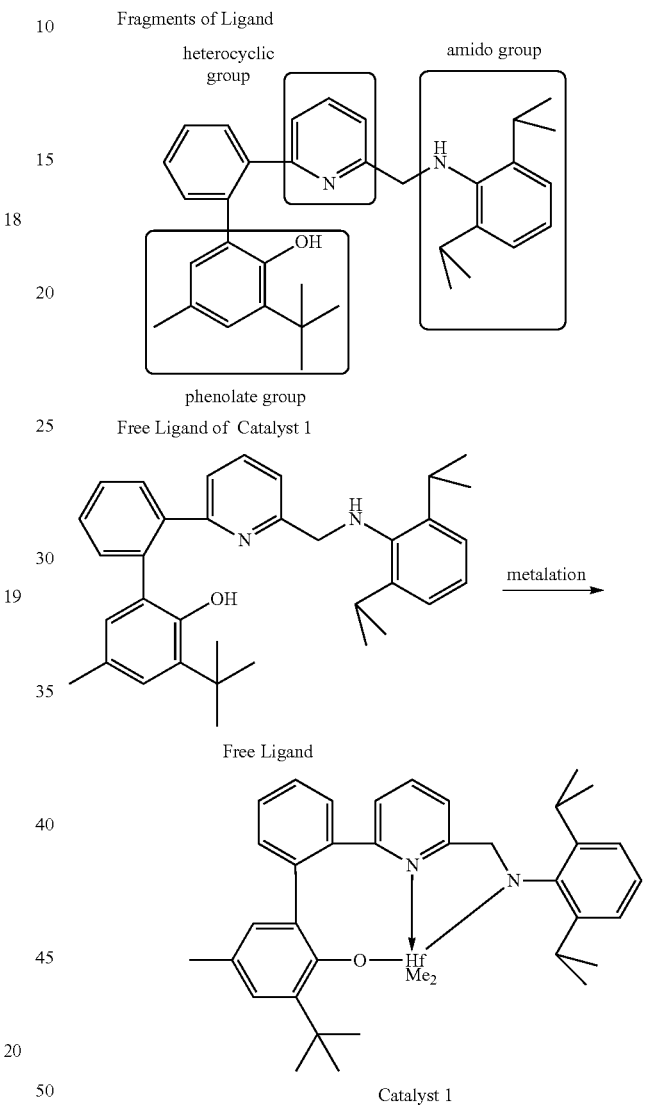

As a representative example, Scheme 2 illustrates a general synthetic route to prepare example amine phenol ligands that are used to prepare the transition metal catalysts of the present disclosure. By way of example, compound A is prepared by condensation of 2-bromo-6-pyridine carboxaldehyde with an amine, followed by reduction with NaBH$_3$(CN). In some embodiments, compound C can be prepared by reaction of either BuLi or Mg metal with 2-bromo-6-alkyl-protected phenols. The term "protected group" as used herein, such as "protected phenol," refers to a chemically modified functional group that is modified to obtain chemo selectivity in a subsequent chemical reaction, such as in a multistep reaction. The term "protecting group," as used herein is the molecule that modifies the functional group in a "protected group." For example, in Scheme 2, "P" is a protecting group such as methoxymethyl ether (MOM), tetrahydropyranyl (THP), and benzyl (Bn). In some embodiments, compound C can react with compound D, such as 1-bromo-2-chlorobenzene, to form compound E. In at least one embodiment, compound C can react with compound D, such as 2-bromo-phenylboronic acid in a Pd catalyzed coupling (e.g. in a Suzuki reaction or a Negishi reaction) to form compound E. In some embodiments, compound E can be metalated to form compound B by reaction with either BuLi or Mg metal. In some embodiments, compound A and compound B can be converted to the amino phenol ligand via a Pd catalyzed coupling. The amino phenol ligand may be reacted with transition metal reagents that contain basic anionic ligands to form transition metal amido phenolate complexes. For example, group 4 reagents can be selected from the group consisting of $MBn_4$, $M(CH_2SiMe_3)_4$, $MBn_2C_2(OEt_2)_n$, $M(NMe_2)_2Cl_2(dme)$, $M(NMe_2)_4$, $M(NEt_2)_4$, and M is either Zr or Hf. In some embodiments, the group 4 reagents are in situ formed group 4 alkyls prepared by the reaction of group 4 halides with Grignard, alkyllithium, organoaluminum, or organozinc reagents. In some embodiments, the amino phenol ligand may be deprotonated by reaction with a main group metal base (e.g. alkyllithium, Grignard reagent) to form a dianionic amido phenolate ligand that may then be reacted with a transition metal halide, such as $ZrCl_4$ or $HfCl_4$ to produce an amido phenolate transition metal complex.

converting the neutral catalyst compound to a catalytically active catalyst compound cation.

In some embodiments, the catalyst systems described herein may comprise a catalyst complex and an activator, such as alumoxane or a non-coordinating anion, and may be formed by combining the catalyst components described herein with activators in any manner known from the literature including combining them with supports, such as silica. The catalyst systems may also be added to or generated in solution polymerization or bulk polymerization (in the monomer). Catalyst systems of the present disclosure may have one or more activators and one, two or more catalyst components. Non-limiting activators, for example, may include alumoxanes, aluminum alkyls, ionizing activators, which may be neutral or ionic, and conventional-type cocatalysts. Suitable activators may include alumoxane compounds, modified alumoxane compounds, and ionizing anion precursor compounds that abstract a reactive, σ-bound, metal ligand making the metal compound cationic and providing a charge-balancing non-coordinating or weakly coordinating anion, e.g., a non-coordinating anion.

In at least one embodiment, the catalyst system includes an activator and the catalyst compound of Formula (I).

Alumoxane Activators

Alumoxane activators are utilized as activators in the catalyst systems described herein. Alumoxanes are generally oligomeric compounds containing —Al($R^{a'''}$)—O— sub-

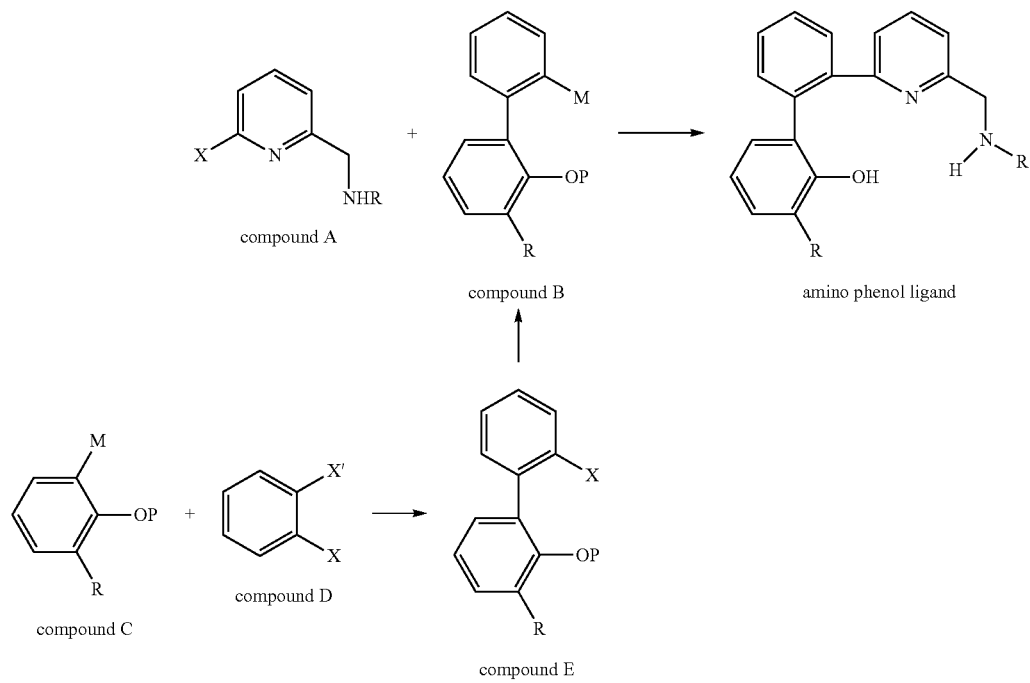

Scheme 2 compound A compound B amino phenol ligand compound C compound D compound E

X = halogen
R = alkyl
M = Li, MgX, ZnX, B(OH)$_2$, B(OR)$_2$
P = MOM, THP, Bn or other protecting groups Activators The terms "cocatalyst" and "activator" are used herein interchangeably and are a compound which can activate any one of the catalyst compounds of the present disclosure by units, where $R^{a'''}$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be suitable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584, which is incorporated by reference herein). Another useful alumoxane is solid polymethylaluminoxane as described in U.S. Pat. Nos. 9,340,630, 8,404,880, and 8,975,209, which are incorporated by reference herein.

When the activator is an alumoxane (modified or unmodified), at least one embodiment select the maximum amount of activator at up to a 5,000-fold molar excess Al/M over the catalyst compound (per metal catalytic site). The minimum activator-to-catalyst-compound can be a 1:1 molar ratio. Alternate ranges may include from 1:1 to 500:1, alternatively from 1:1 to 200:1, alternatively from 1:1 to 100:1, or alternatively from 1:1 to 50:1.

In an alternate embodiment, little or no alumoxane is used in the polymerization processes described herein. For example, alumoxane can be present at zero mol %, alternatively the alumoxane can be present at a molar ratio of aluminum to catalyst compound transition metal less than 500:1, such as less than 300:1, such as less than 100:1, such as less than 1:1.

Ionizing/Non-Coordinating Anion Activators

The term "non-coordinating anion" (NCA) means an anion which either does not coordinate to a cation or which is only weakly coordinated to a cation thereby remaining sufficiently labile to be displaced by a Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with the present disclosure are those that are compatible, stabilize the transition metal cation in the sense of balancing its ionic charge at +1, and yet retain sufficient lability to permit displacement during polymerization. Ionizing activators useful herein typically comprise an NCA, particularly a compatible NCA.

It is within the scope of the present disclosure to use an ionizing activator, neutral or ionic. It is also within the scope of the present disclosure to use neutral or ionic activators alone or in combination with alumoxane or modified alumoxane activators. For descriptions of suitable activators please see U.S. Pat. Nos. 8,658,556 and 6,211,105.

The catalyst systems of the present disclosure can include at least one non-coordinating anion (NCA) activator. In at least one embodiment, boron containing NCA activators represented by the formula below can be used:

where Z is (L-H) or a reducible Lewis acid; L is a Lewis base; H is hydrogen; (L-H) is a Bronsted acid; $A^{d-}$ is a boron containing non-coordinating anion having the charge d−; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand transition metal catalyst precursor, resulting in a cationic transition metal species.

The activating cation $Z^{d+}$ may also be a moiety such as silver, tropylium, carbeniums, ferroceniums and mixtures, such as carbeniums and ferroceniums. $Z^{d+}$ can be triphenyl carbenium. Reducible Lewis acids can be a triaryl carbenium (where the aryl can be substituted or unsubstituted, such as those represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl), such as the reducible Lewis acids "Z" may include those represented by the formula: $(Ph_3C)$, where Ph is a substituted or unsubstituted phenyl, such as substituted with $C_1$ to $C_{40}$ hydrocarbyls or substituted a $C_1$ to $C_{40}$ hydrocarbyls, such as $C_1$ to $C_{20}$ alkyls or aromatics or substituted $C_1$ to $C_{20}$ alkyls or aromatics, such as Z is a triphenylcarbenium.

When $Z_d^+$ is the activating cation $(L-H)_d^+$, it can be a Bronsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, dioctadecylmethylamine, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ where k is 1, 2, or 3; n is 1, 2, 3, 4, 5, or 6 (such as 1, 2, 3, or 4); n−k=d; M is an element selected from Group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 40 carbon atoms with the proviso that in not more than 1 occurrence is Q a halide. Each Q can be a fluorinated hydrocarbyl group having 1 to 30 carbon atoms, such as each Q is a fluorinated aryl group, and such as each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting, examples of boron compounds which may be used as an activating cocatalyst are the compounds described as (and particularly those specifically listed as) activators in U.S. Pat. No. 8,658,556, which is incorporated by reference herein.

The ionic stoichiometric activator $Z^{d+}(A^{d-})$ can be one or more of N,N-dimethylanilinium tetrakis(perfluorophenyl) borate, N,N-dimethylanilinium tetrakis(perfluoronaphthyl) borate, dioctadecylmethylammonium tetrakis(perfluorophenyl)borate, N,N-dimethylanilinium tetrakis (perfluorobiphenyl)borate, N,N-dimethylanilinium tetrakis (3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

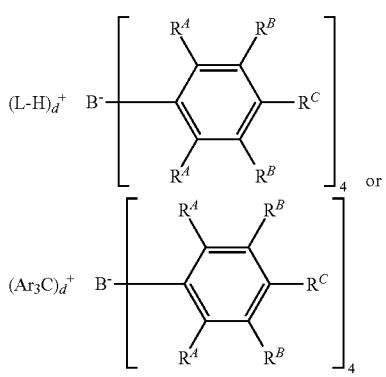

where:
each $R^A$ is independently a halide, such as a fluoride;
Ar is substituted or unsubstituted aryl group (such as a substituted or unsubstituted phenyl), such as substituted with $C_1$ to $C_{40}$ hydrocarbyls, such as $C_1$ to $C_{20}$ alkyls or aromatics;
each $R^B$ is independently a halide, a $C_6$ to $C_{20}$ substituted aromatic hydrocarbyl group or a siloxy group of the formula —O—Si—$R^D$, where $R^D$ is a $C_1$ to $C_{20}$ hydrocarbyl or hydrocarbylsilyl group (such as $R^B$ is a fluoride or a perfluorinated phenyl group);
each $R^C$ is a halide, $C_6$ to $C_{20}$ substituted aromatic hydrocarbyl group or a siloxy group of the formula —O—Si—$R^D$, where $R^D$ is a $C_1$ to $C_{20}$ hydrocarbyl or hydrocarbylsilyl group (such as $R^D$ is a fluoride or a $C_6$ perfluorinated aromatic hydrocarbyl group); where $R^B$ and $R^C$ can form one or more saturated or unsaturated, substituted or unsubstituted rings (such as $R^B$ and $R^C$ form a perfluorinated phenyl ring);
L is a Lewis base; $(L-H)^+$ is a Bronsted acid; d is 1, 2, or 3;
where the anion has a molecular weight of greater than 1,020 g/mol; and
where at least three of the substituents on the B atom each have a molecular volume of greater than 250 cubic Å, alternatively greater than 300 cubic Å, or alternatively greater than 500 cubic Å.

For example, $(Ar_3C)_d^+$ can be $(Ph_3C)_d^+$, where Ph is a substituted or unsubstituted phenyl, such as substituted with $C_1$ to $C_{40}$ hydrocarbyls or substituted $C_1$ to $C_{40}$ hydrocarbyls, such as $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, v.71(11), November 1994, pp. 962-964, which is incorporated by reference herein. Molecular volume (MV), in units of cubic Å, is calculated using the formula: $MV=8.3V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of suitable bulky activators please see U.S. Pat. No. 8,658,556, which is incorporated by reference herein.

In another embodiment, one or more of the NCA activators is chosen from the activators described in U.S. Pat. No. 6,211,105.

In at least one embodiment, the activator is selected from one or more of a triaryl carbenium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis (perfluoronaphthyl)borate, triphenylcarbenium tetrakis (perfluorobiphenyl)borate, triphenylcarbenium tetrakis(3,5-bis(trifluoromethyl)phenyl)borate).

In another embodiment, the activator is selected from one or more of trialkylammonium tetrakis(pentafluorophenyl) borate, N,N-dialkylanilinium tetrakis(pentafluorophenyl) borate, dioctadecylmethylammonium tetrakis(pentafluorophenyl)borate, dioctadecylmethylammonium tetrakis (perfluoronaphthyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl) borate, N,N-dialkylanilinium tetrakis(perfluorobiphenyl) borate, trialkylammonium tetrakis(3,5-bis(trifluoromethyl) phenyl)borate, N,N-dialkylanilinium tetrakis(3,5-bis (trifluoromethyl)phenyl)borate, N,N-dialkyl-(2,4,6-trimethylanilinium) tetrakis(3,5-bis(trifluoromethyl)phenyl) borate, di-(i-propyl)ammonium tetrakis(pentafluorophenyl) borate, (where alkyl is methyl, ethyl, propyl, n-butyl, sec-butyl, or t-butyl).

Activators, such as ammonium or phosphonium metallate or metalloid activator compounds can comprising (1) ammonium or phosphonium groups and long-chain aliphatic hydrocarbyl groups and (2) metallate or metalloid anions, such as borates or aluminates. When used with one or more catalyst compounds described herein in an olefin polymerization, a polymer can be formed having high comonomer incorporation, low molecular weight, and or a melt temperature of about 120° C. or greater. In some embodiments, the activators can be soluble in aliphatic solvent.

In some embodiments, activator compounds can be represented by Formula (AI):

$$[R^1R^2R^3EH]_d^+[M^{k+}Q_n]^{d-} \quad (AI)$$

wherein:
E is nitrogen or phosphorous, preferably nitrogen;
d is 1, 2 or 3 (preferably 3); k is 1, 2, or 3 (preferably 3); n is 1, 2, 3, 4, 5, or 6 (preferably 4, 5, or 6); n−k=d (preferably d is 1, 2 or 3; k is 3; n is 4, 5, or 6, preferably when M is B, n is 4);

each of $R^1$, $R^2$, and $R^3$ is independently H, optionally substituted $C_1$-$C_{40}$ alkyl (such as branched or linear alkyl), or optionally substituted $C_5$-$C_{50}$-aryl (alternately each of $R^1$, $R^2$, and $R^3$ is independently unsubstituted or substituted with at least one of halide, $C_5$-$C_{50}$ aryl, $C_6$-$C_{35}$ arylalkyl, $C_6$-$C_{35}$ alkylaryl and, in the case of the $C_5$-$C_{50}$-aryl, $C_1$-$C_{50}$ alkyl); wherein $R^1$, $R^2$, and $R^3$ together comprise 15 or more carbon atoms, M is an element selected from group 13 of the Periodic Table of the Elements, preferably B or Al, preferably B; and each Q is independently selected from the group consisting of a hydrogen, bridged or unbridged dialkylamido, halide, alkoxy, substituted alkoxy, aryloxy, substituted aryloxy, hydrocarbyl, substituted hydrocarbyl, halocarbyl, substituted halocarbyl, and halosubstituted-hydrocarbyl radical, such as a fluorinated aryl group, such as fluoro-phenyl or fluoro-naphthyl, such as perfluorophenyl or perfluoronaphthyl.

In some embodiments of activator compounds represented by Formula (AI), at least one of $R^1$, $R^2$, and $R^3$ is a linear or branched $C_3$-$C_{40}$ alkyl group (alternately such as a linear or branched $C_7$ to $C_{40}$ alkyl group).

In some embodiments, the activator compounds can be represented by Formula (AII):

$$[R^1R^2R^3EH]^+[BR^4R^5R^6R^7]^-\qquad(AII)$$

where:

E is nitrogen or phosphorous, such as nitrogen;

each of $R^1$, $R^2$, and $R^3$ is independently $C_1$-$C_{40}$ linear or branched alkyl or $C_5$-$C_{50}$-aryl (such as $C_5$ to $C_{22}$), where each of $R^1$, $R^2$, and $R^3$ is independently unsubstituted or substituted with at least one of halide, $C_5$-$C_{50}$ aryl, $C_6$-$C_{35}$ arylalkyl, $C_6$-$C_{35}$ alkylaryl and, in the case of the $C_5$-$C_{50}$-aryl, $C_1$-$C_{50}$ alkyl; where $R^1$, $R^2$, and $R^3$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 40 or more carbon atoms); and each of $R^4$, $R^5$, $R^6$, and $R^7$ is phenyl or naphthyl, wherein at least one of $R^4$, $R^5$, $R^6$, and $R^7$ is substituted with from one to seven fluorine atoms.

In some embodiments, at least one of $R^1$, $R^2$, and $R^3$ is a linear or branched $C_3$-$C_{40}$ alkyl (such as a linear or branched $C_7$ to $C_{40}$ alkyl).

The cation component of the activators described herein (such as those of Formulas (AI) and (AII) above), can be a protonated Lewis base that can be capable of protonating a moiety, such as an alkyl or aryl, from the transition metal compound. Thus, upon release of a neutral leaving group (e.g. an alkane resulting from the combination of a proton donated from the cationic component of the activator and an alkyl substituent of the transition metal compound) transition metal cation results, which is the catalytically active species. In at least one embodiment of Formula (AI) or (AII), where the cation is $[R^1R^2R^3EH]^+$, E is nitrogen or phosphorous, preferably nitrogen; each of $R^1$, $R^2$, and $R^3$ is independently hydrogen, $C_1$-$C_{40}$ branched or linear alkyl or $C_5$-$C_{50}$-aryl, wherein each of $R^1$, $R^2$, and $R^3$ is independently unsubstituted or substituted with at least one of halide, $C_5$-$C_{50}$ aryl, $C_6$-$C_{35}$ arylalkyl, $C_6$-$C_{35}$ alkylaryl and, in the case of the $C_5$-$C_{50}$-aryl, $C_1$-$C_{50}$ alkyl; where $R^1$, $R^2$, and $R^3$ together comprise 15 or more carbon atoms, such as 18 or more carbon atoms, such as 20 or more carbon atoms, such as 22 or more carbon atoms, such as 25 or more carbon atoms, such as 30 or more carbon atoms, such as 35 or more carbon atoms, such as 37 or more carbon atoms, such as 40 or more carbon atoms, such as 45 or more carbon atoms.

The anion component of the activators described above can include those represented by the formula $[M^{k+}Q_n]$ where k is 1, 2, or 3; n is 1, 2, 3, 4, 5, or 6 (such as 1, 2, 3, or 4); M is an element selected from Group 13 of the Periodic Table of the Elements, such as boron or aluminum, and Q is independently a hydrogen, bridged or unbridged dialkylamido, halide, alkoxide, aryloxide, hydrocarbyl, substituted hydrocarbyl, halocarbyl, substituted halocarbyl, and halo-substituted-hydrocarbyl radicals, said Q having up to 20 carbon atoms with the proviso that in not more than 1 occurrence is Q a halide. In any embodiment of Formula (I) or (AT), each of $R^1$, $R^2$ and $R^3$ may independently be selected from:

1) optionally substituted linear alkyls (such as methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-icosyl, n-henicosyl, n-docosyl, n-tricosyl, n-tetracosyl, n-pentacosyl, n-hexacosyl, n-heptacosyl, n-octacosyl, n-nonacosyl, or n-tricontyl);

2) optionally substituted branched alkyls (such as alkyl-butyl, alkyl-pentyl, alkyl-hexyl, alkyl-heptyl, alkyl-octyl, alkyl-nonyl, alkyl-decyl, alkyl-undecyl, alkyl-dodecyl, alkyl-tridecyl, alkyl-butadecyl, alkyl-pentadecyl, alkyl-hexadecyl, alkyl-heptadecyl, alkyl-octadecyl, alkyl-nonadecyl, alkyl-icosyl (including multi-alkyl analogs, i.e, dialkyl-butyl, dialkyl-pentyl, dialkyl-hexyl, dialkyl-heptyl, dialkyl-octyl, dialkyl-nonyl, dialkyl-decyl, dialkyl-undecyl, dialkyl-dodecyl, dialkyl-tridecyl, dialkyl-butadecyl, dialkyl-pentadecyl, dialkyl-hexadecyl, dialkyl-heptadecyl, dialkyl-octadecyl, dialkyl-nonadecyl, dialkyl-icosyl, trialkyl-butyl, trialkyl-pentyl, trialkyl-hexyl, trialkyl-heptyl, trialkyl-octyl, trialkyl-nonyl, trialkyl-decyl, trialkyl-undecyl, trialkyl-dodecyl, trialkyl-tridecyl, trialkyl-butadecyl, trialkyl-pentadecyl, trialkyl-hexadecyl, trialkyl-heptadecyl, trialkyl-octadecyl, trialkyl-nonadecyl, and trialkyl-icosyl, etc.), and isomers thereof where each alkyl group is independently a $C_1$ to $C_{40}$, (alternately $C_2$ to $C_{30}$, alternately $C_3$ to $C_{20}$) linear, branched or cyclic alkyl group), preferably the alkyl group is methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, or tricontyl);

3) optionally substituted arylalkyls, such as (methylphenyl, ethylphenyl, propylphenyl, butylphenyl, pentylphenyl, hexylphenyl, heptylphenyl, octylphenyl, nonylphenyl, decylphenyl, undecylphenyl, dodecylphenyl, tridecylphenyl, tetradecylphenyl, pentadecylphenyl, hexadecylphenyl, heptadecylphenyl, octadecylphenyl, nonadecylphenyl, icosylphenyl, henicosylphenyl, docosylphenyl, tricosylphenyl, tetracosylphenyl, pentacosylphenyl, hexacosylphenyl, heptacosylphenyl, octacosylphenyl, nonacosylphenyl, tricontylphenyl, 3,5,5-trimethylhexylphenyl, dioctylphenyl, 3,3,5-trimethylhexylphenyl, 2,2,3,3,4 pentamethypentylylphenyl, and the like);

4) optionally substituted silyl groups, such as a trialkylsilyl group, where each alkyl is independently an optionally substituted $C_1$ to $C_{20}$ alkyl (such as trimethylsilyl, triethylsilyl, tripropylsilyl, tributylsilyl, trihexylsilyl, triheptylsilyl, trioctylsilyl, trinonylsilyl, tridecylsilyl, triundecylsilyl, tri-dodecylsilyl, tri-tridecylsilyl, tri-tetradecylsilyl, tri-pentadecylsilyl, tri-hexadecylsilyl, tri-heptadecylsilyl, tri-octadecylsilyl, tri-nonadecylsilyl, tri-icosylsilyl);

5) optionally substituted alkoxy groups (such as —OR*, where R* is an optionally substituted $C_1$ to $C_{20}$ alkyl or aryl (such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, phenyl, alkylphenyl (such as methyl phenyl, propyl phenyl, etc.), naphthyl, or anthracenyl);

6) halogens (such as Br or Cl); and 7) halogen containing groups (such as bromomethyl, bromophenyl, and the like).

In any embodiment of Formula (I) or (AI), $R^1$ is methyl.

In any embodiment of Formula (I) or (AI), $R^2$ is unsubstituted phenyl or substituted phenyl. In at least one embodiment, $R^2$ is phenyl, methyl phenyl, n-butyl phenyl, n-octadecyl-phenyl, or an isomer thereof, preferably $R^2$ is meta or para substituted phenyl, such as meta- or para-substituted alkyl substituted phenyl.

In any embodiment of Formula (I) or (AI), $R^3$ is linear or branched alkyl such as methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-icosyl, n-henicosyl, n-docosyl, n-tricosyl, n-tetracosyl, n-pentacosyl, n-hexacosyl, n-heptacosyl, n-octacosyl, n-nonacosyl, n-tricontyl, isopropyl, isobutyl, isopentyl, isohexyl, isoheptyl, isooctyl, isononyl, isodecyl, isoundecyl, isododecyl, isotridecyl, isotetradecyl, isopentadecyl, isohexadecyl, isoheptadecyl, isooctadecyl, isononadecyl, isoicosyl, isohenicosyl, isodocosyl, isotricosyl, isotetracosyl, isopentacosyl, isohexacosyl, isoheptacosyl, isooctacosyl, isononacosyl, or isotricontyl, alkyl-butyl, alkyl-pentyl, alkyl-hexyl, alkyl-heptyl, alkyl-octyl, alkyl-nonyl, alkyl-decyl, alkyl-undecyl, alkyl-dodecyl, alkyl-tridecyl, alkyl-butadecyl, alkyl-pentadecyl, alkyl-hexadecyl, alkyl-heptadecyl, alkyl-octadecyl, alkyl-nonadecyl, alkyl-icosyl (including multi-alkyl analogs, i.e, dialkyl-butyl, dialkyl-pentyl, dialkyl-hexyl, dialkyl-heptyl, dialkyl-octyl, dialkyl-nonyl, dialkyl-decyl, dialkyl-undecyl, dialkyl-dodecyl, dialkyl-tridecyl, dialkyl-butadecyl, dialkyl-pentadecyl, dialkyl-hexadecyl, dialkyl-heptadecyl, dialkyl-octadecyl, dialkyl-nonadecyl, dialkyl-icosyl, trialkyl-butyl, trialkyl-pentyl, trialkyl-hexyl, trialkyl-heptyl, trialkyl-octyl, trialkyl-nonyl, trialkyl-decyl, trialkyl-undecyl, trialkyl-dodecyl, trialkyl-tridecyl, trialkyl-butadecyl, trialkyl-pentadecyl, trialkyl-hexadecyl, trialkyl-heptadecyl, trialkyl-octadecyl, trialkyl-nonadecyl, and trialkyl-icosyl), and isomers thereof where each alkyl group is independently a $C_1$ to $C_{40}$, (alternately $C_2$ to $C_{30}$, alternately $C_3$ to $C_{20}$) linear, branched or cyclic alkyl group, preferably the alkyl group is methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, or tricontyl). Useful cation components in Formulas (AI) or (I) include those represented by the formula:

1

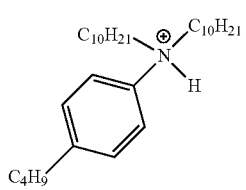

2

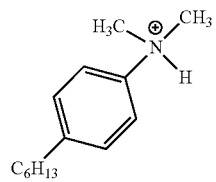

3

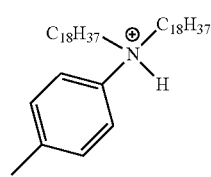

4

5

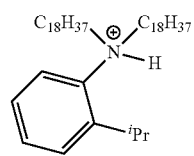

6

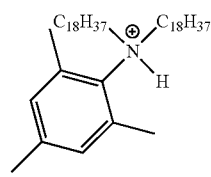

7

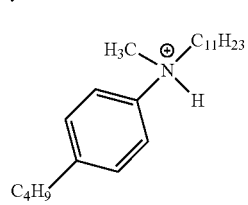

8

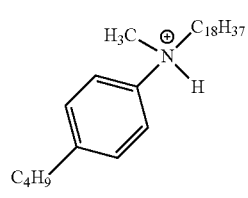

9

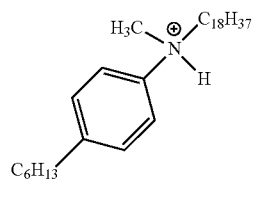

10

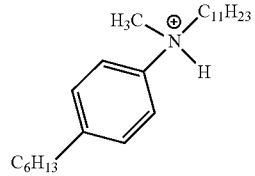

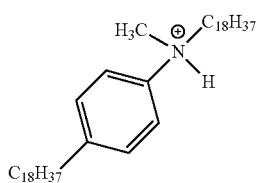
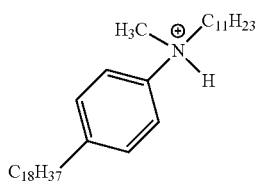
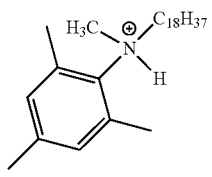
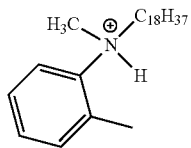
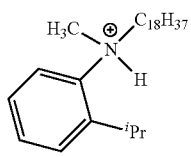
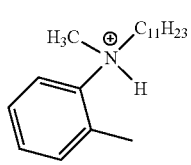
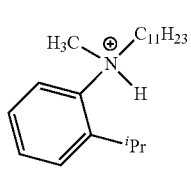
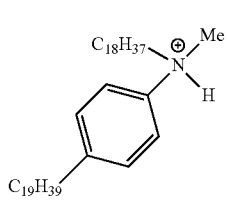
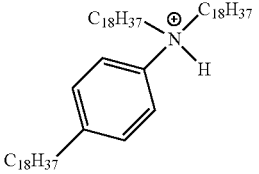
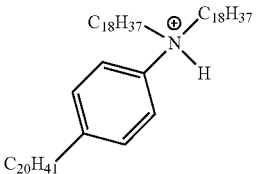
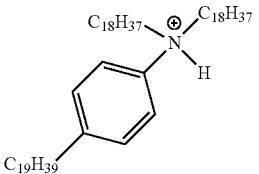
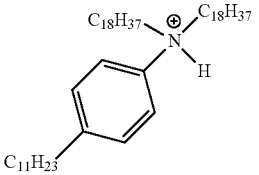
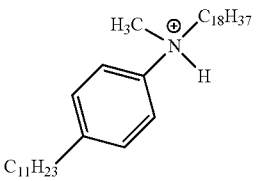
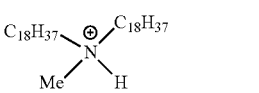
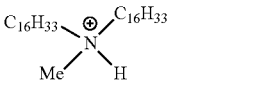
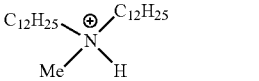
Useful cation components in Formulas (AI) or (I) include those represented by the formula:
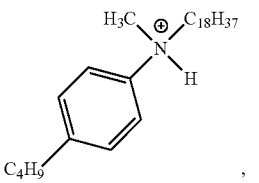 , 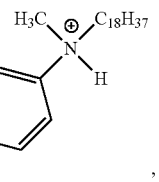 ,

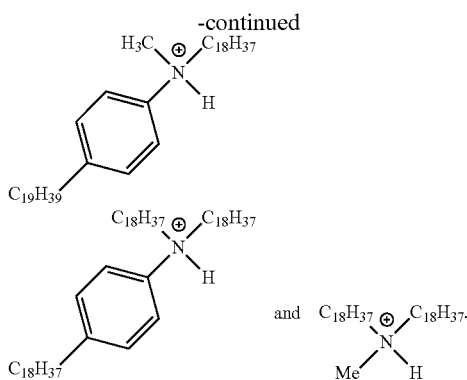

Activator compounds can include one or more of:
N,N-di(hydrogenated tallow)methylammonium [tetrakis (perfluorophenyl)borate],
N-methyl-4-nonadecyl-N-octadecylanilinium [tetrakis(perfluorophenyl)borate],
N-methyl-4-hexadecyl-N-octadecylanilinium [tetrakis(perfluorophenyl)borate],
N-methyl-4-tetradecyl-N-octadecylanilinium [tetrakis(perfluorophenyl)borate],
N-methyl-4-dodecyl-N-octadecylanilinium [tetrakis(perfluorophenyl)borate],
N-methyl-4-decyl-N-octadecylanilinium [tetrakis(perfluorophenyl)borate],
N-methyl-4-octyl-N-octadecylanilinium [tetrakis(perfluorophenyl)borate],
N-methyl-4-hexyl-N-octadecylanilinium [tetrakis(perfluorophenyl)borate],
N-methyl-4-butyl-N-octadecylanilinium [tetrakis(perfluorophenyl)borate],
N-methyl-4-octadecyl-N-decylanilinium [tetrakis(perfluorophenyl)borate],
N-methyl-4-nonadecyl-N-dodecylanilinium [tetrakis(perfluorophenyl)borate],
N-methyl-4-nonadecyl-N-tetradecylanilinium [tetrakis(perfluorophenyl)borate],
N-methyl-4-nonadecyl-N-hexadecylanilinium [tetrakis(perfluorophenyl)borate],
N-ethyl-4-nonadecyl-N-octadecylanilinium [tetrakis(perfluorophenyl)borate],
N-methyl-N,N-dioctadecylammonium [tetrakis(perfluorophenyl)borate],
N-methyl-N,N-dihexadecylammonium [tetrakis(perfluorophenyl)borate],
N-methyl-N,N-ditetradecylammonium [tetrakis(perfluorophenyl)borate],
N-methyl-N,N-didodecylammonium [tetrakis(perfluorophenyl)borate],
N-methyl-N,N-didecylammonium [tetrakis(perfluorophenyl)borate],
N-methyl-N,N-dioctylammonium [tetrakis(perfluorophenyl)borate],
N-ethyl-N,N-dioctadecylammonium [tetrakis(perfluorophenyl)borate],
N,N-di(octadecyl)tolylammonium [tetrakis(perfluorophenyl)borate],
N,N-di(hexadecyl)tolylammonium [tetrakis(perfluorophenyl)borate],
N,N-di(tetradecyl)tolylammonium [tetrakis(perfluorophenyl)borate],
N,N-di(dodecyl)tolylammonium [tetrakis(perfluorophenyl)borate],
N-octadecyl-N-hexadecyl-tolylammonium [tetrakis(perfluorophenyl)borate],
N-octadecyl-N-hexadecyl-tolylammonium [tetrakis(perfluorophenyl)borate],
N-octadecyl-N-tetradecyl-tolylammonium [tetrakis(perfluorophenyl)borate],
N-octadecyl-N-dodecyl-tolylammonium [tetrakis(perfluorophenyl)borate],
N-octadecyl-N-decyl-tolylammonium [tetrakis(perfluorophenyl)borate],
N-hexadecyl-N-tetradecyl-tolylammonium [tetrakis(perfluorophenyl)borate],
N-hexadecyl-N-dodecyl-tolylammonium [tetrakis(perfluorophenyl)borate],
N-hexadecyl-N-decyl-tolylammonium [tetrakis(perfluorophenyl)borate],
N-tetradecyl-N-dodecyl-tolylammonium [tetrakis(perfluorophenyl)borate],
N-tetradecyl-N-decyl-tolylammonium [tetrakis(perfluorophenyl)borate],
N-dodecyl-N-decyl-tolylammonium [tetrakis(perfluorophenyl)borate],
N-methyl-N-octadecylanilinium [tetrakis(perfluorophenyl) borate],
N-methyl-N-hexadecylanilinium [tetrakis(perfluorophenyl) borate],
N-methyl-N-tetradecylanilinium [tetrakis(perfluorophenyl) borate],
N-methyl-N-dodecylanilinium [tetrakis(perfluorophenyl) borate],
N-methyl-N-decylanilinium [tetrakis(perfluorophenyl)borate], and
N-methyl-N-octylanilinium [tetrakis(perfluorophenyl)borate].

Suitable activator-to-catalyst ratio, e.g., all NCA activators-to-catalyst ratio may be about a 1:1 molar ratio. Alternate ranges include from 0.1:1 to 100:1, alternatively from 0.5:1 to 200:1, alternatively from 1:1 to 500:1, alternatively from 1:1 to 1000:1. A particularly useful range is from 0.5:1 to 10:1, such as 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 1994/007928; and WO 1995/014044 which discuss the use of an alumoxane in combination with an ionizing activator).

Useful chain transfer agents can be hydrogen, alkylalumoxanes, a compound represented by the formula $AlR_3$, $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Furthermore, a catalyst system of the present disclosure may include a metal hydrocarbenyl chain transfer agent represented by the formula:

$$Al(R')_{3-v}(R'')_v$$

where each R' can be independently a $C_1$-$C_{30}$ hydrocarbyl group, and/or each R'', can be independently a $C_4$-$C_{20}$ hydrocarbenyl group having an end-vinyl group; and v can be from 0.1 to 3.

Optional Scavengers or Coactivators

In addition to these activator compounds, scavengers or coactivators may be used. Aluminum alkyl or alumoxane compounds which may be utilized as scavengers or coactivators may include, for example, trimethylaluminum, triethylaluminum, triisobutylaluminum, tri-n-hexylaluminum, tri-n-octylaluminum, diisobutylaluminum hydride, and diethyl zinc.

Chain transfer agents may be used in the compositions and/or processes described herein. Useful chain transfer agents are typically alkylalumoxanes, a compound represented by the formula $AlR_3$, $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Optional Support Materials

In embodiments herein, the catalyst system may include an inert support material. The supported material can be a porous support material, for example, talc, and inorganic oxides. Other support materials include zeolites, clays, organoclays, or another organic or inorganic support material, or mixtures thereof.

The support material can be an inorganic oxide in a finely divided form. Suitable inorganic oxide materials for use in catalyst systems herein may include groups 2, 4, 13, and 14 metal oxides, such as silica, alumina, and mixtures thereof. Other inorganic oxides that may be employed either alone or in combination with the silica, or alumina can be magnesia, titania, zirconia. Other suitable support materials, however, can be employed, for example, finely divided functionalized polyolefins, such as finely divided polyethylene. Examples of suitable supports may include magnesia, titania, zirconia, montmorillonite, phyllosilicate, zeolites, talc, clays. Also, combinations of these support materials may be used, for example, silica-chromium, silica-alumina, silica-titania. In at least one embodiment, the support material is selected from $Al_2O_3$, $ZrO_2$, $SiO_2$, $SiO_2/Al_2O_3$, $SiO_2/TiO_2$, silica clay, silicon oxide/clay, or mixtures thereof.

The support material, such as an inorganic oxide, can have a surface area in the range of from about 10 $m^2/g$ to about 700 $m^2/g$, pore volume in the range of from about 0.1 $cm^3/g$ to about 4.0 $cm^3/g$ and average particle size in the range of from about 5 µm to about 500 m. The surface area of the support material can be in the range of from about 50 $m^2/g$ to about 500 $m^2/g$, pore volume of from about 0.5 $cm^3/g$ to about 3.5 $cm^3/g$ and average particle size of from about 10 µm to about 200 µm. For example, the surface area of the support material is in the range is from about 100 $m^2/g$ to about 400 $m^2/g$, pore volume from about 0.8 $cm^3/g$ to about 3.0 $cm^3/g$ and average particle size is from about 5 µm to about 100 µm. The average pore size of the support material useful in the present disclosure is in the range of from 10 Å to 1000 Å, such as 50 Å to about 500 Å, and such as 75 Å to about 350 Å. In at least one embodiment, the support material is a high surface area, amorphous silica (surface area=300 $m^2/gm$; pore volume of 1.65 $cm^3/gm$). For example, suitable silicas can be the silicas marketed under the tradenames of DAVISON™ 952 or DAVISON™ 955 by the Davison Chemical Division of W.R. Grace and Company. In other embodiments, DAVISON™ 948 is used. Alternatively, a silica can be ES-70™ silica (PQ Corporation, Malvern, Pa.) that has been calcined, for example (such as at 875° C.).

The support material should be dry, that is, free of absorbed water. Drying of the support material can be effected by heating or calcining at about 100° C. to about 1,000° C., such as at least about 600° C. When the support material is silica, it is heated to at least 200° C., such as about 200° C. to about 850° C., and such as at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of the present disclosure. The calcined support material is then contacted with at least one polymerization catalyst comprising at least one catalyst compound and an activator.

The support material, having reactive surface groups, such as hydroxyl groups, is slurried in a non-polar solvent and the resulting slurry is contacted with a solution of a catalyst compound and an activator. In at least one embodiment, the slurry of the support material is first contacted with the activator for a period of time in the range of from about 0.5 hour to about 24 hours, from about 2 hours to about 16 hours, or from about 4 hours to about 8 hours. The solution of the catalyst compound is then contacted with the isolated support/activator. In at least one embodiment, the supported catalyst system is generated in situ. In alternate embodiment, the slurry of the support material is first contacted with the catalyst compound for a period of time in the range of from about 0.5 hour to about 24 hours, from about 2 hours to about 16 hours, or from about 4 hours to about 8 hours. The slurry of the supported catalyst compound is then contacted with the activator solution.

The mixture of the catalyst, activator and support is heated from about 0° C. to about 70° C., such as from about 23° C. to about 60° C., such as at room temperature. Contact times can be from about 0.5 hours to about 24 hours, such as from about 2 hours to about 16 hours, or from about 4 hours to about 8 hours.

Suitable non-polar solvents are materials in which all of the reactants used herein, e.g., the activator and the catalyst compound, are at least partially soluble and which are liquid at reaction temperatures. Non-polar solvents can be alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Polymerization Processes

The present disclosure relates to polymerization processes where monomer (e.g., ethylene; propylene), and optionally comonomer, are contacted with a catalyst system including an activator and at least one catalyst compound, as described above. The catalyst compound and activator may be combined in any order. The catalyst compound and activator may be combined prior to contacting with the monomer. Alternatively the catalyst compound and activator may be introduced into the polymerization reactor separately, wherein they subsequently react to form the active catalyst.

Monomers include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer includes ethylene and an optional comonomer comprising one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups. In another embodiment, the monomer includes propylene and an optional comonomer comprising one or more ethylene or $C_4$ to $C_{40}$ olefins, such as $C_4$ to $C_{20}$ olefins, such as $C_6$ to $C_1$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers may include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, ethylidenenorbornene, vinylnorbornene, norbornene, norbornadiene, and their respective homologs and derivatives, such as norbornene, norbornadiene, and dicyclopentadiene.

In at least one embodiment, one or more dienes are present in the polymer produced herein at up to 10 weight %, such as at 0.00001 to 1.0 weight %, such as 0.002 to 0.5 weight %, such as 0.003 to 0.2 weight %, based upon the total weight of the composition. In at least one embodiment 500 ppm or less of diene is added to the polymerization, such as 400 ppm or less, such as 300 ppm or less. In other embodiments at least 50 ppm of diene is added to the polymerization, or 100 ppm or more, or 150 ppm or more.

Suitable diolefin monomers useful in this present disclosure include any hydrocarbon structure, such as $C_4$ to $C_{30}$, having at least two unsaturated bonds, wherein at least two of the unsaturated bonds are readily incorporated into a polymer by either a stereo-specific or a non-stereospecific catalyst(s). The diolefin monomers can be selected from alpha, omega-diene monomers (i.e. di-vinyl monomers). The diolefin monomers can be linear di-vinyl monomers, such as those containing from 4 to 30 carbon atoms. Examples of suitable dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, such as dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1,000 g/mol). Suitable cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes of the present disclosure can be carried out in any suitable manner. Any suitable suspension, homogeneous, bulk, solution, slurry, or gas phase polymerization process can be used. Such processes can be run in a batch, semi-batch, or continuous mode. Homogeneous polymerization processes and slurry processes can be employed. (A homogeneous polymerization process is defined to be a process where at least 90 wt % of the product is soluble in the reaction media.) A homogeneous polymerization process can be a bulk homogeneous process. (A bulk process is defined to be a process where monomer concentration in all feeds to the reactor is 70 volume % or more.) Alternatively, no solvent or diluent is present or added in the reaction medium, (except for the small amounts used as the carrier for the catalyst system or other additives, or amounts found with the monomer; e.g., propane in propylene). In another embodiment, the process is a slurry process. As used herein, the term "slurry polymerization process" means a polymerization process performed in a hydrocarbon solvent where a supported catalyst is employed and monomers are polymerized on the supported catalyst particles at a temperature that is below the melting point of the polymer produced. At least 95 wt % of polymer products derived from the supported catalyst are in granular form as solid particles (not dissolved in the diluent).

Suitable diluents/solvents for polymerization may include non-coordinating, inert liquids. Examples of diluents/solvents for polymerization may include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$ to $C_{10}$ alkanes, chlorobenzene, and aromatic and alkylsubstituted aromatic compounds, such as benzene, toluene, mesitylene, and xylene. Suitable solvents may also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, such as aromatics are present in the solvent at less than 1 wt %, such as less than 0.5 wt %, such as less than 0 wt % based upon the weight of the solvents.

In at least one embodiment, the feed concentration of the monomers and comonomers for the polymerization is 60 vol % solvent or less, such as 40 vol % or less, such as 20 vol % or less, based on the total volume of the feedstream. In at least one embodiment, the polymerization is run in a bulk process.

Polymerizations can be run at any temperature and/or pressure suitable to obtain the desired polymers. Typical temperatures and/or pressures include a temperature in the range of from about 0° C. to about 300° C., such as about 20° C. to about 200° C., such as about 35° C. to about 160° C., such as from about 80° C. to about 160° C., such as from about 90° C. to about 140° C.; and at a pressure in the range of from about 0.1 MPa to about 25 MPa, such as from about 0.45 MPa to about 6 MPa, or from about 0.5 MPa to about 4 MPa.

In a suitable polymerization, the run time of the reaction can be up to 300 minutes, such as from about 5 minutes to 250 minutes, such as from about 10 minutes to 120 minutes, such as from about 20 minutes to 90 minutes, such as from about 30 minutes to 60 minutes. In a continuous process, the run time may be the average residence time of the reactor.

In at least one embodiment, hydrogen is present in the polymerization reactor at a partial pressure of 0.001 psig to 50 psig (0.007 kPa to 345 kPa), such as from 0.01 psig to 25 psig (0.07 kPa to 172 kPa), such as from 0.1 psig to 10 psig (0.7 kPa to 70 kPa).

In at least one embodiment, little or no alumoxane is used in the process to produce the polymers. For example, alumoxane can be present at zero mol %, alternatively the alumoxane can be present at a molar ratio of aluminum to transition metal less than 500:1, such as less than 300:1, such as less than 100:1, such as less than 1:1.

In at least one embodiment, the polymerization: 1) is conducted at temperatures of 0° C. to 300° C. (such as 25° C. to 250° C., such as 80° C. to 160° C., such as 100° C. to 140° C.); 2) is conducted at a pressure of atmospheric pressure to 10 MPa (such as 0.35 MPa to 10 MPa, such as from 0.45 MPa to 6 MPa, such as from 0.5 MPa to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; such as where aromatics are present in the solvent at less than 1 wt %, such as less than 0.5 wt %, such as at 0 wt % based upon the weight of the solvents); 4) wherein the catalyst system used in the polymerization comprises less than 0.5 mol %, such as 0 mol % alumoxane, alternatively the alumoxane is present at a molar ratio of aluminum to transition metal less than 500:1, such as less than 300:1, such as less than 100:1, such as less than 1:1; 5) the polymerization occurs in one reaction zone; 6) optionally scavengers (such as trialkyl aluminum compounds) are absent (e.g., present at zero mol %, alternatively the scavenger is present at a molar ratio of scavenger metal to transition metal of less than 100:1, such as less than 50:1, such as less than 15:1, such as less than 10:1); and 7) optionally hydrogen is present in the polymerization reactor at a partial pressure of 0.001 psig to 50 psig (0.007 kPa to 345 kPa) (such as from 0.01 psig to 25 psig (0.07 kPa to 172 kPa), such as 0.1 psig to 10 psig (0.7 kPa to 70 kPa)). In at least one embodiment, the catalyst system used in the polymerization includes no more than one catalyst compound. A "reaction zone" also referred to as a "polymerization zone" is a vessel where polymerization takes place, for example a stirred-tank reactor or a loop reactor. When multiple reactors are used in a continuous polymerization process, each reactor is considered as a separate polymerization zone. For a multi-stage polymerization in a batch polymerization process, each polymerization stage is considered as a separate polymerization zone. In at least one embodiment, the polymerization occurs in one reaction zone. Room temperature is 23° C. unless otherwise noted.

In at least one embodiment, the present disclosure provides a process for the production of an ethylene based polymer comprising: polymerizing ethylene by contacting the ethylene with the catalyst system of the present disclosure described above in one or more continuous stirred tank reactors or loop reactors, in series or in parallel, at a reactor pressure of from 0.05 MPa to 1,500 MPa and a reactor temperature of from 30° C. to 230° C. to form an ethylene based polymer. In at least one embodiment, hydrogen is present in the polymerization reactor at a partial pressure of from about 5 psig to about 300 psig, such as from about 10 psig to about 250 psig, such as from about 20 psig to about 200 psig, such as from about 30 psig to about 150 psig, such as from about 50 psig to about 100 psig (e.g., 75 psig). In at least one embodiment, the activity of the catalyst is at least 1,000 gP·mmolcat$^{-1}$·h$^{-1}$, such as from about 1,000 gP·mmolcat$^{-1}$·h$^{-1}$ to about 10,000,000 gP·mmolcat$^{-1}$·h$^{-1}$, such as from about 1,500 gP·mmolcat$^{-1}$·h$^{-1}$ to about 8,000,000 gP·mmolcat$^{-1}$·h$^{-1}$, such as from about 1,800 gP·mmolcat$^{-1}$·h$^{-1}$ to about 1,000,000 gP·mmolcat$^{-1}$·h$^{-1}$, alternatively from about 10,000 gP·mmolcat$^{-1}$·h$^{-1}$ to about 8,000,000 gP·mmolcat$^{-1}$·h$^{-1}$.

In another embodiment, the present disclosure provides a process for the production of propylene based polymer comprising: polymerizing propylene by contacting the propylene with the catalyst system of the present disclosure described above in one or more continuous stirred tank reactors or loop reactors, in series or in parallel, at a reactor pressure of from 0.5 MPa to 1,500 MPa and a reactor temperature of from 30° C. to 230° C. to form a propylene based polymer. In at least one embodiment, hydrogen is present in the polymerization reactor at a partial pressure from about 10 psig to about 300 psig, such as from about 20 psig to about 250 psig, such as from about 30 psig to about 200 psig, such as from about 40 psig to about 150 psig, such as from about 50 psig to about 100 psig (e.g., 75 psig). In at least one embodiment, the activity of the catalyst is at least 1,000 gP·mmolcat$^{-1}$·h$^{-1}$, such as from 1,000 gP·mmolcat$^{-1}$·h$^{-1}$ to about 1,000,000 gP·mmolcat$^{-1}$·h$^{-1}$, such as from 2,000 gP·mmolcat$^{-1}$·h$^{-1}$ to about 3,000 gP·mmolcat$^{-1}$·h$^{-1}$, alternatively from 10,000 gP·mmolcat$^{-1}$·h$^{-1}$ to about 750,000 gP·mmolcat$^{-1}$·h$^{-1}$, such as from 50,000 gP·mmolcat$^{-1}$·h$^{-1}$ to about 500,000 gP·mmolcat$^{-1}$·h$^{-1}$, such as from 100,000 gP·mmolcat$^{-1}$·h$^{-1}$ to about 250,000 gP·mmolcat$^{-1}$·h$^{-1}$, alternatively from about 1,000,000 gP·mmolcat$^{-1}$·h$^{-1}$ to about 6,000,000 gP·mmolcat$^{-1}$·h$^{-1}$, such as from about 2,000,000 gP·mmolcat$^{-1}$·h$^{-1}$ to about 4,000,000 gP·mmolcat$^{-1}$·h$^{-1}$.

In another embodiment, the present disclosure provides a process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system described above in one or more continuous stirred tank reactors or loop reactors, in series or in parallel, at a reactor pressure of from 0.05 MPa to 1,500 MPa and a reactor temperature of from 30° C. to 230° C. to form an ethylene alpha-olefin copolymer. In at least one embodiment, hydrogen is present in the polymerization reactor at a partial pressure of from about 10 psig to about 300 psig, such as from about 20 psig to about 250 psig, such as from about 30 psig to about 200 psig, such as from about 40 psig to about 150 psig, such as from about 50 psig to about 100 psig (e.g., 75 psig), alternatively from about 150 psig to about 300 psig (e.g., 200 psig). In at least one embodiment, the activity of the catalyst is at least 1,000 gP·mmolcat$^{-1}$·h$^{-1}$, such as from about 1,000 gP·mmolcat$^{-1}$·h$^{-1}$ to about 10,000,000 gP·mmolcat$^{-1}$·h$^{-1}$, such as from about 1,500 gP·mmolcat$^{-1}$·h$^{-1}$ to about 8,000,000 gP·mmolcat$^{-1}$·h$^{-1}$, such as from about 1,800 gP·mmolcat$^{-1}$·h$^{-1}$ to about 1,000,000 gP·mmolcat$^{-1}$·h$^{-1}$, alternatively from about 10,000 gP·mmolcat$^{-1}$·h$^{-1}$ to about 8,000,000 gP·mmolcat$^{-1}$·h$^{-1}$.

In another embodiment, the present disclosure provides a process for the production of a propylene alpha-olefin copolymer comprising: polymerizing propylene and at least one ethylene and or at least one $C_4$-$C_{20}$ alpha-olefin by contacting the propylene and the at least one ethylene and or at least one $C_3$-$C_{20}$ alpha-olefin with a catalyst system described above in one or more continuous stirred tank reactors or loop reactors, in series or in parallel, at a reactor pressure of from 0.05 MPa to 1,500 MPa and a reactor temperature of from 30° C. to 230° C. to form an ethylene alpha-olefin copolymer. In at least one embodiment, hydrogen is present in the polymerization reactor at a partial pressure of from about 10 psig to about 300 psig, such as from about 20 psig to about 250 psig, such as from about 30 psig to about 200 psig, such as from about 40 psig to about 150 psig, such as from about 50 psig to about 100 psig (e.g., 75 psig), alternatively from about 150 psig to about 300 psig (e.g., 200 psig). In at least one embodiment, the activity of the catalyst is at least 1,000 gP·mmolcat$^{-1}$·h$^{-1}$, such as from about 1,000 gP·mmolcat$^{-1}$·h$^{-1}$ to about 10,000,000 gP·mmolcat$^{-1}$·h$^{-1}$, such as from about 1,500 gP·mmolcat$^{-1}$·h$^{-1}$ to about 8,000,000 gP·mmolcat$^{-1}$·h$^{-1}$, such as from about 1,800 gP·mmolcat$^{-1}$·h$^{-1}$ to about 1,000,000 gP·mmolcat$^{-1}$·h$^{-1}$, alternatively from about 10,000 gP·mmolcat$^{-1}$·h$^{-1}$ to about 8,000,000 gP·mmolcat$^{-1}$·h$^{-1}$.

In at least one embodiment, the conversion of olefin monomer is at least 10%, based upon polymer yield and the weight of the monomer entering the reaction zone, such as 20% or more, such as 30% or more, such as 50% or more, such as 80% or more.

In at least one embodiment, little or no alumoxane is used in the process to produce the polymers. For example, alumoxane is present at zero mol %, alternatively the alumoxane is present at a molar ratio of aluminum to transition metal less than 500:1, such as less than 300:1, such as less than 100:1, such as less than 1:1.

In at least one embodiment, little or no scavenger is used in the process to produce the ethylene polymer. For example, scavenger (such as tri alkyl aluminum) is present at zero mol %, alternatively the scavenger is present at a molar ratio of scavenger metal to transition metal of less than 100:1, such as less than 50:1, such as less than 15:1, such as less than 10:1.

Other additives may also be used in the polymerization, as desired, such as one or more scavengers, hydrogen, aluminum alkyls, or chain transfer agents.

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

Slurry Phase Polymerization

A slurry polymerization process generally operates between 1 to about 50 atmosphere pressure range (15 psi to 735 psi, 103 kPa to 5,068 kPa) or even greater and temperatures in the range of 0° C. to about 120° C. In a slurry polymerization, a suspension of solid, particulate polymer is formed in a liquid polymerization diluent medium to which monomer and comonomers, along with catalysts, are added. The suspension including diluent is intermittently or continuously removed from the reactor where the volatile components are separated from the polymer and recycled, optionally after a distillation, to the reactor. The liquid diluent used in the polymerization medium is typically an alkane having from 3 to 7 carbon atoms, such as a branched alkane. The medium employed should be liquid under the conditions of polymerization and relatively inert. When a propane medium is used, the process must be operated above the reaction diluent critical temperature and pressure. For example, a hexane or an isobutane medium is employed.

In at least one embodiment, a polymerization process is a particle form polymerization, or a slurry process, where the temperature is kept below the temperature at which the polymer goes into solution. Such technique is well known in the art, and described for instance U.S. Pat. No. 3,248,179 which is fully incorporated herein by reference. The temperature in the particle form process can be from about 85° C. to about 110° C. Two example polymerization methods for the slurry process are those using a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isohexane or as a dry free flowing powder, is injected regularly to the reactor loop, which is itself filled with circulating slurry of growing polymer particles in a diluent of isohexane containing monomer and optional comonomer. Hydrogen, optionally, may be added as a molecular weight control. (In one embodiment hydrogen is added from 50 ppm to 500 ppm, such as from 100 ppm to 400 ppm, such as 150 ppm to 300 ppm.)

The reactor may be maintained at a pressure of 2,000 kPa to 5,000 kPa, such as from 3,620 kPa to 4,309 kPa, and at a temperature of from about 60° C. to about 120° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isohexane diluent and all unreacted monomer and comonomer. The resulting hydrocarbon free powder is then compounded for use in various applications.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Useful chain transfer agents are typically alkylalumoxanes, a compound represented by the formula AlR$_3$, ZnR$_2$ (where each R is, independently, a C$_1$-C$_8$ hydrocarbyl, such as methyl, ethyl, propyl, butyl, penyl, hexyl octyl or an isomer thereof). Examples can include diethyl zinc, methylalumoxane, trimethylaluminum, triisobutylaluminum, trioctylaluminum, or a combination thereof.

Solution Polymerization

In at least one embodiment, the polymerization process with catalyst compounds of the present disclosure is a solution polymerization process.

A solution polymerization is a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are not turbid as described in Oliveira, J. V. et al. (2000) *Ind. Eng, Chem. Res.* v.29, pg. 4627. Solution polymerization may involve polymerization in a continuous reactor in which the polymer formed, the starting monomer and catalyst materials supplied are agitated to reduce or avoid concentration gradients and in which the monomer acts as a diluent or solvent or in which a hydrocarbon is used as a diluent or solvent. Suitable processes can operate at temperatures from about 0° C. to about 250° C., such as from about 50° C. to about 170° C., such as from about 80° C. to about 150° C., such as from about 100° C. to about 140° C., and/or at pressures of about 0.1 MPa or more, such as 2 MPa or more. The upper pressure limit is not critically constrained but can be about 200 MPa or less, such as 120 MPa or less, such as 30 MPa or less. Temperature control in the reactor can generally be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The purity, type, and amount of solvent can be optimized for the maximum catalyst productivity for a particular type of polymerization. The solvent can be also introduced as a catalyst carrier. The solvent can be introduced as a gas phase or as a liquid phase depending on the pressure and temperature. Advantageously, the solvent can be kept in the liquid phase and introduced as a liquid. Solvent can be introduced in the feed to the polymerization reactors.

A process described herein can be a solution polymerization process that may be performed in a batchwise fashion (e.g., batch; semi-batch) or in a continuous process. Suitable reactors may include tank, loop, and tube designs. In at least one embodiment, the process is performed in a continuous fashion and dual loop reactors in a series configuration are used. In at least one embodiment, the process is performed in a continuous fashion and dual continuous stirred-tank reactors (CSTRs) in a series configuration are used. Furthermore, the process can be performed in a continuous fashion and a tube reactor can be used. In another embodiment, the process is performed in a continuous fashion and one loop reactor and one CSTR are used in a series configuration. The process can also be performed in a batchwise fashion and a single stirred tank reactor can be used.

Polyolefin Products

The present disclosure relates to compositions of matter produced by the methods described herein.

In at least one embodiment, a process described herein produces $C_2$ to $C_{20}$ olefin homopolymers (e.g., polyethylene; polypropylene), or $C_2$ to $C_{20}$ olefin copolymers (e.g., ethylene-octene, ethylene-propylene) and/or propylene-alpha-olefin copolymers, such as $C_3$ to $C_{20}$ copolymers (such as propylene-hexene copolymers or propylene-octene copolymers). In at least one embodiment, a process described herein produces $C_3$ to $C_{20}$ isotactic olefin homopolymers, such as isotactic polypropylene, such as highly isotactic polypropylene.

The term "isotactic" is defined as having at least 20% or more isotactic pentads according to analysis by $^{13}C$ NMR.

In at least one embodiment, an ethylene based polymer (homopolymer) has one or more of: an Mw value of 5,000 g/mol or greater, such as from about 5,000 g/mol to about 4,000,000 g/mol, such as from about 150,000 g/mol to about 300,000 g/mol, alternatively from about 500,000 g/mol to about 700,000 g/mol, such as from about 550,000 g/mol to about 650,000 g/mol, alternatively from about 800,000 g/mol to about 1,200,000 g/mol, such as from about 900,000 g/mol to 1,200,000 g/mol, alternatively from about 3,000,000 g/mol to about 3,800,000 g/mol; an Mn value of 70,000 g/mol or greater, such as from about 70,000 g/mol to about 2,400,000 g/mol, such as from about 90,000 g/mol to about 120,000 g/mol, alternatively from about 200,000 g/mol to about 500,000 g/mol, such as from about 250,000 g/mol to about 450,000 g/mol; and or an Mz value of 300,000 g/mol or greater, such as from about 300,000 g/mol to about 6,000,000 g/mol, such as from about 1,000,000 g/mol to about 2,500,000 g/mol, alternatively from about 3,500,000 g/mol to about 4,000,000 g/mol.

In at least one embodiment, the ethylene based polymer has an Mw/Mn (PDI) value of from 1 to 10, such as from 1 to 5, such as from 1.2 to about 4, such as from 1.5 to about 3.

In at least one embodiment, an ethylene based polymer (homopolymer) can be produced using an exemplary catalyst of the present disclosure with high catalyst activity at high reactor temperatures. For example, the catalyst activity can be from about 25,000 gP·mmolcat$^{-1}$·h$^{-1}$ to about 200,000 gP·mmolcat$^{-1}$·h$^{-1}$, such as from about 50,000 gP·mmolcat$^{-1}$·h$^{-1}$ to about 85,000 gP·mmolcat$^{-1}$·h$^{-1}$, alternatively from about 90,000 gP·mmolcat$^{-1}$·h$^{-1}$ to about 140,000 gP·mmolcat$^{-1}$·h$^{-1}$.

In at least one embodiment, a propylene based polymer (homopolymer) has one or more of: an Mw value of 20,000 g/mol or greater, such as from about 20,000 g/mol to about 1,000,000 g/mol, such as from about 20,000 g/mol to about 30,000 g/mol, alternatively from about 90,000 g/mol to about 170,000 g/mol, such as from about 100,000 g/mol to about 160,000 g/mol, alternatively from about 400,000 g/mol to about 650,000 g/mol, such as from about 430,000 g/mol to 550,000 g/mol, alternatively from about 600,000 g/mol to about 750,000 g/mol; an Mn value of 10,000 g/mol or greater, such as from about 10,000 g/mol to about 450,000 g/mol, such as from about 8,000 g/mol to about 10,000 g/mol, alternatively from about 80,000 g/mol to about 100,000 g/mol, alternatively from about 200,000 g/mol to about 400,000 g/mol, such as from about 200,000 g/mol to about 300,000 g/mol; and or an Mz value of 50,000 g/mol or greater, such as from about 50,000 g/mol to about 2,000,000 g/mol, such as from about 50,000 g/mol to about 60,000 g/mol, alternatively from about 300,000 g/mol to about 400,000 g/mol.

In at least one embodiment, the propylene based polymer has an Mw/Mn (PDI) value of from 1 to 10, such as from 1 to 5, such as from 1.2 to about 4, such as from 1.5 to about 3.

In at least one embodiment, a propylene based polymer (homopolymer) can be produced using an exemplary catalyst of the present disclosure with high catalyst activity at high reactor temperatures. For example, the catalyst activity can be from about 950 gP·mmolcat$^{-1}$·h$^{-1}$ to about 1,000,000 gP·mmolcat$^{-1}$·h$^{-1}$, such as from about 400,000 gP·mmolcat$^{-1}$·h$^{-1}$ to about 700,000 gP·mmolcat$^{-1}$·h$^{-1}$, alternatively from about 80,000 gP·mmolcat$^{-1}$·h$^{-1}$ to about 100,000 gP·mmolcat$^{-1}$·h$^{-1}$, alternatively from about 8,000 gP·mmolcat$^{-1}$·h$^{-1}$ to about 10,000 gP·mmolcat$^{-1}$·h$^{-1}$. For example, the reactor temperature can be about 70° C. to 100° C.

In at least one embodiment, the ethylene or propylene based polymer has a melting point (Tm) of at least 80° C., such as from about 80° C. to about 180° C., such as from about 100° C. to about 165° C., such as from about 120° C. to about 160° C., such as from about 130° C. to about 160° C. It is typically challenging to obtain polyethylenes and polypropylenes having high melting points (e.g. 100° C. or greater), where the polymers are formed using a non-metallocene catalysts. Yet, non-metallocene catalysts, such as amido-phenolate-heterocyclic Lewis base catalysts of the present disclosure may provide ethylene or propylene based polymers with high Tm. Higher Tm is indicative of higher crystallinity of a polymer material and provides a harder and more thermally stable material. Thus, mechanical properties of the polymers can be tailored by Tm of the polymers. For example, in a semi-crystalline thermoplastic polymer, the crystalline structure may contribute to strength properties of the plastics (e.g., crystalline materials can be tough and hard, and may require high stresses in order to be broken). An increase in crystallinity can lead to an increase in density, stiffness, strength, toughness, specific gravity and elastic modulus, for example. Furthermore, crystallinity may affect the optical properties of the polymeric material. Polymers of the present disclosure having one or more of the aforementioned properties, such as high Tm, can be used in a wide variety of applications, such as optical fiber production. Without being bound by theory, it has been discovered that, when using non-metallocene catalysts such as amido-phenolate-heterocyclic Lewis base catalysts of the present disclosure melting points can be tuned by making the $E^1$ and $E^2$ substituents bulkier, for example. Hence, the difficulty of making high melting point polyolefins, such as high melting point polypropylenes, using non-metallocene catalysts, can be realized by the ability to change the melting point of the polymer based on facile tuning of the chemical structure of the catalysts of the present disclosure.

In at least one embodiment, an ethylene or propylene based polymer is an ethylene alpha-olefin copolymer or propylene alpha-olefin copolymer having one or more of: an Mw value of 100,000 g/mol or greater, such as from about 100,000 g/mol to about 1,500,000 g/mol, such as from about 100,000 g/mol to about 500,000 g/mol, such as from about 300,000 g/mol to about 500,000 g/mol, alternatively from about 1,500,000 g/mol to about 3,500,000, such as from about 2,000,000 g/mol to about 3,000,000 g/mol; an Mn value of 50,000 g/mol or greater, such as from about 50,000 g/mol to about 2,300,000 g/mol, such as from about 100,000 g/mol to about 300,000 g/mol, such as from about 100,000 g/mol to about 200,000 g/mol, alternatively from about 1,000,000 g/mol to about 2,300,000 g/mol, such as from 1,500,000 g/mol to about 2,000,000 g/mol; an Mz value of 200,000 g/mol or greater, such as from about 250,000 g/mol to about 350,000 g/mol, alternatively from about 1,000,000 g/mol to about 3,000,000 g/mol, alternatively from about 5,000,000 g/mol to about 6,000,000 g/mol.

In at least one embodiment, the ethylene alpha-olefin copolymer or propylene alpha-olefin copolymer has a comonomer content of from 0.1 wt % to 99 wt %, such as from 1 wt % to 40 wt %, such as from 3 wt % to 33 wt %, such as from 15 wt % to 30 wt %, alternatively from about 40 wt % to about 95 wt %.

In at least one embodiment, the ethylene alpha-olefin copolymer or propylene alpha-olefin copolymer has an Mw/Mn (PDI) value of from 1 to 5, such as from 2 to 4, such as from 1.5 to 3.1.

In at least one embodiment, the ethylene alpha-olefin copolymer or propylene alpha-olefin copolymer has a melting point (Tm) of at least 80° C., such as from about 90° C. to about 150° C., alternatively from about 110° C. to about 130° C.

In at least one embodiment, an ethylene alpha-olefin copolymer or propylene alpha-olefin copolymer can be produced using a catalyst of the present disclosure with high catalyst activity at high reactor temperatures. For example, the catalyst activity can be from about 15,000 gP·mmolcat$^{-1}$·h$^{-1}$ to about 2,000,000 gP·mmolcat$^{-1}$·h$^{-1}$, such as from about 80,000 gP·mmolcat$^{-1}$·h$^{-1}$ to about 100,000 gP·mmolcat$^{-1}$·h$^{-1}$, alternatively from about 200,000 gP·mmolcat$^{-1}$·h$^{-1}$ to about 400,000 gP·mmolcat$^{-1}$·h$^{-1}$.

GPC 4-D

For purposes of the claims, and unless otherwise indicated, the distribution and the moments of molecular weight (Mw, Mn, Mz, Mw/Mn, etc.), the comonomer content and the branching index (g') are determined by using a high temperature Gel Permeation Chromatography (Polymer Char GPC-IR) equipped with a multiple-channel band-filter based Infrared detector IR5 with a multiple-channel band filter based infrared detector ensemble IR5 with band region covering from about 2,700 cm$^{-1}$ to about 3,000 cm$^{-1}$ (representing saturated C—H stretching vibration), an 18-angle light scattering detector and a viscometer. Three Agilent PLgel 10-μm Mixed-B LS columns are used to provide polymer separation. Reagent grade 1,2,4-trichlorobenzene (TCB) (from Sigma-Aldrich) comprising ~300 ppm antioxidant BHT can be used as the mobile phase at a nominal flow rate of ~1.0 mL/min and a nominal injection volume of ~200 μL. The whole system including transfer lines, columns, and detectors can be contained in an oven maintained at ~145° C. A given amount of sample can be weighed and sealed in a standard vial with ~10 μL flow marker (heptane) added thereto. After loading the vial in the auto-sampler, the oligomer or polymer may automatically be dissolved in the instrument with ~8 mL added TCB solvent at ~160° C. with continuous shaking. The sample solution concentration can be from ~0.2 mg/ml to ~2.0 mg/ml, with lower concentrations used for higher molecular weight samples. The concentration, c, at each point in the chromatogram can be calculated from the baseline-subtracted IR5 broadband signal, I, using the equation: $c=\alpha I$, where $\alpha$ is the mass constant determined with polyethylene or polypropylene standards. The mass recovery can be calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{\alpha + 1} + \frac{\alpha_{PS} + 1}{\alpha + 1}\log M_{PS}$$

where the variables with subscript "PS" stand for polystyrene while those without a subscript are for the test samples. In this method, $\alpha_{PS}=0.67$ and $K_{PS}=0.000175$, $\alpha$ and K for other materials are as calculated and published in literature (Sun, T. et al. (2001) *Macromolecules*, v.34, pg. 6812), except that for purposes of this present disclosure and claims thereto, $\alpha=0.700$ and $K=0.0003931$ for ethylene, propylene, diene monomer copolymers, $\alpha=0.705$ and $K=0.0002288$ for linear propylene polymers, $\alpha=0.695$ and $K=0.000181$ for linear butene polymers, $\alpha$ is 0.695 and K is 0.000579*(1−0.0087*w2b+0.000018*(w2b)^2) for ethylene-butene copolymer where w2b is a bulk weight percent of butene comonomer, $\alpha$ is 0.695 and K is 0.000579*(1−0.0075*w2b) for ethylene-hexene copolymer where w2b is a bulk weight percent of hexene comonomer, $\alpha$ is 0.695 and K is 0.000579*(1−0.0077*w2b) for ethylene-octene copolymer where w2b is a bulk weight percent of octene comonomer, and $\alpha$ is 0.695 and K is 0.000579 for all other linear ethylene polymers. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1,000 total carbons ($CH_3/1000TC$) as a function of molecular weight. The short-chain branch (SCB) content per 1000TC (SCB/1000TC) is then computed as a function of molecular weight by applying a chain-end correction to the $CH_3$/1000TC function, assuming each chain to be linear and terminated by a methyl group at each end. The weight % comonomer is then obtained from the following expression in which $f$ is 0.3, 0.4, 0.6, 0.8, and so on for $C_3$, $C_4$, $C_6$, $C_8$, and so on co-monomers, respectively:

w2=$f$*SCB/1000TC

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk } IR \text{ ratio} = \frac{\text{Area of } CH_3 \text{ signal within integration limits}}{\text{Area of } CH_2 \text{ signal within integration limits}}$$

Then the same calibration of the $CH_3$ and $CH_2$ signal ratio, as mentioned previously in obtaining the $CH_3$/1000TC as a function of molecular weight, is applied to obtain the bulk $CH_3$/1000TC. A bulk methyl chain ends per 1000TC (bulk $CH_3$end/1000TC) is obtained by weight-averaging the chain-end correction over the molecular-weight range. Then w2b=$f$*bulk CH3/1000TC bulk SCB/1000TC=bulk CH3/1000TC−bulk CH3end/1000TC and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the equation [η]=$\eta_s$/c, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as $$g'_{vis} = \frac{[\eta]_{avg}}{KM_v^\alpha},$$

where $M_V$ is the viscosity-average molecular weight based on molecular weights determined by LS analysis and the K and a are for the reference linear polymer, which are, for purposes of this present disclosure and claims thereto, α=0.700 and K=0.0003931 for ethylene, propylene, diene monomer copolymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, α is 0.695 and K is 0.000579*(1−0.0077*w2b) for ethylene-octene copolymer where w2b is a bulk weight percent of octene comonomer, and α is 0.695 and K is 0.000579 for all other linear ethylene polymers. Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

Blends

In another embodiment, the polymer (such as the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as the polyethylene or polypropylene) is present in the above blends, at from 10 wt % to 99 wt %, based upon the weight of the polymers in the blend, such as 20 wt % to 95 wt %, such as at least 30 wt % to 90 wt %, such as at least 40 wt % to 90 wt %, such as at least 50 wt % to 90 wt %, such as at least 60 wt % to 90 wt %, such as at least 70 to 90 wt %.

The blends described above may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc.

Films

Any of the foregoing polymers, such as the foregoing polypropylenes or blends thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. For example, the films can be oriented in the Machine Direction (MD) at a ratio of up to 15, such as from about 5 to about 7, and in the Transverse Direction (TD) at a ratio of up to 15, such as from about 7 to about 9. However, in another embodiment the film is oriented to the same extent in both the MD and TD directions.

The films may vary in thickness depending on the intended application; however, films of a thickness from 1 μm to 50 μm can be suitable. Films intended for packaging can be from 10 μm to 50 μm thick. The thickness of the sealing layer can be from 0.2 μm to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In at least one embodiment, one or both of the surface layers is modified by corona treatment.

Aspects Listing

The present disclosure provides, among others, the following aspects, each of which may be considered as optionally including any alternate aspects.

Clause 1. A catalyst compound represented by Formula (I):

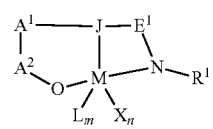

(I)

wherein:

M is a group 3, 4, 5, or 6 metal;

each of $A^1$ and $A^2$ are independently selected from the group consisting of aryl, substituted aryl, heteroaryl group, and substituted heteroaryl group;

J comprises a heterocyclic Lewis base;

$E^1$ is selected from the group consisting of hydrocarbyl, substituted hydrocarbyl, silyl, and substituted silyl, wherein J and $E^1$ are optionally joined to form one or more hydrocarbyl rings, substituted hydrocarbyl rings, heterocyclic rings, or substituted heterocyclic rings;

each L is independently a Lewis base;

each X is independently an anionic ligand;

n is 1, 2 or 3;

m is 0, 1, or 2;

n+m is not greater than 4;

$R^1$ is selected from the group consisting of $C_1$-$C_{40}$ hydrocarbyl, substituted $C_1$-$C_{40}$ hydrocarbyl, a heteroatom-containing group, and substituted heteroatom-containing group;

any two L groups may be joined together to form a bidentate Lewis base;

an X group may be joined to an L group to form a monoanionic bidentate group; and any two X groups may be joined together to form a dianionic ligand group.

Clause 2. The catalyst compound of clause 1, wherein the catalyst compound comprises an eight-membered metallocycle ring and a five-membered metallocycle ring.

Clause 3. The catalyst compound of clauses 1 or 2, wherein $E^1$ is selected from the group consisting of $C(R^8)(R^9)$ and $Si(R^8)(R^9)$, wherein each of $R^8$ and $R^9$ is independently selected from the group consisting of hydrogen, $C_1$-$C_{40}$ hydrocarbyl, substituted C₁-C₄₀ hydrocarbyl, a heteroatom, heteroatom containing group, and substituted heteroatom-containing group, or R⁸ and R⁹ may be joined to form one or more C₃-C₂₀ alkyl groups, hydrocarbyl rings, substituted hydrocarbyl rings, heterocyclic rings, or substituted heterocyclic rings each having 5, 6, 7, or 8 ring atoms, and wherein substitutions on the ring can join to form additional rings.

Clause 4. The catalyst compound of any of clauses 1 to 3, wherein J is represented by the formula:

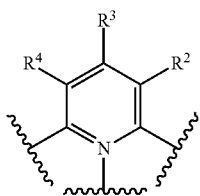

wherein each of $R^2$, $R^3$, and $R^4$ is independently selected from the group consisting of hydrogen, $C_1$-$C_{40}$ hydrocarbyl, substituted $C_1$-$C_{40}$ hydrocarbyl, a heteroatom, and heteroatom-containing group, or one or more of $R^2$ and $R^3$ or $R^3$ and $R^4$ may be joined to form one or more hydrocarbyl rings, substituted hydrocarbyl rings, heterocyclic rings, or substituted heterocyclic rings each having 5, 6, 7, or 8 ring atoms, and where substitutions on the ring can join to form additional rings.

Clause 5. The catalyst compound of any of clauses 1 to 4, wherein J and $E^1$ are joined to form a ring represented by the formula:

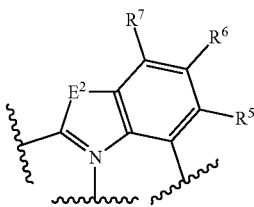

wherein $E^2$ is selected from O, S, $N(R^{10})$, wherein each of $R^5$, $R^6$, $R^7$, and $R^{10}$ is independently selected from the group consisting of hydrogen, $C_1$-$C_{40}$ hydrocarbyl, substituted $C_1$-$C_{40}$ hydrocarbyl, a heteroatom, heteroatom-containing group or substituted heteroatom-containing group, or one or more of $R^5$ and $R^6$ or $R^6$ and $R^7$ may be joined to form one or more hydrocarbyl rings, substituted hydrocarbyl rings, heterocyclic rings, or substituted heterocyclic rings each having 5, 6, 7, or 8 ring atoms, and where substitutions on the ring can join to form additional rings.

Clause 6. The catalyst compound of any of clauses 1 to 5, wherein J and $E^1$ are joined to form a ring represented by the formula:

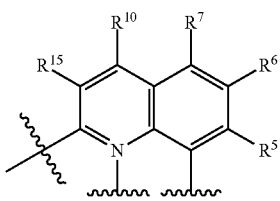

wherein each of $R^5$, $R^6$, $R^7$, $R^{10}$ and $R^{15}$ is independently selected from the group consisting of hydrogen, $C_1$-$C_{40}$ hydrocarbyl, substituted $C_1$-$C_{40}$ hydrocarbyl, a heteroatom, heteroatom-containing group, and substituted heteroatom-containing group, or one or more of $R^5$ and $R^6$ or $R^6$ and $R^7$ or $R^7$ and $R^{10}$ or $R^{10}$ and $R^{15}$ may be joined to form one or more hydrocarbyl rings, substituted hydrocarbyl rings, heterocyclic rings, or substituted heterocyclic rings each having 5, 6, 7, or 8 ring atoms, and where substitutions on the ring can join to form additional rings.

Clause 7. The catalyst compound of any of clauses 1 to 6, wherein M is a group 4 transition metal.

Clause 8. The catalyst compound of clauses 1 to 7 wherein $A^1$ is aryl or substituted aryl.

Clause 9. The catalyst compound of any of clauses 1 to 8, wherein $A^2$ is represented by the formula:

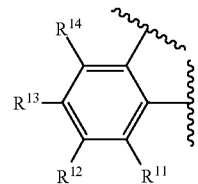

wherein each of $R^{11}$, $R^{12}$, $R^{13}$, and $R^{14}$ is independently selected from the group consisting of hydrogen, $C_1$-$C_{40}$ hydrocarbyl, substituted $C_1$-$C_{40}$ hydrocarbyl, a heteroatom, heteroatom-containing group, and a substituted heteroatom-containing group.

Clause 10. The catalyst compound of clause 9, wherein $R^{11}$ is a $C_1$-$C_{20}$ hydrocarbyl or substituted hydrocarbyl.

Clause 11. The catalyst compound of any of clauses 9 to 10, wherein $R^{11}$ is tert-butyl.

Clause 12. The catalyst compound of any of clauses 9 to 10, wherein $R^{11}$ is a di-tert-butylphenyl group.

Clause 13. The catalyst compound of clause 9, wherein $R^{11}$ is represented by the formula:

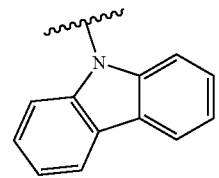

Clause 14. The catalyst compound clause 5, wherein $E^2$ selected from the group consisting of NH, $C_1$-$C_{20}$ alkyl-N, and $C_4$-$C_{20}$ aryl-N.

Clause 15. The catalyst compound of clause 4, wherein $R^2$, $R^3$, and $R^4$ are independently selected from the group consisting of hydrogen and $C_1$-$C_{10}$ alkyl.

Clause 16. The catalyst compound of any of clauses 1 to 15, wherein $R^1$ is a di-tert-butylphenyl group.

Clause 17. The catalyst compound of any of clauses 1 to 16, wherein $E^1$ is $C(R^8)(R^9)$ wherein $R^8$ is hydrogen and $R^9$ is a tert-butylphenyl group.

Clause 18. The catalyst compound of any of clauses 1 to 17, wherein $E^1$ is $CH_2$.

Clause 19. The catalyst compound of any of clauses 1 to 18, wherein M is zirconium or hafnium.

Clause 20. The catalyst compound of any of clauses 1 to 19, wherein the catalyst compound is selected from the group consisting of:
1
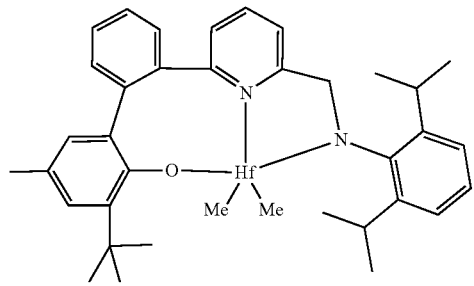
2
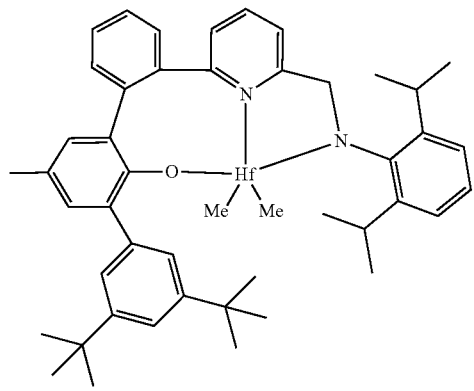
3
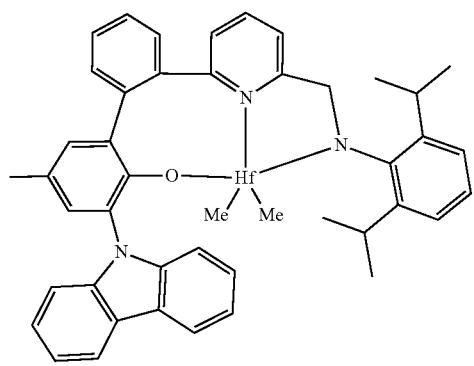
4
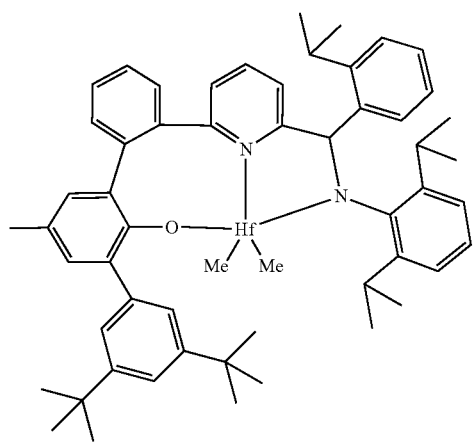
-continued
5
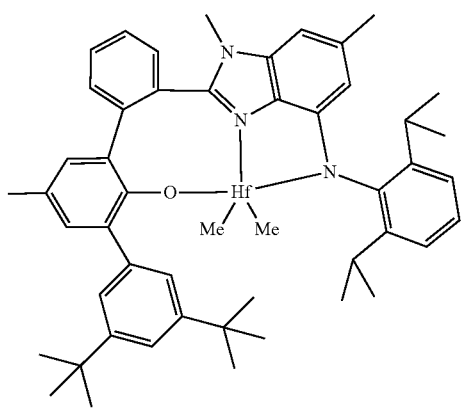
6
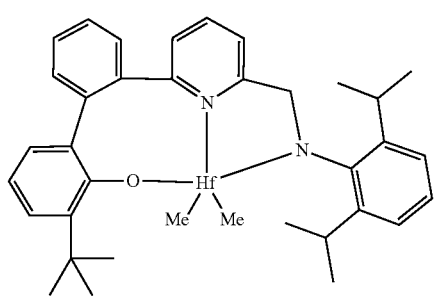
7
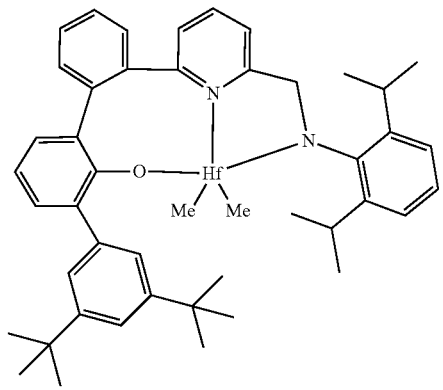
8
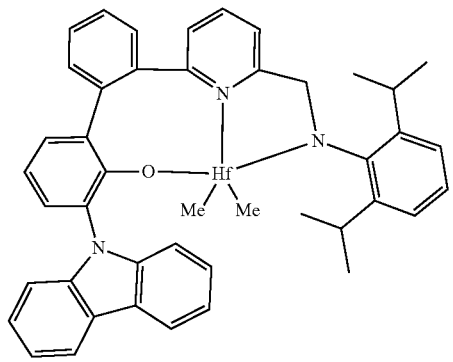

9
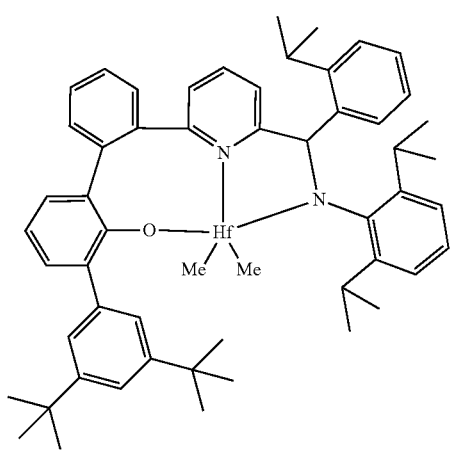
10
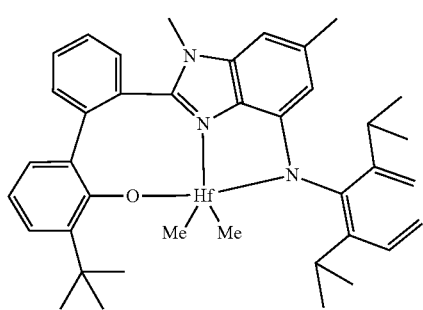
11
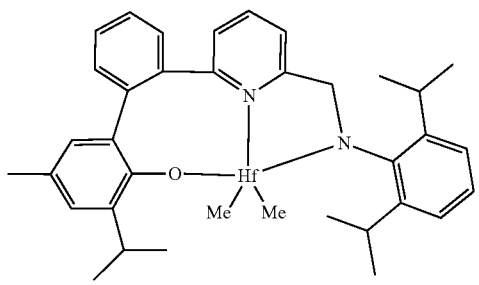
12
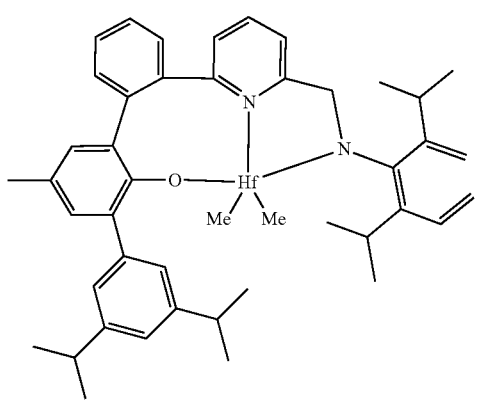
13
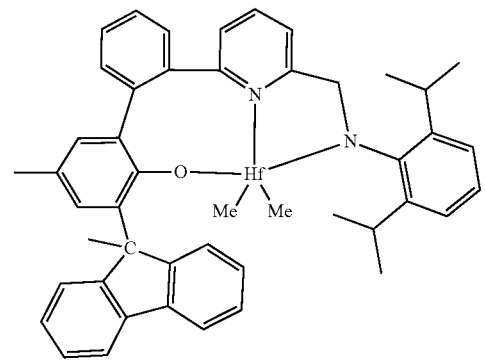
14
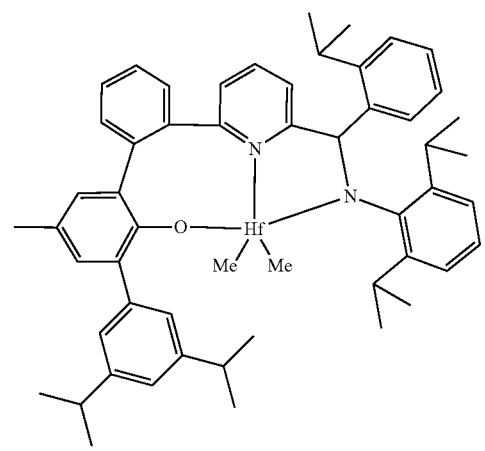
15
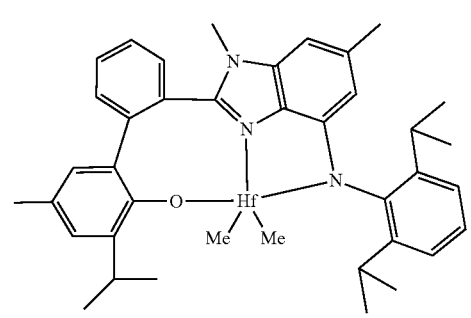
16
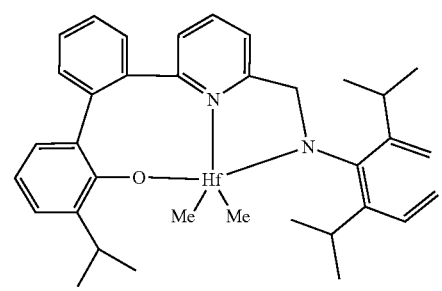

-continued

17
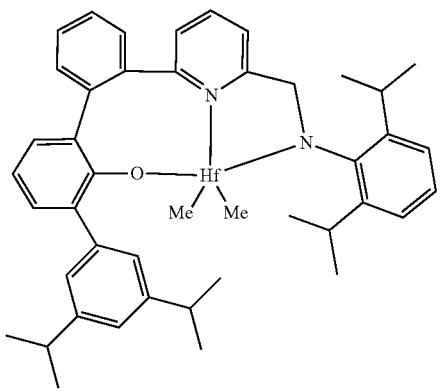

18
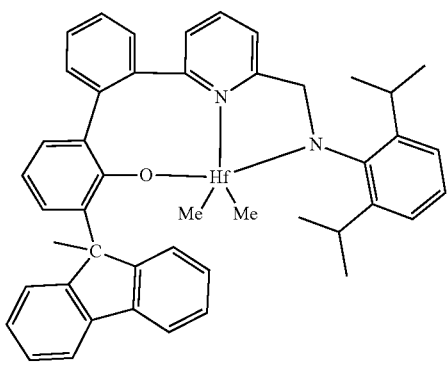

19
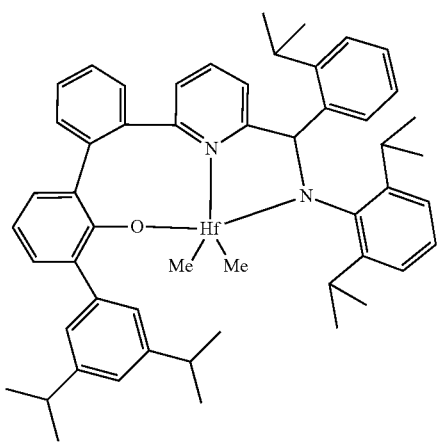

20
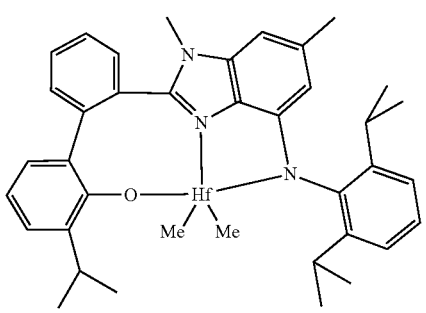

Clause 21. The catalyst compound of any of clauses 1 to 20, wherein the catalyst compound is.

1
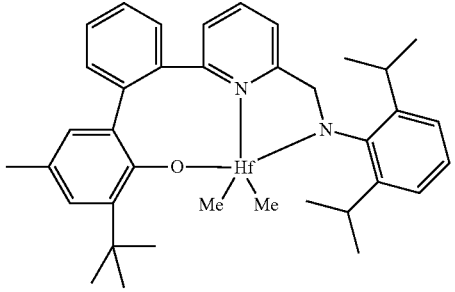

Clause 22. A catalyst system comprising an activator and the catalyst compound of any of clauses 1 to 21.
Clause 23. The catalyst system of any of clauses 1 to 22, further comprising a support material.
Clause 24. The catalyst system of clause 23, wherein the support material is selected from $Al_2O_3$, $ZrO_2$, $SiO_2$, $SiO_2/Al_2O_3$, $SiO_2/TiO_2$, silica clay, silicon oxide/clay, or mixtures thereof.
Clause 25. The catalyst system of any of clauses 22 to 24, wherein the activator comprises a non-coordinating anion activator.
Clause 26. The catalyst system of any of clauses 22 to 25, wherein the activator is represented by the formula:

$$(Z^{d+})(A^{d-})$$

wherein Z is (L-H) or a reducible Lewis Acid, L is a Lewis base; H is hydrogen; $(L-H)^+$ is a Bronsted acid; $A^{d-}$ is a non-coordinating anion having the charge d–; and d is an integer from 1 to 3.
Clause 27. The catalyst system of any of clauses 22 to 25, wherein the activator is represented by the formula:

$$(Z^{d+})(A^{d-})$$

wherein $A^{d-}$ is a non-coordinating anion having the charge d–; d is an integer from 1 to 3, and Z is a reducible Lewis acid represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl.
Clause 28. The catalyst system of any of clauses 22 to 27, wherein the activator is one or more of:
dioctadecylmethylammonium tetrakis(pentafluorophenyl)borate,
dioctadecylmethylammonium tetrakis(perfluoronaphthyl)borate,
N,N-dimethylanilinium tetrakis(pentafluorophenyl)borate,
triphenylcarbenium tetrakis(pentafluorophenyl)borate,
trimethylammonium tetrakis(perfluoronaphthyl)borate,
triethylammonium tetrakis(perfluoronaphthyl)borate,
tripropylammonium tetrakis(perfluoronaphthyl)borate,
tri(n-butyl)ammonium tetrakis(perfluoronaphthyl)borate,
tri(t-butyl)ammonium tetrakis(perfluoronaphthyl)borate,
N,N-dimethylanilinium tetrakis(perfluoronaphthyl)borate,
N,N-diethylanilinium tetrakis(perfluoronaphthyl)borate,
N,N-dimethyl-(2,4,6-trimethylanilinium) tetrakis(perfluoronaphthyl)borate,
tropillium tetrakis(perfluoronaphthyl)borate,
triphenylcarbenium tetrakis(perfluoronaphthyl)borate,
triphenylphosphonium tetrakis(perfluoronaphthyl)borate,
triethylsilylium tetrakis(perfluoronaphthyl)borate,
benzene(diazonium) tetrakis(perfluoronaphthyl)borate, trimethylammonium tetrakis(perfluorobiphenyl)borate,
triethylammonium tetrakis(perfluorobiphenyl)borate,
tripropylammonium tetrakis(perfluorobiphenyl)borate,
tri(n-butyl)ammonium tetrakis(perfluorobiphenyl)borate,
tri(t-butyl)ammonium tetrakis(perfluorobiphenyl)borate,
N,N-dimethylanilinium tetrakis(perfluorobiphenyl)borate,
N,N-diethylanilinium tetrakis(perfluorobiphenyl)borate,
N,N-dimethyl-(2,4,6-trimethylanilinium) tetrakis(perfluorobiphenyl)borate,
tropillium tetrakis(perfluorobiphenyl)borate,
triphenylcarbenium tetrakis(perfluorobiphenyl)borate,
triphenylphosphonium tetrakis(perfluorobiphenyl)borate,
triethylsilylium tetrakis(perfluorobiphenyl)borate,
benzene(diazonium) tetrakis(perfluorobiphenyl)borate,
[4-t-butyl-PhNMe$_2$H][(C$_6$F$_3$(C$_6$F$_5$)$_2$)$_4$B],
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) tetraphenylborate,
tropillium tetraphenylborate,
triphenylcarbenium tetraphenylborate,
triphenylphosphonium tetraphenylborate,
triethylsilylium tetraphenylborate,
benzene(diazonium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium) tetrakis(pentafluorophenyl)borate,
tropillium tetrakis(pentafluorophenyl)borate,
triphenylcarbenium tetrakis(pentafluorophenyl)borate,
triphenylphosphonium tetrakis(pentafluorophenyl)borate,
triethylsilylium tetrakis(pentafluorophenyl)borate,
benzene(diazonium) tetrakis(pentafluorophenyl)borate,
trimethylammonium tetrakis-(2,3,4,6-tetrafluorophenyl)borate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl)borate,
dimethyl(t-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluorophenyl)borate,
N,N-dimethyl-(2,4,6-trimethylanilinium) tetrakis-(2,3,4,6-tetrafluorophenyl)borate,
tropillium tetrakis-(2,3,4,6-tetrafluorophenyl)borate,
triphenylcarbenium tetrakis-(2,3,4,6-tetrafluorophenyl)borate,
triphenylphosphonium tetrakis-(2,3,4,6-tetrafluorophenyl)borate,
triethylsilylium tetrakis-(2,3,4,6-tetrafluorophenyl)borate,
benzene(diazonium) tetrakis-(2,3,4,6-tetrafluorophenyl)borate,
trimethylammonium tetrakis(3,5-bis(trifluoromethyl)phenyl)borate,
triethylammonium tetrakis(3,5-bis(trifluoromethyl)phenyl)borate,
tripropylammonium tetrakis(3,5-bis(trifluoromethyl)phenyl)borate,
tri(n-butyl)ammonium tetrakis(3,5-bis(trifluoromethyl)phenyl)borate,
tri(t-butyl)ammonium tetrakis(3,5-bis(trifluoromethyl)phenyl)borate,
N,N-dimethylanilinium tetrakis(3,5-bis(trifluoromethyl)phenyl)borate,
N,N-diethylanilinium tetrakis(3,5-bis(trifluoromethyl)phenyl)borate,
N,N-dimethyl-(2,4,6-trimethylanilinium) tetrakis(3,5-bis(trifluoromethyl)phenyl)borate,
tropillium tetrakis(3,5-bis(trifluoromethyl)phenyl)borate,
triphenylcarbenium tetrakis(3,5-bis(trifluoromethyl)phenyl)borate,
triphenylphosphonium tetrakis(3,5-bis(trifluoromethyl)phenyl)borate,
triethylsilylium tetrakis(3,5-bis(trifluoromethyl)phenyl)borate,
benzene(diazonium) tetrakis(3,5-bis(trifluoromethyl)phenyl)borate,
di-(i-propyl)ammonium tetrakis(pentafluorophenyl)borate,
dicyclohexylammonium tetrakis(pentafluorophenyl)borate,
tri(o-tolyl)phosphonium tetrakis(pentafluorophenyl)borate,
tri(2,6-dimethylphenyl)phosphonium tetrakis(pentafluorophenyl)borate,
triphenylcarbenium tetrakis(perfluorophenyl)borate,
1-(4-(tris(pentafluorophenyl)borate)-2,3,5,6-tetrafluorophenyl)pyrrolidinium,
4-(tris(pentafluorophenyl)borate)-2,3,5,6-tetrafluoropyridine, and
triphenylcarbenium tetrakis(3,5-bis(trifluoromethyl)phenyl)borate).

Clause 29. The catalyst system of any of clauses 22 to 25, wherein the activator is represented by the Formula (AI):

$$[R^1R^2R^3EH]_d^+[M^{k+}Q_n]^{d-} \quad (AI)$$

wherein:
E is nitrogen or phosphorous;
d is 1, 2 or 3; k is 1, 2, or 3; n is 1, 2, 3, 4, 5, or 6; n−k=d;
each of $R^1$, $R^2$, and $R^3$ is independently hydrogen, a $C_1$-$C_{40}$ alkyl, or a $C_5$-$C_{50}$-aryl, wherein each of $R^1$, $R^2$, and $R^3$ is independently unsubstituted or substituted; wherein $R^1$, $R^2$, and $R^3$ together comprise 15 or more carbon atoms;
M is an element selected from group 13 of the Periodic Table of the Elements; and
each Q is independently selected from the group consisting of a hydrogen, bridged or unbridged dialkylamido, halide, alkoxy, substituted alkoxy, aryloxy, substituted aryloxy, hydrocarbyl, substituted hydrocarbyl, halocarbyl, substituted halocarbyl, and halosubstituted-hydrocarbyl radical.

Clause 30. The catalyst system of any of clauses 22 to 29, further comprising a metal hydrocarbenyl chain transfer agent represented by the formula:

$$Al(R')_{3-v}(R'')_v$$

wherein each R' independently is a $C_1$-$C_{30}$ hydrocarbyl group; each R", independently, is a $C_4$-$C_{20}$ hydrocarbenyl group having an end-vinyl group; and v is from 0.1 to 3.

Clause 31. The catalyst system of any of clauses 22 to 30, wherein the activator comprises an alumoxane.

Clause 32. The catalyst system of clause 31, wherein the alumoxane is present at a molar ratio of aluminum to catalyst compound transition metal of 100:1 or more.

Clause 33. A process for the production of a polymer comprising: polymerizing an alkene by contacting the alkene with a catalyst system of any of clauses 22 to 31, in one or more continuous stirred tank reactors or loop reactors, in series or in parallel, at a reactor pressure of from 0.05 MPa to 1,500 MPa and a reactor temperature of from 30° C. to 230° C.

Clause 34. The process of clause 33, wherein the polymer is homopolyethylene and the alkene is ethylene, wherein the homopolyethylene has an $M_w$ value of from 155,000 g/mol to 1,200,000 g/mol, $M_n$ value of from 90,000 to 550,000, $M_z$ value of from 350,000 to 4,000,000, and a PDI of from 1.5 to 3.

Clause 35. The process of any of clauses 31 to 34, wherein:
the melting temperature of the polymer is between about 135° C. and 138° C., and
the catalyst compound is represented by the formula:

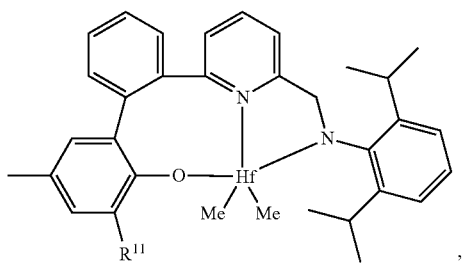

wherein $R^{11}$ is selected from the group consisting of hydrogen, $C_1$-$C_{40}$ hydrocarbyl, substituted $C_1$-$C_{40}$ hydrocarbyl, a heteroatom, and a heteroatom-containing group.

Clause 36. The process of clause 35, wherein $R^{11}$ is tert-butyl.

Clause 37. The process of clause 35, wherein $R^{11}$ is a di-tert-butylphenyl group.

Clause 38. The process of clause 35, wherein $R^{11}$ is represented by the formula:

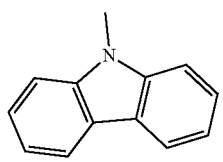

Clause 39. The process of any of clauses 33 to 34, wherein:
the melting temperature of the polymer is between about 135° C. and 138° C., and
the catalyst compound is:

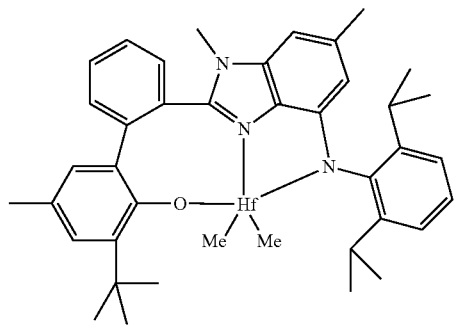

Clause 40. The process of clause 33, wherein:
the polymer is an ethylene-octene copolymer,
the copolymer has an Mw value of from 100,000 to 3,600,000, $M_n$ value of from 50,000 to 2,250,000, Mz value of from 225,000 to 6,200,000, and a PDI of from 1.5 to 3.

Clause 41. The process of clause 40, wherein:
the melting temperature of the polymer is from 104° C. to 126° C., and
the catalyst compound is represented by the formula:

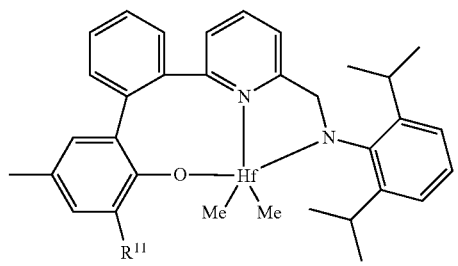

wherein $R^{11}$ is selected from the group consisting of hydrogen, $C_1$-$C_{40}$ hydrocarbyl, substituted $C_1$-$C_{40}$ hydrocarbyl, a heteroatom, and a heteroatom-containing group.

Clause 42. The process of clause 41, wherein:
$R^{11}$ is tert-butyl, and
the melting temperature of the polymer is from 121° C. to 126° C.

Clause 43. The process of clause 41, wherein $R^{11}$ is di-tert-butylphenyl.

Clause 44. The process of clause 41, wherein:
the alkene is propylene,
the polymer is homopolypropylene, and
the homopolypropylene has:
an $M_w$ value of from 85,000 g/mol to 750,000 g/mol,
$M_n$ value of from 55,000 g/mol to 400,000 g/mol,
$M_z$ value of from 165,000 g/mol to 1,600,000 g/mol, and
a PDI of from 1.6 to 2.1.

Clause 45. The process of clause 44, wherein:
the reactor temperature is between about 60° C. and 80° C.,
the melting temperature of the polymer is from 146° C. to 147° C., and the catalyst compound is:

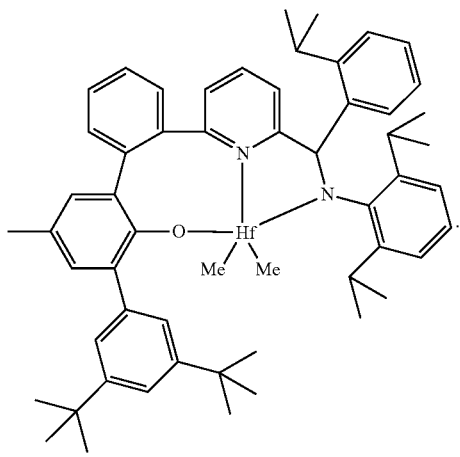

EXAMPLES

General Considerations for Synthesis:

All reagents were purchased from commercial vendors (Sigma Aldrich) and used as received unless otherwise noted. Solvents were sparged with argon and dried over 3 Å molecular sieves. All chemical manipulations were performed in a nitrogen environment unless otherwise stated. Flash column chromatography was carried out with Sigma Aldrich silica gel 60 Å (70 Mesh-230 Mesh) using solvent systems specified. NMR spectra were recorded on a Bruker 400 and/or 500 NMR with chemical shifts referenced to residual solvent peaks. All anhydrous solvents were purchased from Fisher Chemical and were degassed and dried over molecular sieves prior to use. Deuterated solvents were purchased from Cambridge Isotope Laboratories and were degassed dried over molecular sieves prior to use. $^1$H NMR spectroscopic data were acquired at 400 MHz, and $^{13}$C NMR spectroscopic data were acquired at 100 MHz, using solutions prepared by dissolving approximately 10 mg of a sample in either $C_6D_6$, $CDCl_3$, DMSO-$d_6$, or other deuterated solvent. The chemical shifts (δ) presented are relative to the residual protium in the deuterated solvent at 7.15 ppm, 7.25 ppm, and 2.05 ppm for $C_6D_6$, $CDCl_3$, and DMSO-$d_6$, respectively. The $^{13}$C-NMR chemical shifts are 128.0 ppm and 77.0 ppm for $C_6D_6$ and $CDCl_3$, respectively.

Synthesis of Ligands and Catalysts (or Complexes)

Catalyst 1 Synthesis

N-[-(6-Bromopyridin-2-yl)methylene]-2,6-diisopropylaniline

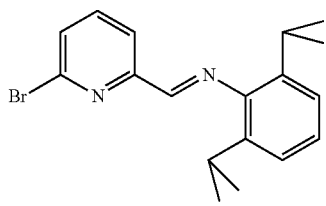 [SMILES: CC(C)c1cccc(C(C)C)c1/N=C/c1cccc(Br)n1]

A mixture of 85.0 g (457 mmol) of 6-bromopyridine-2-carbaldehyde and 80.9 g (457 mmol) of 2,6-diisopropylaniline in 1,000 mL of ethanol was heated to reflux under argon atmosphere for 8 hours. The obtained solution was evaporated to dryness, and the resulting solid was recrystallized from 200 mL of methanol. Yield 113.5 g (72%) of yellow crystalline solid. $^1$H NMR (CDCl$_3$): δ 8.24-8.26 (m, 2H), 7.68-7.72 (m, 1H), 7.59-7.61 (m, 1H), 7.10-7.18 (m, 3H), 2.91 (sept, J=6.8 Hz, 2H), 1.16 (d, J=6.8 Hz, 12H).

N-[(6-Bromopyridin-2-yl)methyl]-2,6-diisopropylaniline

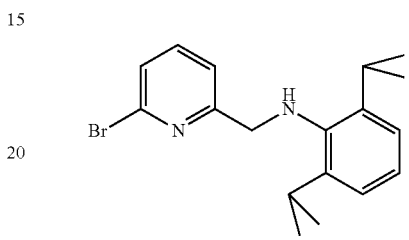

Under argon atmosphere, a mixture of 113.5 g (329 mmol) of N-[(6-bromopyridin-2-yl)methylene]-2,6-diisopropylaniline, 33.2 g (526 mmol) of NaBH$_3$CN, 9 mL of glacial acetic acid and 1,000 mL of methanol was heated to reflux for 12 hours. The obtained mixture was cooled to room temperature, poured into 1,000 mL of water, and then extracted with 3×200 mL of ethyl acetate. The combined extract was dried over Na$_2$SO$_4$ and evaporated to dryness. The residue was purified by flash chromatography on silica gel 60 (40-63 micron, eluent: hexane-ethyl acetate=10:1, vol.). Yield 104 g (91%) of yellow oil. $^1$H NMR (CDCl$_3$): δ 7.51-7.55 (m, 1H), 7.41-7.43 (m, 1H), 7.31-7.33 (m, 1H), 7.08-7.15 (m, 3H), 4.21 (s, 2H), 3.96 (br.s, 1H), 3.36 (sept, J=6.8 Hz, 2H), 1.26 (d, J=6.8 Hz, 12H).

2-(3'-(tert-Butyl)-2'-(methoxymethoxy)-5'-methyl-[1,1'-biphenyl]-2-yl)-4,4,5,5-tetramethyl-1,3,2-dioxaborolane

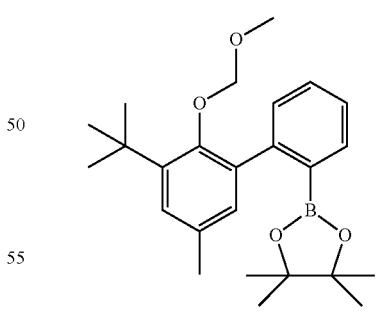

To 4.23 g (174 mmol) of a vacuum dried magnesium powder were subsequently added 150 mL of dry tetrahydrofuran and 10.0 g (34.8 mmol) of 1-bromo-3-(tert-butyl)-2-(methoxymethoxy)-5-methylbenzene. The reaction mixture was stirred overnight at 55° C., then a solution of 6.99 g (36.5 mmol) of 1-bromo-2-chlorobenzene in 100 mL of tetrahydrofuran was added dropwise over 3 hours. The resulting suspension was stirred overnight at 55° C., then it was cooled to 0° C. followed by the addition of 9.70 g (52.2 mmol) of 2-isopropoxy-4,4,5,5-tetramethyl-1,3,2-dioxaborolane. The resulting mixture was stirred overnight at room temperature, then poured into 500 mL of water. The mixture was extracted with 3×100 mL of dichloromethane. The combined organic extracts were dried over Na$_2$SO$_4$ and evaporated to near dryness. The residue was purified by flash chromatography on silica gel 60 (40-63 micron; eluent: hexane-ethyl acetate=15:1, vol.). Yield 7.20 g (50%) of an yellow oil. $^1$H NMR (CDCl$_3$, 400 MHz): δ 7.75 (dd, J=0.9, 7.4 Hz, 1H), 7.20-7.49 (m, 4H), 7.11 (d, J=1.9 Hz, 1H), 6.85 (d, J=1.7 Hz, 1H), 4.44 (d, J=15.0 Hz, 2H), 3.21 (s, 3H), 2.30 (s, 3H), 1.47 (s, 9H), 1.15 (s, 6H), 1.20 (s, 6H).

3-tert-Butyl-2'-(6-((2,6-diisopropylphenylamino)methyl)pyridin-2-yl)-5-methylbiphenyl-2-ol

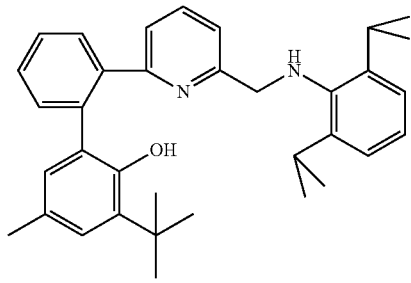 [SMILES: Cc1cc(-c2ccccc2-c2cccc(CNc3c(C(C)C)cccc3C(C)C)n2)c(O)c(C(C)(C)C)c1]

To a solution of 2.63 g (6.41 mmol) of 2-(3'-(tert-butyl)-2'-(methoxymethoxy)-5'-methyl-[1,1'-biphenyl]-2-yl)-4,4,5,5-tetramethyl-1,3,2-dioxaborolane and 2.23 g (6.41 mmol) of N-[(6-bromopyridin-2-yl)methyl]-2,6-diisopropylaniline in 30 mL of dioxane were added 5.23 g (16.04 mmol) of cesium carbonate and 20 mL of water. The resulting mixture was sparged with argon for 30 minutes then 370 mg (0.321 mmol) of Pd(PPh$_3$)$_4$ were added. This mixture was stirred for 12 hours at 95° C. The mixture was allowed to cool to room temperature and then 50 mL of water were added. To the resulting two-phase mixture was added 50 mL of diethyl ether. The organic layer was separated and washed with brine. The resulting solution was dried over Na$_2$SO$_4$ and then evaporated to dryness. To the resulting oil were subsequently added 40 mL of tetrahydrofuran, 40 mL of methanol, and 2.0 mL of 12 N hydrochloric acid. The reaction mixture was stirred overnight at 60° C. and then poured into 200 mL of water. Sodium bicarbonate was added until pH~7. The obtained mixture was extracted with dichloromethane (3×50 mL), the combined organic extract was dried over Na$_2$SO$_4$ and then evaporated to dryness. The residue was purified by flash chromatography on silica gel 60 (40-63 micron, eluent:hexane-ethyl acetate-triethylamine=100:10:1, vol.). Yield 1.50 g (46%). $^1$H NMR (CDCl$_3$, 400 MHz): δ 7.91 (s, 1H), 7.54-7.59 (m, 2H), 7.47-7.50 (m, 2H), 7.30-7.32 (m, 1H), 7.24 (d, J=8.2 Hz, 1H), 7.04-7.11 (m, 4H), 7.02 (d, J=1.9 Hz, 1H), 6.75 (d, J=1.6 Hz, 1H), 4.17-4.26 (m, 2H), 3.81 (br.s., 1H), 3.25 (sept, J=6.8 Hz, 2H), 2.23 (s, 3H), 1.34 (s, 9H), 1.20 (d, J=6.8, 6H), 1.18 (d, J=6.8, 6H).

Dimethylhafnium [3-tert-butyl-2'-(6-((2,6-diisopropylphenylamido)methyl)pyridin-2-yl)-5-methylbiphenyl-2-olate] (CAT 1)

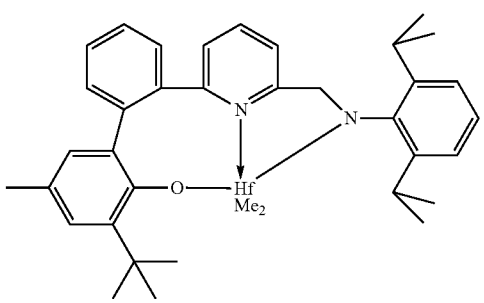

To a suspension of 320 mg (1.00 mmol) of hafnium tetrachloride in 30 mL of dry toluene was added in one portion 1.67 mL (4.50 mmol, 2.7 M) of MeMgBr in diethyl ether at room temperature. The resulting suspension was stirred for 20 minutes. Then a solution of 500 mg (1.00 mmol) of 3-tert-butyl-2'-(6-((2,6-diisopropylphenylamino)methyl)pyridin-2-yl)-5-methylbiphenyl-2-ol in 10 mL of dry toluene was added dropwise over 5 minutes. The mixture was stirred overnight at room temperature and then evaporated to near dryness. The solids obtained were extracted with 2×20 mL of hot methylcyclohexane, and the combined organic extract was filtered through a thin pad of Celite 503. Next, the filtrate was evaporated to dryness. The resulting solid was washed with 5 mL of n-pentane and then dried in vacuo. Yield 520 mg (73%) of a white solid. Anal. Calc. for C$_{37}$H$_{46}$HfN$_2$O: C, 62.30; H, 6.50; N, 3.93. Found: C, 62.46; H, 6.68; N, 3.74. $^1$H NMR (C$_6$D$_6$, 400 MHz): δ 7.23-7.33 (m, 4H), 7.17-7.21 (m, 1H), 7.08-7.14 (m, 2H), 6.99-7.08 (m, 1H), 6.91 (dd, J=0.67, 2.33 Hz, 1H), 6.66-6.73 (m, 1H), 6.59 (t, J=7.71 Hz, 1H), 6.50 (dd, J=1.00, 7.54 Hz, 1H), 6.24-6.30 (m, 1H), 5.13 (d, J=19.96 Hz, 1H), 4.76 (d, J=19.96 Hz, 1H), 4.37 (spt, J=6.84 Hz, 1H), 3.78 (spt, J=6.71 Hz, 1H), 2.18 (s, 3H), 1.53-1.58 (m, 12H), 1.50 (d, J=6.76 Hz, 3H), 1.40 (d, J=6.88 Hz, 3H), 1.22 (d, J=6.88 Hz, 3H), 0.30 (s, 3H), −0.03 (s, 3H). $^{13}$C NMR (CDCl$_3$, 100 MHz): δ 161.85, 159.75, 157.72, 148.81, 145.80, 140.11, 138.59, 137.83, 137.41, 132.38, 130.94, 130.82, 129.20, 129.02, 128.83, 128.22, 127.61, 126.90, 126.88, 125.28, 125.02, 124.07, 123.86, 123.49, 119.48, 66.10, 53.44, 49.10, 34.54, 29.88, 27.67, 27.35, 27.16, 26.70, 24.92, 24.09, 21.47, 20.82.

Catalyst 2 Synthesis

3',5'-Di-tert-butyl-2-(methoxymethoxy)-5-methyl-1,1'-biphenyl

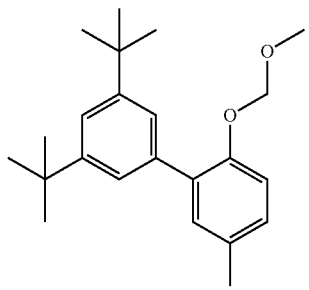 [SMILES: COCOc1ccc(C)cc1-c1cc(C(C)(C)C)cc(C(C)(C)C)c1]

Vacuum dried magnesium turnings (6.30 g, 259 mmol) were combined with 100 mL of dry tetrahydrofuran. The mixture was heated to 60° C. Then a solution of 69.8 g (259 mmol) of a 3,5-di-tert-butyl-bromobenzene in 400 mL of dry tetrahydrofuran was added dropwise over 30 minutes. The resulting solution was heated to reflux for 1 hour and then cooled to room temperature. Further on, 50.0 g (216 mmol) of 2-bromo-1-(methoxymethoxy)-4-methylbenzene and 0.7 g (1.3 mmol) of Pd(P$^t$Bu$_3$)$_2$ were subsequently added. The resulting mixture was stirred overnight at 60° C., then poured into 500 mL of water. The crude product was extracted with 3×400 mL of dichloromethane. The combined organic extract was dried over Na$_2$SO$_4$ and evaporated to near dryness. The residue was distilled using a Kugelrohr apparatus (90° C., 0.3 mbar) yielding 73.0 g (99%) of the title product as a colorless oil. $^1$H NMR (CDCl$_3$, 400 MHz): δ 7.40-7.47 (m, 3H), 7.22 (d, J=1.65 Hz, 1H), 7.11-7.19 (m, 2H), 5.11 (s, 2H), 3.43 (s, 3H), 2.40 (s, 3H), 1.42 (s, 18H).

2-(3',5'-Di-tert-butyl-2-(methoxymethoxy)-5-methyl-[1,1'-biphenyl]-3-yl)-4,4,5,5-tetramethyl-1,3,2-dioxaborolane

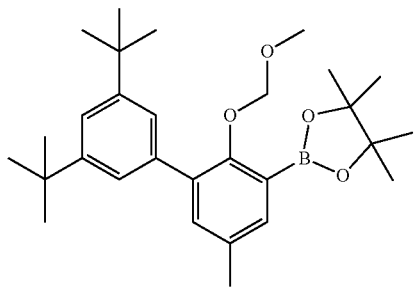 [SMILES: COCOc1c(B2OC(C)(C)C(C)(C)O2)cc(C)cc1-c1cc(C(C)(C)C)cc(C(C)(C)C)c1]

A solution was prepared from 30.0 g (88.1 mmol) of 3',5'-di-tert-butyl-2-(methoxymethoxy)-5-methyl-1,1'-biphenyl and 1,000 mL of diethyl ether. The mixture was cooled to 0° C. To the cooled mixture was added dropwise 70.5 mL (176 mmol, 2.5 M) of $^n$BuLi in hexanes. The resulting suspension was stirred for 3 hours at room temperature, then 53.9 mL (264 mmol) of 2-isopropoxy-4,4,5,5-tetramethyl-1,3,2-dioxaborolane was added in one portion at −50° C. The resulting mixture was stirred overnight at room temperature, then poured into 1,000 mL of water. The crude product was extracted with 3×500 mL of dichloromethane. The combined organic extract was dried over Na$_2$SO$_4$ and evaporated to near dryness. The residue was triturated with 30 mL of methanol, and the obtained precipitate was filtered off and then washed with 30 mL of methanol. This precipitate was dried in vacuo yielding 26.1 g (64%) of the title product as a white powder. $^1$H NMR (CDCl$_3$, 400 MHz): δ 7.61 (s, 1H), 7.34-7.44 (m, 3H), 7.26-7.31 (m, 1H), 4.82 (s, 2H), 2.81 (s, 3H), 2.38 (s, 3H), 1.39 (in, 30H).

2-Bromo-3",5"-di-tert-butyl-2'-(methoxymethoxy)-5'-methyl-1,1':3',1"-terphenyl

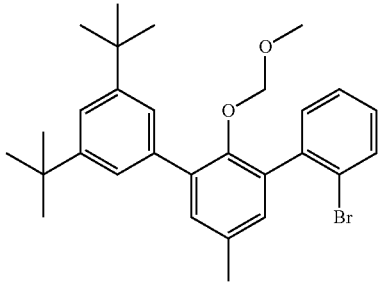 [SMILES: COCOc1c(-c2cc(C(C)(C)C)cc(C(C)(C)C)c2)cc(C)cc1-c1ccccc1Br]

To a solution of 13.0 g (27.9 mmol) of 2-(3',5'-di-tert-butyl-2-(methoxymethoxy)-5-methyl-[1,1'-biphenyl]-3-yl)-4,4,5,5-tetramethyl-1,3,2-dioxaborolane in 100 mL of 1,4-dioxane were added 8.69 g (30.7 mmol) of 1-bromo-2-iodobenzene, 9.63 g (69.7 mmol) of potassium carbonate, and 50 mL of water. The mixture obtained was sparged with argon for 10 minutes, then 1.61 g (1.39 mmol) of Pd(PPh$_3$)$_4$ was added. This mixture was stirred for 12 hours at 90° C., then cooled to room temperature and diluted with 50 mL of water. The obtained mixture was extracted with dichloromethane (3×100 mL). The combined organic extract was dried over Na$_2$SO$_4$ and then evaporated to dryness. The residue was purified by flash chromatography on silica gel 60 (40-63 micron, eluent:hexane). Yield 12.0 g (87%) of a colorless glassy solid. $^1$H NMR (CDCl$_3$, 400 MHz): δ 7.72 (d, J=7.98 Hz, 1H), 7.47-7.54 (m, 3H), 7.33-7.47 (m, 2H), 7.19-7.31 (m, 2H), 7.09 (d, J=1.65 Hz, 1H), 4.29-4.42 (m, 2H), 2.63 (s, 3H), 2.44 (s, 3H), 1.41 (s, 18H).

2-(3',5'-Di-tert-butyl-2-(methoxymethoxy)-5-methyl-biphenyl-3-yl)-4,4,5,5-tetramethyl-1,3,2-dioxaborolane

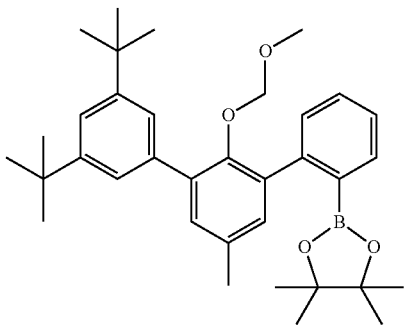 [SMILES: COCOc1c(-c2cc(C(C)(C)C)cc(C(C)(C)C)c2)cc(C)cc1-c1ccccc1B1OC(C)(C)C(C)(C)O1]

A solution of 3.00 g (6.06 mmol) of 2-bromo-3'',5''-di-tert-butyl-2'-(methoxymethoxy)-5'-methyl-1,1':3',1''-terphenyl in 50 mL of tetrahydrofuran was cooled to −78° C. To this cold mixture was added dropwise 2.5 mL (6.24 mmol, 2.5 M) of ⁿBuLi in hexanes. The resulting solution was stirred for 1 hour at −78° C., then 1.9 mL (9.09 mmol) of 2-isopropoxy-4,4,5,5-tetramethyl-1,3,2-dioxaborolane was added in one portion at −78° C. The resulting mixture was stirred overnight at room temperature, then poured into 50 mL of water. The crude product was extracted with 3×30 mL of dichloromethane. The combined organic extract was dried over $Na_2SO_4$ and evaporated to dryness. Yield 3.22 g (98%) of a colorless glassy solid. $^1$H NMR ($CDCl_3$, 400 MHz): δ 7.75 (d, J=7.3 Hz, 1H), 7.42-7.47 (m, 3H), 7.29-7.38 (m, 3H), 7.15 (s, 1H), 7.08 (s, 1H), 4.24 (s, 2H), 2.55 (s, 3H), 2.38 (s, 3H), 1.35 (s, 18H), 1.25 (s, 12H).

3-(3,5-Di-tert-butylphenyl)-2'-(6-((2,6-diisopropylphenylamino)methyl)pyridin-2-yl)-5-methylbiphenyl-2-ol

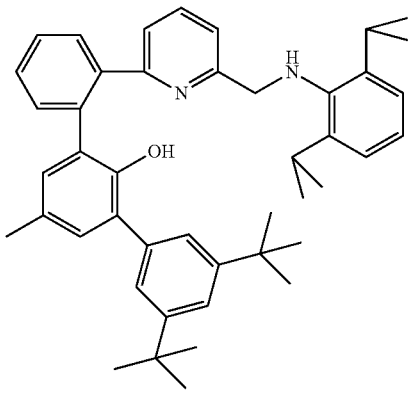 [SMILES: Cc1cc(-c2cc(C(C)(C)C)cc(C(C)(C)C)c2)c(O)c(-c2ccccc2-c2cccc(CNc3c(C(C)C)cccc3C(C)C)n2)c1]

To a solution of 2.06 g (3.80 mmol) of 2-(3',5'-di-tert-butyl-2-(methoxymethoxy)-5-methylbiphenyl-3-yl)-4,4,5,5-tetramethyl-1,3,2-dioxaborolane and 1.20 g (3.46 mmol) of N-[(6-bromopyridin-2-yl)methyl]-2,6-diisopropylaniline in 30 mL of 1,4-dioxane were added 4.23 g (12.97 mmol) of cesium carbonate and 20 mL of water. The mixture obtained was sparged with argon with 30 minutes, followed by an addition of 370 mg (0.321 mmol) of Pd(PPh$_3$)$_4$. This mixture was stirred for 12 hours at 95° C., then cooled to room temperature, and diluted with 50 mL of water. To the obtained two-phase mixture was added 50 mL of diethyl ether. The organic layer was separated and washed with brine. The resulting solution was dried over $Na_2SO_4$ and then evaporated to dryness. To the resulting oil were added 40 mL of tetrahydrofuran, 40 mL of methanol and 1.8 mL of 12N hydrochloric acid. The reaction mixture was stirred overnight at 60° C. and then poured into 200 mL of water. Sodium bicarbonate was added until pH~7. The obtained mixture was extracted with dichloromethane (3×50 mL), the combined organic extract was dried over $Na_2SO_4$ and then evaporated to dryness. The residue was purified by flash chromatography on silica gel 60 (40-63 micron, eluent: hexane-ethyl acetate-triethylamine=100:10:1, vol.). Yield 1.81 g (82%) a colorless glassy solid. $^1$H NMR ($CDCl_3$, 400 MHz): δ 7.76-7.78 (m, 1H), 7.46-7.53 (m, 4H), 7.36-7.37 (m, 1H), 7.19-7.20 (m, 2H), 7.12 (d, J=8.1 Hz, 1H), 7.04-7.09 (m, 5H), 6.97 (br.s., 1H), 6.69 (br.s., 1H), 4.16 (s, 2H), 3.95 (br.s., 1H), 3.24 (sept, J=6.9 Hz, 2H), 2.31 (s, 3H), 1.31 (s, 18H), 1.15 (d, J=6.9 Hz, 12H).

Dimethylhafnium [3-(3,5-di-tert-butylphenyl)-2'-(6-((2,6-diisopropylphenylamido)methyl)pyridin-2-yl)-5-methylbiphenyl-2-olate] (CAT 2)

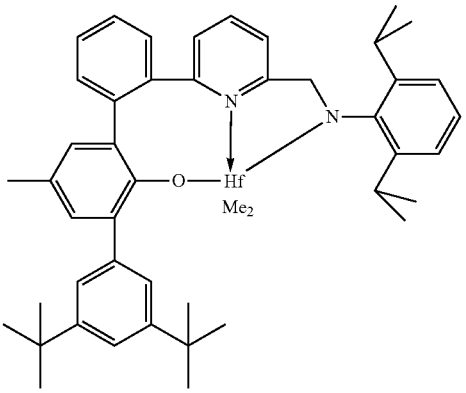

To a suspension of 250 mg (0.782 mmol) of hafnium tetrachloride in 30 mL of dry toluene was added in one portion 1.30 mL (3.52 mmol, 2.7 M) of MeMgBr in diethyl ether at room temperature. The resulting suspension was stirred for 20 minutes. Then a solution of 500 mg (1.00 mmol) of 3-(3,5-di-tert-butylphenyl)-2'-(6-((2,6-diisopropylphenylamino)methyl)pyridin-2-yl)-5-methylbiphenyl-2-ol in 10 mL of dry toluene was added dropwise over 5 minutes. The reaction mixture was stirred overnight at room temperature and then evaporated to near dryness. The solids obtained were extracted with 2×20 mL of hot methylcyclohexane, and the combined organic extract was filtered through a thin pad of Celite 503. Next, the filtrate was evaporated to dryness. The resulting solid was washed with 5 mL of n-pentane and then dried in vacuo. Yield 560 mg (85%) of a white solid. Anal. Calc. for $C_{47}H_{58}HfN_2O$: C, 66.77; H, 6.91; N, 3.31. Found: C, 67.00; H, 7.02; N, 3.18. $^1$H NMR ($C_6D_6$, 400 MHz): δ 7.76 (t, J=7.76 Hz, 1H), 7.53-7.60 (m, 1H), 7.37-7.49 (m, 3H), 7.32 (t, J=1.66 Hz, 1H), 7.22-7.28 (m, 1H), 7.14-7.22 (m, 3H), 7.08-7.14 (m, 1H), 7.01-7.08 (m, 1H), 6.98 (d, J=2.22 Hz, 1H), 6.93 (dd, J=1.55, 7.54 Hz, 1H), 6.82 (d, J=2.22 Hz, 1H), 4.70-4.88 (m, 2H), 3.84-4.01 (m, 1H), 2.59 (spt, J=6.76 Hz, 1H), 2.24 (s, 3H), 1.21-1.51 (m, 21H), 1.18 (d, J=6.88 Hz, 3H), 0.94 (d, J=6.88 Hz, 3H), 0.33 (d, J=6.76 Hz, 3H), −0.53 (s, 6H). $^{13}$C NMR ($CDCl_3$, 100 MHz): δ 162.40, 160.09, 155.88, 148.47, 145.41, 145.04, 139.80, 138.89, 138.40, 138.02, 132.91, 132.07, 131.93, 131.11, 130.72, 129.20, 129.03, 128.95, 128.22, 127.94, 127.04, 125.29, 124.83, 123.58, 123.54, 122.08, 119.83, 67.04, 54.60, 47.54, 34.89, 31.67, 27.67, 27.39, 26.25, 26.14, 24.95, 23.30, 20.40.

Catalyst 3 Synthesis 4-(9H-Carbazol-9-yl)-2-methyl-6H-dibenzo[c,e][1,2]oxaborinin-6-ol

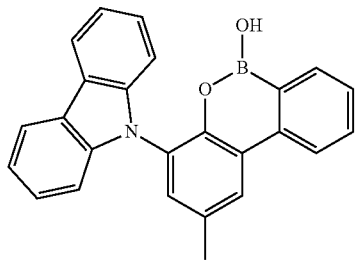 [SMILES: Cc1cc2c(c(-n3c4ccccc4c4ccccc43)c1)OB(O)c1ccccc1-2]

To 900 mg (37.1 mmol) of a vacuum dried magnesium powder were added 50 mL of dry tetrahydrofuran and 2.94 g (7.42 mmol) of 1-bromo-3-(9H-carbazol-9-yl)-2-(methoxymethoxy)-5-methylbenzene. The reaction mixture was stirred overnight at 55° C., then a solution of 1.49 g (7.79 mmol) of 1-bromo-2-chlorobenzene in 20 mL of tetrahydrofuran was added dropwise over 3 hours. The suspension obtained was stirred overnight at 55° C., then it was cooled to 0° C. followed by an addition of 2.07 g (11.1 mmol) of 2-isopropoxy-4,4,5,5-tetramethyl-1,3,2-dioxaborolane. The resulting mixture was stirred overnight at room temperature, then poured into 100 mL of water. The crude product was extracted with 3×100 mL of dichloromethane. The combined organic extract was dried over $Na_2SO_4$ and then evaporated to near dryness. The residue was purified by flash chromatography on silica gel 60 (40-63 micron; eluent:hexane-ethyl acetate=10:1, vol.). Yield 1.05 g (36%) of a dark red oil. $^1$H NMR (CDCl$_3$, 400 MHz): δ 8.26 (d, J=8.32 Hz, 1H), 8.12-8.17 (m, 2H), 8.11 (d, J=2.11 Hz, 1H), 8.06 (dd, J=0.94, 7.49 Hz, 1H), 7.73-7.80 (m, 1H), 7.49 (dt, J=0.89, 7.37 Hz, 1H), 7.35-7.40 (m, 3H), 7.24-7.30 (m, 2H), 7.17 (td, J=0.79, 8.18 Hz, 2H), 4.29 (s, 1H), 2.53 (s, 3H).

3-(9H-Carbazol-9-yl)-2'-(6-{[(2,6-diisopropylphenyl)amino]methyl}pyridin-2-yl)-5-methylbiphenyl-2-ol

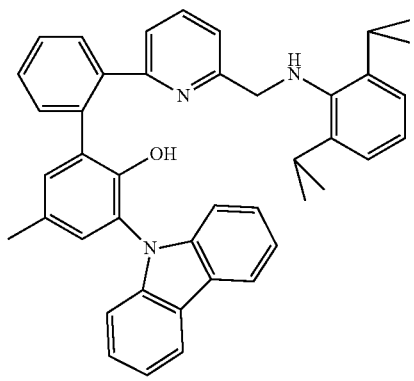 [SMILES: Cc1cc(-c2ccccc2-c2cccc(CNc3c(C(C)C)cccc3C(C)C)n2)c(O)c(-n2c3ccccc3c3ccccc32)c1]

To a solution of 0.77 g (2.05 mmol) of 4-(9H-carbazol-9-yl)-2-methyl-6H-dibenzo[c,e][1,2]oxaborinin-6-ol in 8 mL of 1,4-dioxane were added 0.71 g (2.05 mmol) of N-[(6-bromopyridin-2-yl)methyl]-2,6-diisopropylaniline, 1.66 g (69.7 mmol) of cesium carbonate, and 4 mL of water. The mixture obtained was sparged with argon for 10 minutes followed by addition of 0.119 g (0.10 mmol) of Pd(PPh$_3$)$_4$. This mixture was stirred for 12 hours at 90° C., then cooled to room temperature, and diluted with 20 mL of water. The obtained mixture was extracted with dichloromethane (3×30 mL). The combined organic extract was dried over $Na_2SO_4$ and then evaporated to dryness. The residue was purified by flash chromatography on silica gel 60 (40-63 micron, eluent: hexane-ethyl acetate=15:1). Yield 0.95 g (75%) of a white solid. $^1$H NMR (CDCl$_3$, 400 MHz): δ 8.13 (d, J=7.98 Hz, 2H), 7.64-7.76 (m, 2H), 7.51-7.63 (m, 3H), 7.23-7.51 (m, 7H), 7.19-7.23 (m, 1H), 7.14-7.17 (m, 1H), 7.04-7.09 (m, 3H), 3.97 (s, 2H), 3.78 (br. s., 1H), 3.12 (spt, J=6.82 Hz, 2H), 2.35 (s, 3H), 1.10 (d, J=6.88 Hz, 12H).

Dimethylhafnium [3-(9H-carbazol-9-yl)-2'-(6-((2,6-diisopropylphenylamido)methyl)pyridin-2-yl)-5-methylbiphenyl-2-olate] (CAT 3)

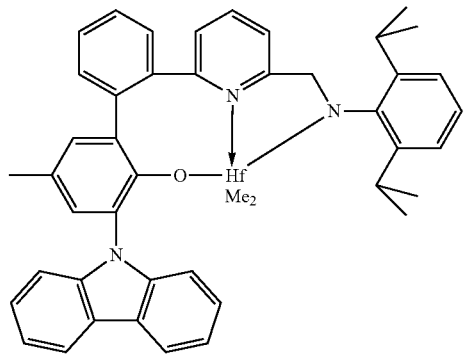

To a suspension of 156 mg (0.487 mmol) of hafnium tetrachloride in 30 mL of dry toluene was added in one portion 0.755 mL (2.20 mmol, 2.7M) of MeMgBr in diethyl ether at room temperature. The resulting suspension was stirred for 20 minutes. Then a solution of 300 mg (1.00 mmol) of 3-(9H-carbazol-9-yl)-2'-(6-((2,6-diisopropylphenylamino)methyl)pyridin-2-yl)-5-methylbiphenyl-2-ol in 10 mL of dry toluene was added dropwise over 5 minutes. The reaction mixture was stirred overnight at room temperature and then evaporated to near dryness. The solids obtained were extracted with 2×20 mL of boiling methylcyclohexane, and the combined organic extract was filtered through a thin pad of Celite 503. Next, the filtrate was evaporated to dryness. The resulting solid was washed with 5 mL of n-pentane and then dried in vacuo. Yield 257 mg (64%) of a white solid. Anal. Calc. for $C_{45}H_{45}HfN_3O$: C, 65.72; H, 5.52; N, 5.11. Found: C, 65.95; H, 5.67; N, 4.98. $^1$H NMR (C$_6$D$_6$, 400 MHz): δ 8.15 (d, J=7.65 Hz, 1H), 8.07-8.12 (m, 1H), 7.49 (d, J=8.10 Hz, 1H), 7.43 (dd, J=1.22, 7.65 Hz, 1H), 7.17-7.37 (m, 5H), 7.07-7.14 (m, 5H), 6.79 (dd, J=1.33, 7.65 Hz, 1H), 6.62-6.73 (m, 2H), 6.49-6.59 (m, 2H), 6.23-6.34 (m, 2H), 4.79 (d, J=19.96 Hz, 1H), 4.54 (d, J=19.96 Hz, 1H), 4.09 (spt, J=6.88 Hz, 1H), 2.33 (spt, J=6.84 Hz, 1H), 1.93-2.04 (m, 3H), 1.41 (d, J=6.88 Hz, 3H), 1.11 (d, J=6.88 Hz, 3H), 1.00 (d, J=6.76 Hz, 3H), 0.82-0.89 (m, 3H), −0.07 (s, 3H), −0.57 (s, 3H). $^{13}$C NMR (C$_6$D$_6$, 100 MHz): δ 162.90, 160.23, 156.34, 147.75, 147.21, 146.12, 142.72, 142.56, 139.17, 138.98, 138.48, 133.97, 131.21, 130.79, 130.49, 130.04, 129.68, 128.89, 127.85, 127.01, 126.32, 125.71, 125.19, 124.87, 124.30, 124.22, 123.98, 121.39, 120.73, 120.58, 120.23, 119.88, 112.16, 109.59, 66.27, 55.05, 50.74, 28.44, 28.26, 28.18, 27.26, 25.35, 23.80, 20.73.

Catalyst 4 Synthesis 1-(6-(3",5"-Di-tert-butyl-2'-(methoxymethoxy)-5'-methyl-[1,1':3',1"-terphenyl]-2-yl)pyridin-2-yl)-N-(2,6-diisopropylphenyl)methanimine

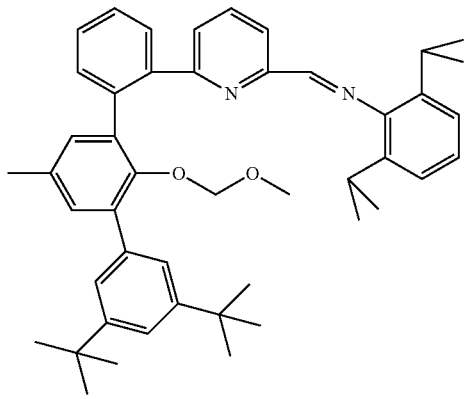 [SMILES: COCOc1c(-c2cc(C(C)(C)C)cc(C(C)(C)C)c2)cc(C)cc1-c1ccccc1-c1cccc(C=Nc2c(C(C)C)cccc2C(C)C)n1]

To a solution of 1.50 g (2.76 mmol) of 2-(3',5'-di-tert-butyl-2-(methoxymethoxy)-5-methylbiphenyl-3-yl)-4,4,5,5-tetramethyl-1,3,2-dioxaborolane in 20 mL of toluene were added 0.96 g (2.76 mmol) of N-[-(6-bromopyridin-2-yl)methylene]-2,6-diisopropylaniline, 0.73 g (6.90 mmol) of sodium carbonate, 15 mL of water and 5 mL methanol. The mixture obtained was sparged with argon for 10 minutes followed by addition of 0.16 g (0.14 mmol) of Pd(PPh$_3$)$_4$. This mixture was stirred for 12 hours at 90° C., then cooled to room temperature and diluted with 50 mL of water. The obtained mixture was extracted with dichloromethane (3×60 mL). The combined organic extract was dried over Na$_2$SO$_4$ and then evaporated to dryness. The residue was purified by flash chromatography on silica gel 60 (40-63 micron, eluent: hexane-ethyl acetate=15:1). Yield 1.47 g (78%) of a yellow solid. $^1$H NMR (CDCl$_3$, 400 MHz): δ 8.15-8.32 (m, 2H), 7.81-7.93 (m, 2H), 7.61-7.81 (m, 2H), 7.45-7.61 (m, 5H), 7.31-7.43 (m, 2H), 7.23-7.31 (m, 3H), 6.95-7.23 (m, 12H), 4.16 (d, J=7.10 Hz, 2H), 2.81-3.01 (m, 2H), 2.48 (s, 3H), 2.36-2.39 (m, 5H), 1.28-1.32 (m, 18H), 1.06-1.16 (m, 12H).

3",5"-Di-tert-butyl-2-(6-(((2,6-diisopropylphenyl)amino)(2-isopropylphenyl)methyl)pyridin-2-yl)-5'-methyl-[1,1':3',1"-terphenyl]-2'-ol

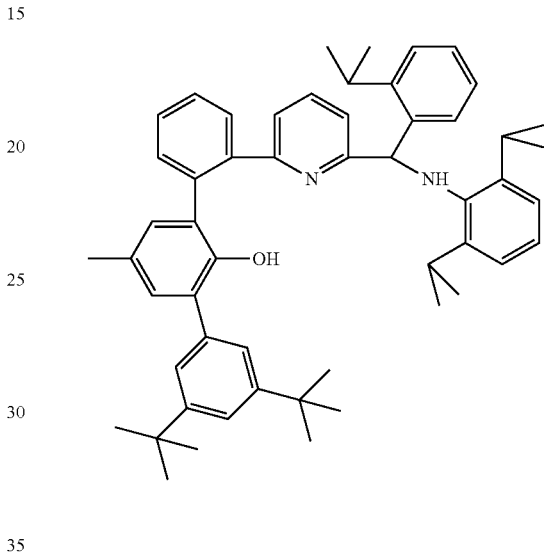

To a solution of 1.44 g (2.11 mmol) of 1-(6-(3",5"-di-tert-butyl-2'-(methoxymethoxy)-5'-methyl-[1,1':3',1"-terphenyl]-2-yl)pyridin-2-yl)-N-(2,6-diisopropylphenyl)methanimine in 100 mL of diethyl ether was added 0.80 g (6.34 mmol) of (2-isopropylphenyl)lithium. The resulting solution was stirred overnight at room temperature, and then poured into 200 mL of water. To the obtained two-phase mixture was added 100 mL of diethyl ether. The organic layer was separated and washed with brine. The resulting solution was dried over Na$_2$SO$_4$ and then evaporated to dryness. To the resulting oil were added 70 mL of tetrahydrofuran, 70 mL of methanol and 1.9 mL of 12 N hydrochloric acid. The reaction mixture was stirred overnight at 60° C. and then poured into 200 mL of water. Sodium bicarbonate was added until pH~7. The obtained mixture was extracted with dichloromethane (3×50 mL), the combined organic extract was dried over Na$_2$SO$_4$ and then evaporated to dryness. The residue was purified by flash chromatography on silica gel 60 (40-63 micron, eluent: hexane-ethyl acetate=10:1, vol.). Yield 1.45 g (91%) of a white foam. $^1$H NMR (CDCl$_3$, 400 MHz): δ7.29-7.57 (m, 6H), 7.08-7.23 (m, 5H), 6.85-7.08 (m, 7H), 6.63-6.85 (m, 1H), 5.29-5.59 (m, 1H), 3.16-3.45 (m, 1H), 3.02-3.16 (m, 1H), 2.89-3.02 (m, 1H), 2.87 (br. s., 1H), 2.77 (br. s., 1H), 2.14-2.43 (m, 3H), 1.32 (s, 18H), 0.73-1.03 (m, 18H).

Dimethylhafnium [3",5"-di-tert-butyl-2-(6-(((2,6-diisopropylphenyl)amido)(2-isopropylphenyl)methyl)pyridin-2-yl)-5'-methyl-[1,1':3',1"-terphenyl]-2'-olate] (CAT 4)

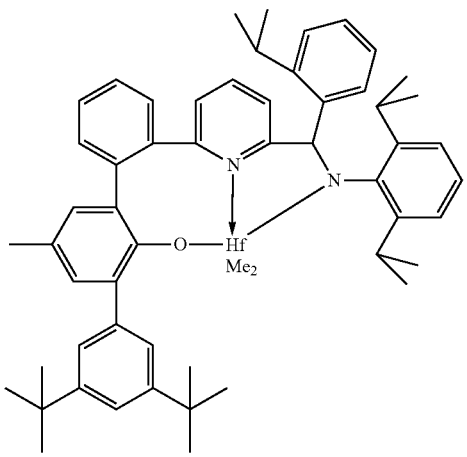

To a suspension of 211 mg (0.660 mmol) of hafnium tetrachloride in 30 mL of dry toluene was added in one portion 1.02 mL (2.97 mmol, 2.9 M) of MeMgBr in diethyl ether at room temperature. The resulting suspension was stirred for 20 minutes. Then a solution of 500 mg (0.66 mmol) of 3",5"-di-tert-butyl-2-(6-(((2,6-diisopropylphenyl)amino)(2-isopropylphenyl)methyl)-pyridin-2-yl)-5'-methyl-[1,1':3',1"-terphenyl]-2'-ol in 10 mL of dry toluene was added dropwise over 5 minutes. The reaction mixture was stirred overnight at room temperature and then evaporated to near dryness. The solids obtained were extracted with 2×20 mL of hot methylcyclohexane, and the combined organic extract was filtered through a thin pad of Celite 503. Next, the filtrate was evaporated to dryness. The resulting solid was washed with 5 mL of n-pentane and then dried in vacuo. Yield 198 mg (31%, a mixture of isomers of ca. 80% purity) of a dark yellow powder. $^1$H NMR ($C_6D_6$, 400 MHz): δ 7.47 (t, J=1.77 Hz, 1H), 7.18-7.42 (m, 3H), 6.87-7.14 (m, 8H), 6.72-6.82 (m, 1H), 6.47-6.72 (m, 2H), 6.26-6.47 (m, 2H), 4.04-4.13 (m, 1H), 3.15 (td, J=6.58, 13.56 Hz, 1H), 2.74-3.02 (m, 1H), 2.15-2.26 (m, 2H), 2.02-2.15 (m, 1H), 1.96 (br. s., 1H), 1.40-1.58 (m, 11H), 1.18-1.39 (m, 15H), 1.06-1.16 (m, 3H), 1.05 (d, J=7.54 Hz, 1H), 0.68-0.97 (m, 4H), 0.48-0.68 (m, 5H), 0.03-0.39 (m, 6H).

Catalyst 5 Synthesis

N-(2,6-Dibromo-4-methylphenyl)-N'-methylurea

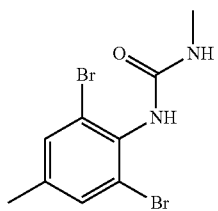

A solution was prepared from 92.0 g (347 mmol) of 2,6-dibromo-4-methylaniline and 2,000 mL of dry o-xylene. To this mixture was added in small portions 123 g (296 mmol) of triphosgene at room temperature. The reaction mixture was gently warmed to 110° C. and stirred for 40 minutes at this temperature (Caution: phosgene evolution). The resulting mixture was heated to reflux for 8 hours and then evaporated to dryness. The residue was diluted with 400 mL of dichloromethane followed by an addition of 300 mL of 40% methylamine in water. The resulting suspension was stirred for 30 minutes, and then the obtained product was collected on a glass frit (G3). The precipitate was washed with methanol (300 mL) and then dried under reduced pressure. Yield 88.2 g (79%) of a colorless solid. $^1$H NMR (DMSO-d6): δ 7.87 (br.s, 1H), 7.49 (s, 2H), 6.08 (br.s, 1H), 2.59 (d, J=4.1 Hz, 3H), 2.27 (s, 3H).

N-(2,6-Dibromo-4-methylphenyl)-N-(4-methoxybenzyl)-N'-methylurea

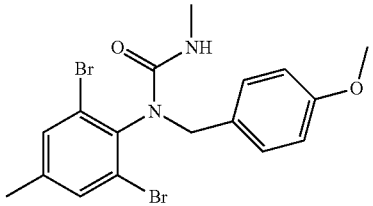

A suspension of 88.0 g (273 mmol) of N-(2,6-dibromo-4-methylphenyl)-N'-methylurea in 1,000 mL of dry toluene was cooled to −25° C. To this suspension was added dropwise 111 mL (279 mmol, 2.5 M) of n-butyllithium in hexane. The reaction mixture was stirred for 3 hours at room temperature, then evaporated to dryness. The residue was diluted with 1,000 mL of dry tetrahydrofuran followed by an addition of 55.4 g (347 mmol) of 4-methoxybenzyl chloride and 50 mL of HMPA. The obtained mixture was stirred for 18 hours at 60° C., then cooled to room temperature and poured into a 2,000 mL of water. The crude product was extracted with toluene (3×300 mL). The combined organic extract was dried over $Na_2SO_4$, then passed through a pad of silica gel 60 (40-63 micron, 100 mL), and the obtained elute was evaporated to dryness. The residue was washed with 120 mL of diethyl ether, and the crystalline material thus obtained was dried under reduced pressure. Yield 78.0 g (64%) of a colorless crystalline solid. $^1$H NMR ($CDCl_3$): δ 7.36 (s, 2H), 7.14-7.17 (m, 2H), 6.69-6.73 (m, 2H), 4.75 (s, 2H), 3.93 (br.s, 1H), 3.74 (s, 3H), 2.75 (d, J=4.68 Hz, 3H), 2.29 (s, 3H).

4-Bromo-3-(4-methoxybenzyl)-1,6-dimethyl-1,3-dihydro-2H-benzimidazol-2-one

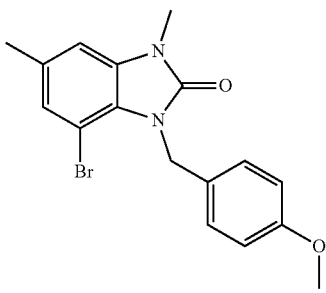

A solution was prepared from 78.0 g (176 mmol) of N-(2,6-dibromo-4-methylphenyl)-N-(4-methoxybenzyl)-N'-methylurea and 1,200 mL of freshly distilled DMSO. To this mixture was added 19.8 g (352 mmol) of KOH. The mixture was stirred for 48 hours at 40° C. and then poured into 2,000 mL of water. The crude product was extracted with diethyl ether (3×400 mL). The combined organic extract was dried over $Na_2SO_4$ and then passed through a pad of silica gel 60 (40-63 micron, 100 mL). The obtained elute was evaporated to dryness. The residue was washed with 120 mL of diethyl ether, and the crystalline material thus obtained was dried under reduced pressure. Yield 43.4 g (69%) of a colorless crystals. $^1$H NMR ($CDCl_3$): δ 7.19-7.23 (m, 2H), 6.99 (m, 1H), 6.79-6.82 (m, 2H), 6.72 (m, 1H), 5.39 (s, 2H), 3.75 (s, 3H), 3.40 (s, 3H), 2.34 (s, 3H).

4-[(2,6-Diisopropylphenyl)amino]-1,6-dimethyl-1,3-dihydro-2H-benzimidazol-2-one

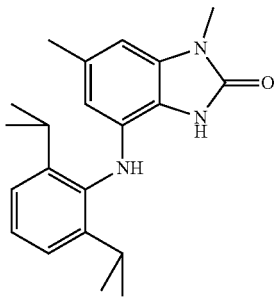 [SMILES: Cc1cc(Nc2c(C(C)C)cccc2C(C)C)c2[nH]c(=O)n(C)c2c1]

A solution was prepared from 22.0 mL (124 mmol) of 2,6-diisopropylaniline and 900 mL of dry toluene. To this mixture was added dropwise 45.5 mL (147 mmol, 2.5 M) of n-butyllithium. The obtained suspension was heated to 100° C. and then cooled to room temperature. To the reaction mixture were added 1.78 g (3.10 mmol) of $Pd(dba)_2$, 2.96 g (6.20 mmol) of XPhos and 37.3 g (103 mmol) of 4-bromo-3-(4-methoxybenzyl)-1,6-dimethyl-1,3-dihydro-2H-benzimidazol-2-one. The dark brown suspension thus obtained was heated to 100° C. for 48 hours and then poured into 500 mL of water. The organic layer was separated, dried over $Na_2SO_4$ and then evaporated to dryness. The obtained oil was dissolved in a mixture of 340 mL of dichloromethane, 250 mL of trifluoroacetic acid and 75 mL of triflic acid. This mixture was stirred for 48 hours at room temperature and then gently poured into a solution of 700 g of $K_2CO_3$ in 2000 mL of water. The organic layer was separated, the aqueous phase was additionally extracted with 3×400 mL of dichloromethane. The combined organic extract was dried over $Na_2SO_4$ and then evaporated to dryness. The resulting solid was triturated with 100 mL of diethyl ether, and the suspension thus obtained was filtered off on a glass frit (G3). The precipitate was dried under reduced pressure. Yield 24.6 g (71%) of a white solid. $^1$H NMR ($CDCl_3$): δ 7.28-7.32 (m, 1H), (7.21-7.23 (m, 2H), 6.66 (br.s, 1H), 6.05 (s, 1H), 5.73 (s, 1H), 3.43 (br.s, 2H), 2.54 (br.s, 3H), 2.20 (s, 3H), 1.13 (br.s, 12H).

2-Chloro-N-(2,6-diisopropylphenyl)-1,6-dimethyl-1H-benzimidazol-4-amine

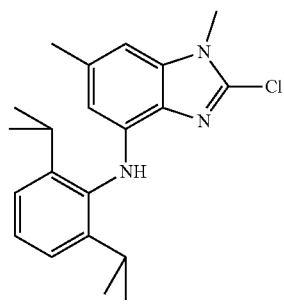 [SMILES: Cc1cc(Nc2c(C(C)C)cccc2C(C)C)c2nc(Cl)n(C)c2c1]

A flask was loaded with 400 mL of phosphorus oxychloride. To this was added in one portion 24.6 g (73.0 mmol) of 4-[(2,6-diisopropylphenyl)amino]-1,6-dimethyl-1,3-dihydro-2H-benzimidazol-2-one. The resulting suspension was heated for 40 hours at 105° C. and then evaporated to dryness. The resulting oil was triturated with 200 mL of diethyl ether. The obtained solution was washed with 200 mL of water, dried over $Na_2SO_4$ and then evaporated to dryness. The formed solid was triturated with 30 mL of cold n-hexane, and the solid thus obtained was collected on a glass frit (G3). The product was dried under reduced pressure. Yield 18.9 g (73%) of a yellow-green solid. $^1$H NMR ($CDCl_3$): δ 7.31-7.35 (m, 1H), δ 7.23-7.25 (m, 2H), 6.43 (m, 1H), 6.10 (br.s, 1H), 5.76 (m, 1H), 3.71 (s, 3H), 3.32 (sept, J=6.94 Hz, 2H), 2.26 (s, 3H), 1.13 (d, J=6.94 Hz, 12H).

3-tert-Butyl-2'-{4-[(2,6-diisopropylphenyl)amino]-1,6-dimethyl-1H-benzimidazol-2-yl}-5-methylbiphenyl-2-

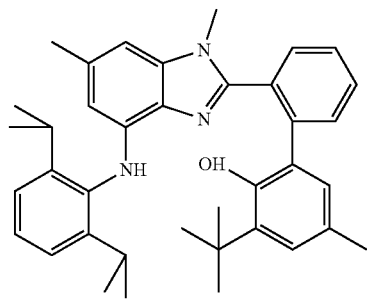 [SMILES: Cc1cc(-c2ccccc2-c2nc3c(Nc4c(C(C)C)cccc4C(C)C)cc(C)cc3n2C)c(O)c(C(C)(C)C)c1]

To a solution of 2.00 g (4.88 mmol) of 2-(3'-(tert-butyl)-2'-(methoxymethoxy)-5'-methyl-[1,1'-biphenyl]-2-yl)-4,4,5,5-tetramethyl-1,3,2-dioxaborolane and 1.69 g (4.75 mmol)

of 2-chloro-N-(2,6-diisopropylphenyl)-1,6-dimethyl-1H-benzimidazol-4-amine in 30 mL of 1,4-dioxane were added 4.00 g (12.27 mmol) of cesium carbonate and 20 mL of water. The resulting mixture was sparged with argon with 30 minutes, followed by an addition of 370 mg (0.321 mmol) of Pd(PPh$_3$)$_4$. This mixture was stirred for 12 hours at 95° C., then cooled to room temperature, and diluted with 50 mL of water. To the obtained two-phase mixture was added 50 mL of diethyl ether. The organic layer was separated and washed with brine. The resulting solution was dried over Na$_2$SO$_4$ and then evaporated to dryness. To the resulting oil were added 40 mL of tetrahydrofuran, 40 mL of methanol and 1.9 mL of 12 N hydrochloric acid. The reaction mixture was stirred overnight at 60° C. and then poured into 200 mL of water. Sodium bicarbonate was added until pH~7. The obtained mixture was extracted with dichloromethane (3×50 mL), the combined organic extract was dried over Na$_2$SO$_4$ and then evaporated to dryness. The residue was purified by flash chromatography on silica gel 60 (40-63 micron, eluent: hexane-ethyl acetate-triethylamine=100:10:1, vol.). Yield 950 mg (36%) a colorless glassy solid. $^1$H NMR (CDCl$_3$, 400 MHz): δ 7.55-7.59 (m, 1H), 7.46-7.52 (m, 2H), 7.42 (dd, J$_1$=7.6 Hz, J$_2$=0.83 Hz, 1H), 7.31-7.35 (m, 1H), 7.23-7.25 (m, 2H), 7.02 (d, J=1.89 Hz, 1H), 6.79 (d, J=2.2 Hz, 1H), 6.43 (s, 1H), 6.05 (s, 1H), 5.77 (d, J=0.89 Hz, 1H), 3.47 (s, 3H), 3.21 (br. s, 2H), 2.24 (s, 3H), 2.23 (s, 3H), 1.37 (s, 9H), 1.05-1.18 (m, 12H).

Dimethylhafnium [3-tert-butyl-2'-{4-[(2,6-diisopropylphenyl)amido]-1,6-dimethyl-1H-benzimidazol-2-yl}-5-methylbiphenyl-2-olate] (CAT 5)

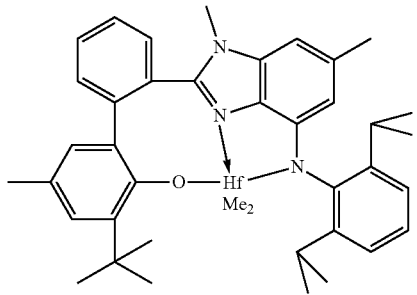

To a suspension of 172 mg (0.536 mmol) of hafnium tetrachloride in 30 mL of dry toluene was added in one portion 0.830 mL (2.41 mmol, 2.9 M) of MeMgBr in diethyl ether at room temperature. The resulting suspension was stirred for 20 minutes, and a solution of 300 mg (0.536 mmol) of 3-tert-butyl-2'-{4-[(2,6-diisopropylphenyl) amino]-1,6-dimethyl-1H-benzimidazol-2-yl}-5-methylbiphenyl-2-ol in 10 mL of dry toluene was added dropwise over 5 minutes. The reaction mixture was stirred overnight at room temperature and then evaporated to near dryness. The solids obtained were extracted with 2×20 mL of boiling methylcyclohexane, and the combined organic extract was filtered through a thin pad of Celite 503. Next, the filtrate was evaporated to dryness. The resulting solid was washed with 5 mL of n-pentane and then dried in vacuo. Yield 204 mg (50%) of a yellow solid. Anal. Calc. for C$_{40}$H$_{49}$HfN$_3$: C, 62.69; H, 6.45; N, 5.48. Found: C, 62.92; H, 6.57; N, 5.36. $^1$H NMR (C$_6$D$_6$, 400 MHz): δ 7.39-7.46 (m, 1H), 7.28-7.38 (m, 3H), 7.25 (d, J=2.00 Hz, 1H), 6.99-7.14 (m, 2H), 6.95 (dt, J=1.28, 7.57 Hz, 1H), 6.74 (dd, J=0.67, 2.33 Hz, 1H), 6.25 (dd, J=1.00, 7.76 Hz, 1H), 5.80-5.87 (m, 2H), 4.17 (sept, J=6.76 Hz, 1H), 3.54-3.68 (m, 1H), 2.72 (s, 3H), 2.21 (s, 3H), 2.08-2.15 (m, 3H), 1.64-1.74 (m, 8H), 1.49 (d, J=6.88 Hz, 3H), 1.35-1.42 (m, 6H), 1.10 (d, J=6.76 Hz, 3H), 0.51 (s, 3H), 0.35 (s, 3H). $^{13}$C NMR (C$_6$D$_6$, 100 MHz): δ 159.49, 152.24, 149.37, 146.50, 146.01, 145.79, 143.08, 139.21, 137.42, 134.27, 133.56, 132.32, 131.90, 131.77, 130.46, 129.69, 128.89, 127.31, 126.63, 126.02, 124.77, 124.73, 108.11, 98.47, 57.51, 53.22, 35.46, 31.33, 30.97, 29.15, 28.91, 27.60, 27.03, 26.81, 25.56, 25.21, 23.06, 21.19, 14.75.

Polymerization Examples

Solvents, polymerization grade toluene and/or isohexanes were supplied by ExxonMobil Chemical Co. and were purified by passing through a series of columns: two 500 cm$^3$ Oxyclear cylinders in series from Labclear (Oakland, Calif.), followed by two 500 cm$^3$ columns in series packed with dried 3 Å molecular sieves (8 mesh-12 mesh; Aldrich Chemical Company), and two 500 cm$^3$ columns in series packed with dried 5 Å molecular sieves (8-12 mesh; Aldrich Chemical Company).

1-Octene (98%) (Aldrich Chemical Company) was dried by stirring over Na—K alloy overnight followed by filtration through basic alumina (Aldrich Chemical Company, Brockman Basic 1). Tri-(n-octyl)aluminum (TNOA) was purchased from either Aldrich Chemical Company or Akzo Nobel and used as received.

Polymerization grade ethylene was further purified by passing the ethylene through a series of columns: 500 cm$^3$ Oxyclear cylinder from Labclear (Oakland, Calif.) followed by a 500 cm$^3$ column packed with dried 3 Å molecular sieves (8 mesh-12 mesh; Aldrich Chemical Company), and a 500 cm$^3$ column packed with dried 5 Å molecular sieves (8 mesh-12 mesh; Aldrich Chemical Company).

Polymerization grade propylene was further purified by passing the propylene through a series of columns: 2,250 cm$^3$ Oxiclear cylinder from Labclear followed by a 2,250 cm$^3$ column packed with 3 Å molecular sieves (8 mesh-12 mesh; Aldrich Chemical Company), then two 500 cm$^3$ columns in series packed with 5 Å molecular sieves (8 mesh-12 mesh; Aldrich Chemical Company), a 500 cm$^3$ column packed with Selexsorb CD (BASF), and finally a 500 cm$^3$ column packed with Selexsorb COS (BASF).

N,N-Dimethyanilinium tetrakis(pentafluorophenyl)borate, also referred to as Activator 1, was purchased from Albemarle Corporation. All complexes and the activators were added to the reactor as dilute solutions in toluene. The concentrations of the solutions of activator, scavenger, and complexes that were added to the reactor were chosen so that between 40 microliters-200 microliters of the solution were added to the reactor to ensure accurate delivery.

Methylalumoxane (MAO), also referred to as Activator 2, was purchased from Albemarle as a 10 wt % solution in toluene.

Reactor Description and Preparation. Polymerizations were conducted in an inert atmosphere (N$_2$) drybox using autoclaves equipped with an external heater for temperature control, glass inserts (internal volume of reactor=23.5 mL for C$_2$ and C$_2$/C$_8$ runs; 22.5 mL for C$_3$ runs), septum inlets, regulated supply of nitrogen, ethylene and propylene, and equipped with disposable polyether ether ketone mechanical stirrers (800 RPM). The autoclaves were prepared by purging with dry nitrogen at 110° C. or 115° C. for 5 hours and then at 25° C. for 5 hours.

Ethylene Polymerization or Ethylene/1-Octene Copolymerization

The reactor was prepared as described above, and then purged with ethylene. Solvent (toluene, unless stated otherwise), optional 1-octene (0.1 mL when used), and optional MAO were added via syringe at room temperature and atmospheric pressure. The reactor was then brought to process temperature (typically 80° C.) and charged with ethylene to process pressure (typically 75 psig=618.5 kPa or 200 psig=1480.3 kPa) while stirring at 800 RPM. An optional scavenger solution (e.g., TNOA in isohexane) was then added via syringe to the reactor at process conditions. An optional non-coordinating activator (e.g., N,N-dimethylanilinium tetrakis(pentafluorophenyl)borate) solution (in toluene) was added via syringe to the reactor at process conditions, followed by a pre-catalyst (e.g., complex or catalyst) solution (in toluene) via syringe to the reactor at process conditions. Ethylene was allowed to enter the autoclaves during polymerization using computer controlled solenoid valves to maintain reactor gauge pressure (+/−2 psi). Reactor temperature was monitored and typically maintained within +/−1° C. Polymerizations were halted by addition of approximately 50 psi $O_2$/Ar (5 mol % $O_2$) gas mixture to the autoclaves for approximately 30 seconds. The polymerizations were quenched after a predetermined cumulative amount of ethylene had been added or for a maximum of 30 minutes polymerization time. The reactors were cooled and vented. The polymer was isolated after the solvent was removed in-vacuo. Yields reported include total weight of polymer and residual catalyst. Catalyst activity is reported as grams of polymer per mmol transition metal compound per hour of reaction time (g/mmol/hr). Optional non-coordinating anion activator (e.g., N,N-Dimethyanilinium tetrakis(pentafluorophenyl)borate) solution (in toluene) was then added via syringe to the reactor at process conditions, followed by a pre-catalyst (e.g., complex or catalyst) solution (in toluene) via syringe to the reactor at process conditions. Reactor temperature was monitored and typically maintained within +/−1° C. Polymerizations were halted by addition of approximately 50 psi $O_2$/Ar (5 mol % $O_2$) gas mixture to the autoclaves for approximately 30 seconds. The polymerizations were quenched based on a predetermined pressure loss of approximately 8 psi or for a maximum of 30 minutes polymerization time. The reactors were cooled and vented. The polymer was isolated after the solvent was removed in-vacuo. Yields reported include total weight of polymer and residual catalyst. Catalyst activities are typically reported as grams of polymer per mmol transition metal compound per hour of reaction time (gP·mmolcat$^{-1}$·h$^{-1}$).

Propylene Polymerization

The reactor was prepared as described above, then heated to 40° C. and purged with propylene gas at atmospheric pressure. Solvent (toluene, unless stated otherwise), optional MAO, and liquid propylene (1.0 mL) were added via syringe. The reactor was then heated to process temperature (70° C. or 100° C.) while stirring at 800 RPM. Then optional scavenger solution (e.g., TNOA in isohexane) was added via syringe to the reactor at process conditions. Optional non-coordinating activator (e.g., N,N-dimethylanilinium tetrakis (pentafluorophenyl)borate) solution (in toluene) was then added via syringe to the reactor at process conditions, followed by a pre-catalyst (i.e., complex or catalyst) solution (in toluene) via syringe to the reactor at process conditions. Reactor temperature was monitored and typically maintained within +/−1° C. Polymerizations were halted by addition of approximately 50 psi $O_2$/Ar (5 mol % $O_2$) gas mixture to the autoclaves for approximately 30 seconds. The polymerizations were quenched based on a predetermined pressure loss of approximately 8 psi or for a maximum of 30 minutes polymerization time. The reactors were cooled and vented. The polymer was isolated after the solvent was removed in-vacuo. Yields reported include total weight of polymer and residual catalyst. Catalyst activities are typically reported as grams of polymer per mmol transition metal compound per hour of reaction time (g/mmol/hr).

Polymer Characterization

For analytical testing, polymer sample solutions were prepared by dissolving the polymer in 1,2,4-trichlorobenzene (TCB, 99+% purity from Sigma-Aldrich) containing 2,6-di-tert-butyl-4-methylphenol (BHT, 99% from Aldrich) at 165° C. in a shaker oven for approximately 3 hours. The typical concentration of polymer in solution was between 0.1 mg/mL to 0.9 mg/mL with a BHT concentration of 1.25 mg BHT/mL of TCB. Samples were cooled to 135° C. for testing.

High temperature size exclusion chromatography was performed using an automated "Rapid GPC" system as described in U.S. Pat. Nos. 6,491,816; 6,491,823; 6,475,391; 6,461,515; 6,436,292; 6,406,632; 6,175,409; 6,454,947; 6,260,407; and 6,294,388; each of which is incorporated herein by reference. Molecular weights (weight average molecular weight (Mw) and number average molecular weight (Mn)) and molecular weight distribution (MWD=Mw/Mn), which is also sometimes referred to as the polydispersity (PDI) of the polymer, were measured by Gel Permeation Chromatography using a Symyx Technology GPC equipped with evaporative light scattering detector and calibrated using polystyrene standards (Polymer Laboratories: Polystyrene Calibration Kit S-M-10: Mp (peak $M_w$) between 5,000 and 3,390,000). Samples (250 µL of a polymer solution in TCB were injected into the system) were run at an eluent flow rate of 2.0 mL/minute (135° C. sample temperatures, 165° C. oven/columns) using three Polymer Laboratories: PLgel 10 µm Mixed-B 300×7.5 mm columns in series. No column spreading corrections were employed. Numerical analyses were performed using Epoch® software available from Symyx Technologies or Automation Studio software available from Freeslate. The molecular weights obtained are relative to linear polystyrene standards.

Differential Scanning Calorimetry (DSC) measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./minute and then cooled at a rate of 50° C./minute. Melting points were collected during the heating period.

Samples for infrared analysis were prepared by depositing the stabilized polymer solution onto a silanized wafer (Part number S10860, Symyx). By this method, approximately between 0.12 and 0.24 mg of polymer was deposited on the wafer cell. The samples were subsequently analyzed on a Bruker Equinox 55 FTIR spectrometer equipped with Pikes' MappIR specular reflectance sample accessory. Spectra, covering a spectral range of 5,000 cm$^{-1}$ to 500 cm$^{-1}$, were collected at a 2 cm$^{-1}$ resolution with 32 scans.

Tables 1, 2, and 3 illustrate results obtained for Catalysts 1-5 in polymerization using N,N-dimethylanilinium tetrakis (pentafluorophenyl)borate activator (ACT 1) and methylaluminoxane (MAO) activator. Catalysts 1 through 5 are represented as follows:

1

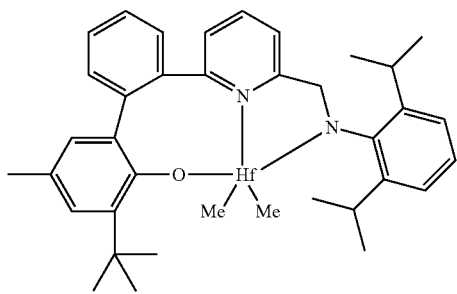

2

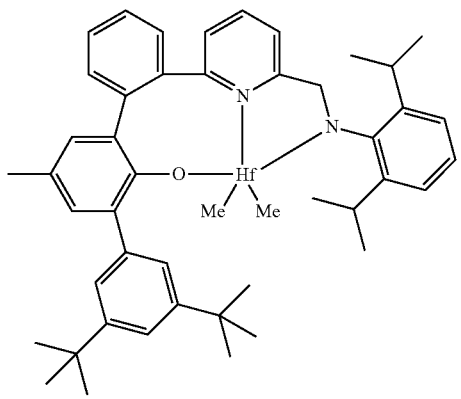

3

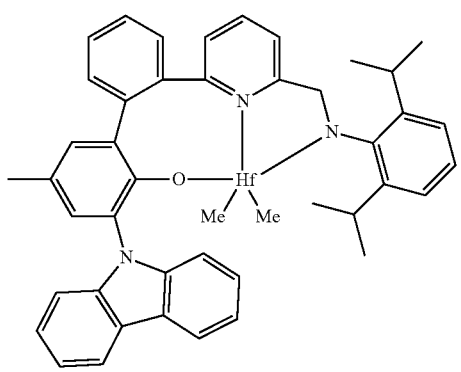

4

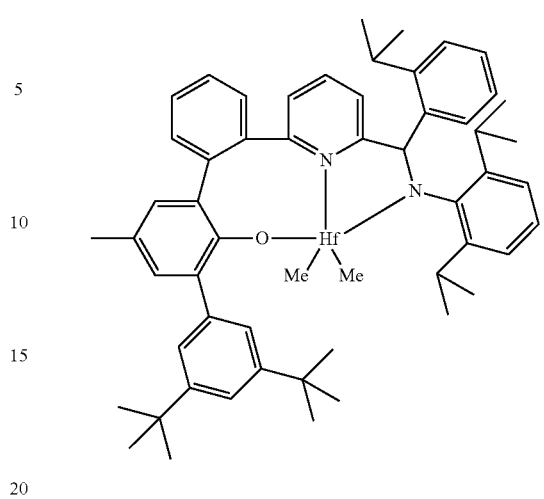

5

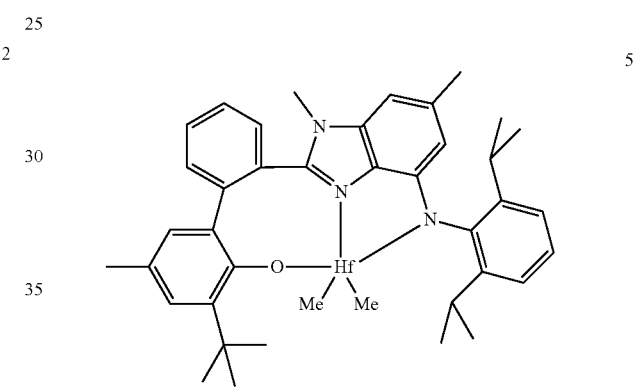

Table 1 depicts ethylene homopolymerization with each catalyst and activator combination. General conditions for ACT 1: catalyst complex=25 nmol, activator=1.1 molar equiv., 75 psig ethylene, Al(n-octyl)3=500 nmol, temperature=80° C., total volume=5 mL, solvene=toluene. General conditions for MAO: catalyst complex=25 nmol, activator=500 molar equiv., 75 psig ethylene, temperature=80° C., total volume=5 mL, solvent=toluene.

In each of the illustrated cases, narrow PDI values of polyethylenes were observed ranging from 1.5 to 2.7 and high melting point temperatures were also observed, ranging from 135° C. to 138° C. The average activity for Catalysts 2 and 3 were found to be higher than the other catalysts. In particular, Catalyst 2 with MAO exhibited the highest catalyst activity (e.g. Runs 10-12: 89,149 gP·mmolcat$^{-1}$·h$^{-1}$ to 133,824 gP·mmolcat$^{-1}$·h$^{-1}$) and also produced polyethylene with Mw values ranging from 185,316 g/mol to 221,657 g/mol. Catalyst 3 with ACT 1 (Runs 13-15) also exhibited high activity ranging between 81,051 gP·mmolcat$^{-1}$·h$^{-1}$ to 84,873 gP·mmolcat$^{-1}$·h$^{-1}$ with higher Mn, Mw, and Mz relative to the values exhibited in the Catalyst 2 samples. As can be seen, each of the catalysts and activators appeared to produce a range of high Mw, crystalline polyethylene product with high catalyst activity.

TABLE 1

Ethylene homopolymerizations

| Run # | Catalyst | Activator | Quench time (s) | Yield (g) | Activity (gP·mmolcat$^{-1}$·h$^{-1}$) |
|---|---|---|---|---|---|
| 1 | CAT 1 | ACT 1 | 315 | 0.0751 | 34,331 |
| 2 | CAT 1 | ACT 1 | 426 | 0.0769 | 25,994 |
| 3 | CAT 1 | ACT 1 | 186 | 0.0786 | 60,852 |
| 7 | CAT 2 | ACT 1 | 171 | 0.0843 | 70,989 |
| 8 | CAT 2 | ACT 1 | 201 | 0.0896 | 64,191 |
| 9 | CAT 2 | ACT 1 | 220 | 0.0844 | 55,244 |
| 10 | CAT 2 | MAO | 75 | 0.0697 | 133,824 |
| 11 | CAT 2 | MAO | 110 | 0.0681 | 89,149 |
| 12 | CAT 2 | MAO | 96 | 0.0676 | 101,400 |
| 13 | CAT 3 | ACT 1 | 140 | 0.0788 | 81,051 |
| 14 | CAT 3 | ACT 1 | 138 | 0.0782 | 81,600 |
| 15 | CAT 3 | ACT 1 | 132 | 0.0778 | 84,873 |
| 16 | CAT 4 | ACT 1 | 164 | 0.0647 | 56,810 |
| 18 | CAT 4 | ACT 1 | 305 | 0.0681 | 32,152 |
| 22 | CAT 5 | ACT 1 | 193 | 0.083 | 61,927 |
| 23 | CAT 5 | ACT 1 | 236 | 0.0837 | 51,071 |
| 24 | CAT 5 | ACT 1 | 202 | 0.0833 | 59,382 |

| Run # | Catalyst | Activator | Mn (g/mol) | Mw (g/mol) | Mz (g/mol) | PDI | Tc (° C.) | Tm (° C.) |
|---|---|---|---|---|---|---|---|---|
| 1 | CAT 1 | ACT 1 | 458,556 | 1,017,249 | 2,582,794 | 2.2 | 116 | 138 |
| 2 | CAT 1 | ACT 1 | 406,647 | 985,854 | 2,539,281 | 2.4 | 117 | 137 |
| 3 | CAT 1 | ACT 1 | 427,315 | 979,661 | 2,492,297 | 2.3 | 117 | 138 |
| 7 | CAT 2 | ACT 1 | 510,872 | 1,188,257 | 3,646,833 | 2.3 | 117 | 138 |
| 8 | CAT 2 | ACT 1 | 429,925 | 964,393 | 2,474,033 | 2.2 | 116 | 137 |
| 9 | CAT 2 | ACT 1 | 412,450 | 1,071,836 | 3,861,868 | 2.6 | 116 | 138 |
| 10 | CAT 2 | MAO | 95,909 | 217,408 | 1,541,523 | 2.3 | 117 | 136 |
| 11 | CAT 2 | MAO | 92,836 | 221,657 | 1,099,861 | 2.4 | 117 | 135 |
| 12 | CAT 2 | MAO | 112,147 | 185,316 | 370,720 | 1.7 | 117 | 135 |
| 13 | CAT 3 | ACT 1 | 233,791 | 510,199 | 1,144,269 | 2.2 | 116 | 135 |
| 14 | CAT 3 | ACT 1 | 282,767 | 592,237 | 1,541,504 | 2.1 | 116 | 137 |
| 15 | CAT 3 | ACT 1 | 392,843 | 596,021 | 1,183,273 | 1.5 | 116 | 137 |
| 16 | CAT 4 | ACT 1 | 1,194,513 | 3,191,522 | 6,441,424 | 2.7 | 114 | 135 |
| 18 | CAT 4 | ACT 1 | 2,395,449 | 3,780,368 | 6,415,894 | 1.6 | 115 | 135 |
| 22 | CAT 5 | ACT 1 | 406,530 | 846,460 | 2,077,018 | 2.1 | 117 | 137 |
| 23 | CAT 5 | ACT 1 | 378,147 | 817,661 | 1,912,722 | 2.2 | 116 | 136 |
| 24 | CAT 5 | ACT 1 | 403,328 | 856,900 | 2,186,535 | 2.1 | 117 | 137 |

Table 2 depicts ethylene-octene copolymerization with each catalyst and activator combination. General conditions for ACT 1: 1-octene=0.1 mL, catalyst complex=25 nmol, activator=1.1 molar equiv., 75 psig ethylene, Al(n-octyl)3=500 nmol, temperature=80° C., total volume=5 mL, solvene=toluene. General conditions for MAO: 1-octene=0.1 mL, catalyst complex=25 nmol, activator=500 molar equiv., 75 psig ethylene, temperature=80° C., total volume=5 mL, solvent=toluene.

In each of the illustrated cases, narrow PDI values of polyethlyene-1-octenes were observed ranging from 1.6 to 3.1. The average activity for Catalysts 2 and 5 were found to be higher than the other catalysts. In particular, Catalyst 2 with MAO at reactor pressure at both 75 psig and 200 psig, and Catalyst 2 with ACT 1 at reactor pressure 200 psig exhibited a balance of high catalyst activity (e.g. Runs 40-48: 105,396 gP·mmolcat$^{-1}$·h$^{-1}$ to 1,682,743 gP·mmolcat$^{-1}$·h$^{-1}$) and produced polymer with Mw values ranging from 174,145 g/mol to 1,808,674 g/mol. Catalyst 5 with ACT 1 at reactor pressure of 75 psig produced copolymer with the highest level of octane, ranging from 31 wt % to 33 wt %, by total weight of the copolymer. The molecular weight for these polymers ranged from 498,334 g/mol to 596,088 g/mol. In contrast, catalyst 5 with ACT 1 at reactor pressure of 200 psig produced polymer with 13 wt % octane and a Mw of 932,277 g/mol to 1,147,464 g/mol with activity from 741,795 gP·mmolcat$^{-1}$·h$^{-1}$ to 1,272,240 gP·mmolcat$^{-1}$·h$^{-1}$. As can be seen in Table 2, each of the catalysts and activators appeared to produce a range of high Mw, crystalline or semi-crystalline product with a range of catalyst activity.

TABLE 2

Ethylene-octene copolymerizations

| Run # | Catalyst | Activator | P (psig) | Quench time (s) | Yield (g) | Activity (gP·mmolcat$^{-1}$·h$^{-1}$) |
|---|---|---|---|---|---|---|
| 25 | CAT 1 | ACT 1 | 75 | 591 | 0.0652 | 15,886 |
| 26 | CAT 1 | ACT 1 | 75 | 520 | 0.0895 | 24,785 |
| 27 | CAT 1 | ACT 1 | 75 | 647 | 0.0676 | 15,045 |
| 28 | CAT 1 | MAO | 75 | 135 | 0.0499 | 53,227 |
| 29 | CAT 1 | MAO | 75 | 160 | 0.0574 | 51,660 |
| 30 | CAT 1 | MAO | 75 | 175 | 0.0515 | 42,377 |

TABLE 2-continued

| | | | | | | |
|---|---|---|---|---|---|---|
| | | | Ethylene-octene copolymerizations | | | |
| 31 | CAT 1 | ACT 1 | 200 | 86 | 0.0485 | 81,209 |
| 32 | CAT 1 | ACT 1 | 200 | 80 | 0.056 | 100,800 |
| 33 | CAT 1 | ACT 1 | 200 | 116 | 0.0768 | 95,338 |
| 34 | CAT 1 | MAO | 200 | 99 | 0.0727 | 105,745 |
| 35 | CAT 1 | MAO | 200 | 94 | 0.0615 | 94,213 |
| 36 | CAT 1 | MAO | 200 | 114 | 0.0846 | 106,863 |
| 37 | CAT 2 | ACT 1 | 75 | 459 | 0.0954 | 29,929 |
| 38 | CAT 2 | ACT 1 | 75 | 475 | 0.0975 | 29,558 |
| 39 | CAT 2 | ACT 1 | 75 | 428 | 0.0964 | 32,434 |
| 40 | CAT 2 | MAO | 75 | 94 | 0.0688 | 105,396 |
| 41 | CAT 2 | MAO | 75 | 101 | 0.079 | 112,634 |
| 42 | CAT 2 | MAO | 75 | 85 | 0.0707 | 119,774 |
| 43 | CAT 2 | ACT 1 | 200 | 60 | 0.1629 | 390,960 |
| 44 | CAT 2 | ACT 1 | 200 | 14 | 0.1636 | 1,682,743 |
| 45 | CAT 2 | ACT 1 | 200 | 81 | 0.1631 | 289,956 |
| 46 | CAT 2 | MAO | 200 | 88 | 0.1143 | 187,036 |
| 47 | CAT 2 | MAO | 200 | 114 | 0.1166 | 147,284 |
| 48 | CAT 2 | MAO | 200 | 112 | 0.1451 | 186,557 |
| 49 | CAT 3 | ACT 1 | 75 | 95 | 0.0698 | 105,802 |
| 50 | CAT 3 | ACT 1 | 75 | 74 | 0.0715 | 139,135 |
| 51 | CAT 3 | ACT 1 | 75 | 84 | 0.0725 | 124,286 |
| 52 | CAT 3 | ACT 1 | 200 | 127 | 0.1495 | 169,512 |
| 53 | CAT 3 | ACT 1 | 200 | 147 | 0.151 | 147,918 |
| 54 | CAT 4 | ACT 1 | 75 | 337 | 0.0818 | 34,953 |
| 55 | CAT 4 | ACT 1 | 75 | 327 | 0.0746 | 32,851 |
| 56 | CAT 4 | ACT 1 | 75 | 369 | 0.0767 | 29,932 |
| 60 | CAT 4 | ACT 1 | 200 | 66 | 0.1422 | 310,255 |
| 61 | CAT 4 | ACT 1 | 200 | 54 | 0.08 | 213,333 |
| 62 | CAT 4 | ACT 1 | 200 | 52 | 0.0783 | 216,831 |
| 66 | CAT 5 | ACT 1 | 75 | 192 | 0.1212 | 90,900 |
| 67 | CAT 5 | ACT 1 | 75 | 330 | 0.1212 | 52,887 |
| 68 | CAT 5 | ACT 1 | 75 | 220 | 0.1224 | 80,116 |
| 69 | CAT 5 | ACT 1 | 200 | 31 | 0.1865 | 866,323 |
| 70 | CAT 5 | ACT 1 | 200 | 20 | 0.1767 | 1,272,240 |
| 71 | CAT 5 | ACT 1 | 200 | 37 | 0.1906 | 741,795 |

| Run # | Catalyst | Activator | Mn (g/mol) | Mw (g/mol) | Mz (g/mol) | PDI | Octene (wt %) | Tc (° C.) | Tm (° C.) |
|---|---|---|---|---|---|---|---|---|---|
| 25 | CAT 1 | ACT 1 | 652,018 | 1,179,855 | 2,596,172 | 1.8 | 7 | 99 | 112 |
| 26 | CAT 1 | ACT 1 | 508,618 | 1,243,419 | 4,026,769 | 2.4 | 13 | 95 | 110 |
| 27 | CAT 1 | ACT 1 | 699,566 | 1,236,760 | 2,742,544 | 1.8 | 7 | 98 | 111 |
| 28 | CAT 1 | MAO | 51,571 | 107,651 | 247,579 | 2.1 | 6 | 104 | 119 |
| 29 | CAT 1 | MAO | 76,996 | 142,450 | 327,426 | 1.9 | 6 | 104 | 118 |
| 30 | CAT 1 | MAO | 67,683 | 125,503 | 297,876 | 1.9 | 6 | 104 | 119 |
| 31 | CAT 1 | ACT 1 | 1,618,252 | 2,866,889 | 5,583,497 | 1.8 | 4 | 109 | 122 |
| 32 | CAT 1 | ACT 1 | 1,542,819 | 2,640,284 | 5,265,333 | 1.7 | 4 | 109 | 121 |
| 33 | CAT 1 | ACT 1 | 1,515,408 | 2,602,132 | 5,133,065 | 1.7 | 4 | 109 | 121 |
| 34 | CAT 1 | MAO | 112,975 | 276,303 | 1,472,050 | 2.5 | 5 | 111 | 126 |
| 35 | CAT 1 | MAO | 106,619 | 219,712 | 669,172 | 2.1 | 3 | 112 | 126 |
| 36 | CAT 1 | MAO | 120,964 | 205,849 | 455,337 | 1.7 | 3 | 110 | 125 |
| 37 | CAT 2 | ACT 1 | 396,522 | 1,014,912 | 3,139,994 | 2.6 | 15 | 92 | 109 |
| 38 | CAT 2 | ACT 1 | 360,803 | 1,032,996 | 3,715,718 | 2.9 | 15 | 93 | 108 |
| 39 | CAT 2 | ACT 1 | 327,317 | 939,385 | 2,973,151 | 2.9 | 16 | 93 | 108 |
| 40 | CAT 2 | MAO | 96,958 | 174,145 | 397,955 | 1.8 | 8 | 97 | 112 |
| 41 | CAT 2 | MAO | 105,946 | 197,229 | 432,670 | 1.9 | 9 | 96 | 112 |
| 42 | CAT 2 | MAO | 119,635 | 259,767 | 1,012,717 | 2.2 | 9 | 99 | 113 |
| 43 | CAT 2 | ACT 1 | 689,370 | 1,725,654 | 4,178,259 | 2.5 | 8 | 100 | 116 |
| 44 | CAT 2 | ACT 1 | 735,016 | 1,581,944 | 3,872,046 | 2.2 | 6 | 101 | 115 |
| 45 | CAT 2 | ACT 1 | 671,870 | 1,808,674 | 4,708,474 | 2.7 | 8 | 100 | 115 |
| 46 | CAT 2 | MAO | 163,284 | 295,391 | 725,815 | 1.8 | 4 | 107 | 122 |
| 47 | CAT 2 | MAO | 174,175 | 310,483 | 673,109 | 1.8 | 6 | 107 | 121 |
| 48 | CAT 2 | MAO | 184,315 | 319,108 | 681,532 | 1.7 | 5 | 106 | 121 |
| 49 | CAT 3 | ACT 1 | 369,714 | 588,181 | 1,124,313 | 1.6 | 11 | 91 | 106 |
| 50 | CAT 3 | ACT 1 | 258,820 | 447,094 | 906,570 | 1.7 | 12 | 89 | 104 |
| 51 | CAT 3 | ACT 1 | 272,999 | 498,259 | 990,707 | 1.8 | 10 | 90 | 105 |
| 52 | CAT 3 | ACT 1 | 385,100 | 761,826 | 1,678,737 | 2 | 8 | 101 | 115 |
| 53 | CAT 3 | ACT 1 | 487,362 | 892,889 | 2,373,148 | 1.8 | 7 | 101 | 115 |
| 54 | CAT 4 | ACT 1 | 999,605 | 2,338,464 | 5,485,296 | 2.3 | 9 | 98 | 112 |
| 55 | CAT 4 | ACT 1 | 1,040,314 | 2,666,885 | 6,055,874 | 2.6 | 8 | 99 | 112 |
| 56 | CAT 4 | ACT 1 | 1,251,874 | 2,520,024 | 5,334,172 | 2 | 10 | 97 | 112 |
| 60 | CAT 4 | ACT 1 | 2,229,533 | 3,448,007 | 5,983,395 | 1.6 | 5 | 106 | 119 |
| 61 | CAT 4 | ACT 1 | 1,997,286 | 3,434,880 | 6,089,594 | 1.7 | 4 | 109 | 122 |
| 62 | CAT 4 | ACT 1 | 2,235,962 | 3,528,406 | 6,120,381 | 1.6 | 4 | 110 | 123 |
| 66 | CAT 5 | ACT 1 | 234,902 | 523,089 | 1,383,871 | 2.2 | 31 | 83 | 97 |
| 67 | CAT 5 | ACT 1 | 193,220 | 596,088 | 1,721,950 | 3.1 | 31 | 80 | 95 |
| 68 | CAT 5 | ACT 1 | 172,064 | 498,334 | 1,621,039 | 2.9 | 32 | 78 | 94 |
| 69 | CAT 5 | ACT 1 | 464,093 | 1,052,190 | 2,647,138 | 2.3 | 13 | 92 | 108 |

TABLE 2-continued

Ethylene-octene copolymerizations

| 70 | CAT 5 | ACT 1 | 603,315 | 1,147,464 | 2,616,541 | 1.9 | 13 | 93 | 108 |
| 71 | CAT 5 | ACT 1 | 359,520 | 932,277 | 2,218,404 | 2.6 | 13 | 93 | 108 |

Table 3 depicts propylene homopolymerization with each catalyst and activator combination. General conditions for ACT 1: propylene=1 mL, catalyst complex=25 nmol, activator=1.1 molar equiv., Al(n-octyl)3=500 nmol, total volume=5 mL, solvene=isohexane. General conditions for MAO: propylene=1 mL, catalyst complex=40 nmol, activator=500 molar equiv., total volume=5 mL, solvent=toluene.

In each of the illustrated cases, narrow PDI values of polypropylenes were observed ranging from 1.5 to 3.4. Catalysts 2, 4, and 5 with ACT 1 produced crystalline or semi-crystalline polymer at both 70° C. and 100° C. reactor temperature. Catalyst 4 produced the polymer with the highest melting point values ranging from 136° C. to 147° C. In particular, catalyst 4 at reactor temperature 70° C. had an activity range of 2,926 gP·mmolcat$^{-1}$·h$^{-1}$ to 3,062 gP·mmolcat$^{-1}$·h$^{-1}$ and produced polymer with molecular weights ranging from 152,804 g/mol to 162,181 g/mol. Catalyst 5 produced polymer with melting point values ranging from 81° C. to 84° C., at catalyst activity ranging from 477,837 gP·mmolcat$^{-1}$·h$^{-1}$ to 964,800 gP·mmolcat$^{-1}$·h$^{-1}$, and Mw from 411,768 g/mol to 627,072 g/mol.

TABLE 3

Propylene homopolymerizations

| Run # | Catalyst | Activator | Temp (° C.) | Quench time (s) | Yield (g) | Activity (gP · mmolcat$^{-1}$ · h$^{-1}$) |
| --- | --- | --- | --- | --- | --- | --- |
| 72 | CAT 1 | ACT 1 | 70 | 301 | 0.0972 | 46,501 |
| 73 | CAT 1 | ACT 1 | 70 | 349 | 0.1591 | 65,646 |
| 74 | CAT 1 | ACT 1 | 70 | 261 | 0.1393 | 76,855 |
| 75 | CAT 1 | ACT 1 | 100 | 468 | 0.0892 | 27,446 |
| 76 | CAT 1 | ACT 1 | 100 | 280 | 0.0879 | 45,206 |
| 77 | CAT 1 | ACT 1 | 100 | 564 | 0.0773 | 19,736 |
| 78 | CAT 1 | MAO | 70 | 313 | 0.0941 | 27,058 |
| 79 | CAT 1 | MAO | 70 | 327 | 0.1036 | 28,514 |
| 80 | CAT 1 | MAO | 70 | 372 | 0.0846 | 20,468 |
| 81 | CAT 1 | MAO | 100 | 324 | 0.0706 | 19,611 |
| 82 | CAT 1 | MAO | 100 | 371 | 0.0699 | 16,957 |
| 83 | CAT 1 | MAO | 100 | 389 | 0.0714 | 16,519 |
| 84 | CAT 2 | ACT 1 | 70 | 152 | 0.1151 | 109,042 |
| 85 | CAT 2 | ACT 1 | 70 | 174 | 0.1252 | 103,614 |
| 86 | CAT 2 | ACT 1 | 70 | 1801 | 0.0227 | 1,815 |
| 87 | CAT 2 | ACT 1 | 100 | 1800 | 0.0373 | 2,984 |
| 88 | CAT 2 | ACT 1 | 100 | 1800 | 0.0307 | 2,456 |
| 89 | CAT 2 | ACT 1 | 100 | 1801 | 0.0319 | 2,551 |
| 90 | CAT 2 | MAO | 70 | 574 | 0.0937 | 14,692 |
| 91 | CAT 2 | MAO | 70 | 588 | 0.0891 | 13,638 |
| 92 | CAT 2 | MAO | 70 | 446 | 0.0834 | 16,830 |
| 93 | CAT 2 | MAO | 100 | 1801 | 0.0289 | 1,444 |
| 94 | CAT 2 | MAO | 100 | 1801 | 0.0363 | 1,814 |
| 95 | CAT 2 | MAO | 100 | 1801 | 0.0356 | 1,779 |
| 96 | CAT 3 | ACT 1 | 70 | 1800 | 0.0769 | 6,152 |
| 97 | CAT 3 | ACT 1 | 70 | 1773 | 0.0807 | 6,554 |
| 98 | CAT 3 | ACT 1 | 70 | 1800 | 0.0762 | 6,096 |
| 99 | CAT 3 | ACT 1 | 100 | 1800 | 0.0157 | 1,256 |
| 100 | CAT 3 | ACT 1 | 100 | 1801 | 0.0144 | 1,151 |
| 101 | CAT 3 | ACT 1 | 100 | 1800 | 0.0139 | 1,112 |
| 102 | CAT 4 | ACT 1 | 70 | 1801 | 0.0383 | 3,062 |
| 103 | CAT 4 | ACT 1 | 70 | 1801 | 0.0373 | 2,982 |
| 104 | CAT 4 | ACT 1 | 70 | 1801 | 0.0366 | 2,926 |
| 105 | CAT 4 | ACT 1 | 100 | 1801 | 0.0121 | 967 |
| 106 | CAT 4 | ACT 1 | 100 | 1800 | 0.0123 | 984 |
| 107 | CAT 4 | ACT 1 | 100 | 1801 | 0.0118 | 943 |
| 108 | CAT 5 | ACT 1 | 70 | 66 | 0.4422 | 964,800 |
| 109 | CAT 5 | ACT 1 | 70 | 70 | 0.4275 | 879,429 |
| 110 | CAT 5 | ACT 1 | 70 | 79 | 0.5259 | 958,603 |
| 111 | CAT 5 | ACT 1 | 100 | 71 | 0.2356 | 477,837 |
| 112 | CAT 5 | ACT 1 | 100 | 73 | 0.2404 | 474,214 |
| 113 | CAT 5 | ACT 1 | 100 | 48 | 0.2092 | 627,600 |
| 114 | CAT 5 | MAO | 70 | 544 | 0.0884 | 14,625 |

TABLE 3-continued

Propylene homopolymerizations

| | | | | | | | | |
|---|---|---|---|---|---|---|---|---|
| 115 | CAT 5 | MAO | 70 | 583 | 0.0769 | | 11,871 | |
| 116 | CAT 5 | MAO | 70 | 913 | 0.0756 | | 7,452 | |
| 117 | CAT 5 | MAO | 100 | 392 | 0.07 | | 16,071 | |
| 118 | CAT 5 | MAO | 100 | 489 | 0.0605 | | 11,135 | |
| 119 | CAT 5 | MAO | 100 | 532 | 0.0641 | | 10,844 | |

| Run # | Catalyst | Activator | Mn (g/mol) | Mw (g/mol) | Mz (g/mol) | PDI | Tc (° C.) | Tm (° C.) |
|---|---|---|---|---|---|---|---|---|
| 72 | CAT 1 | ACT 1 | 541,563 | 1,061,620 | 2,429,763 | 2 | | |
| 73 | CAT 1 | ACT 1 | 621,955 | 1,281,388 | 3,203,754 | 2.1 | | |
| 74 | CAT 1 | ACT 1 | 975,042 | 1,713,562 | 3,861,460 | 1.8 | | |
| 75 | CAT 1 | ACT 1 | 149,747 | 259,109 | 558,295 | 1.7 | | |
| 76 | CAT 1 | ACT 1 | 141,564 | 240,223 | 506,921 | 1.7 | | |
| 77 | CAT 1 | ACT 1 | 170,543 | 284,660 | 571,921 | 1.7 | | |
| 78 | CAT 1 | MAO | 66,263 | 125,211 | 266,936 | 1.9 | | |
| 79 | CAT 1 | MAO | 55,581 | 127,802 | 316,952 | 2.3 | | |
| 80 | CAT 1 | MAO | 81,065 | 144,854 | 359,122 | 1.8 | | |
| 81 | CAT 1 | MAO | 32,333 | 73,245 | 169,781 | 2.3 | | |
| 82 | CAT 1 | MAO | 28,287 | 61,733 | 137,407 | 2.2 | | |
| 83 | CAT 1 | MAO | 43,977 | 73,182 | 149,083 | 1.7 | | |
| 84 | CAT 2 | ACT 1 | 292,770 | 502,417 | 986,390 | 1.7 | 44 | 85 |
| 85 | CAT 2 | ACT 1 | 315,885 | 547,341 | 1,196,680 | 1.7 | 35 | 86 |
| 86 | CAT 2 | ACT 1 | 400,352 | 741,718 | 1,596,946 | 1.9 | 39 | 87 |
| 87 | CAT 2 | ACT 1 | 54,656 | 88,849 | 166,961 | 1.6 | | 83 |
| 88 | CAT 2 | ACT 1 | 54,879 | 91,575 | 176,317 | 1.7 | | 82 |
| 89 | CAT 2 | ACT 1 | 58,820 | 108,578 | 262,795 | 1.9 | | 84 |
| 90 | CAT 2 | MAO | 43,321 | 84,722 | 175,113 | 2 | | |
| 91 | CAT 2 | MAO | 51,929 | 91,355 | 187,255 | 1.8 | | |
| 92 | CAT 2 | MAO | 60,696 | 102,226 | 198,850 | 1.7 | | |
| 93 | CAT 2 | MAO | 11,402 | 26,471 | 62,180 | 2.3 | | |
| 94 | CAT 2 | MAO | 12,771 | 30,214 | 78,634 | 2.4 | | |
| 95 | CAT 2 | MAO | 13,561 | 28,981 | 64,324 | 2.1 | | |
| 96 | CAT 3 | ACT 1 | 112,428 | 196,657 | 416,642 | 1.8 | | |
| 97 | CAT 3 | ACT 1 | 111,761 | 201,319 | 441,297 | 1.8 | | |
| 98 | CAT 3 | ACT 1 | 127,750 | 215,142 | 453,527 | 1.7 | | |
| 99 | CAT 3 | ACT 1 | 47,311 | 89,514 | 191,719 | 1.9 | | |
| 100 | CAT 3 | ACT 1 | 49,787 | 92,576 | 200,647 | 1.9 | | |
| 101 | CAT 3 | ACT 1 | 43,989 | 100,215 | 236,129 | 2.3 | | |
| 102 | CAT 4 | ACT 1 | 86,615 | 152,804 | 371,048 | 1.8 | 96 | 147 |
| 103 | CAT 4 | ACT 1 | 84,362 | 154,972 | 343,757 | 1.8 | 95 | 146 |
| 104 | CAT 4 | ACT 1 | 90,866 | 162,181 | 353,672 | 1.8 | 94 | 146 |
| 105 | CAT 4 | ACT 1 | 9,454 | 23,978 | 66,160 | 2.5 | 91 | 137 |
| 106 | CAT 4 | ACT 1 | 8,731 | 22,682 | 60,546 | 2.6 | 91 | 136 |
| 107 | CAT 4 | ACT 1 | 9,577 | 23,153 | 58,613 | 2.4 | 92 | 137 |
| 108 | CAT 5 | ACT 1 | 315,198 | 619,726 | 1,494,691 | 2 | 38 | 82 |
| 109 | CAT 5 | ACT 1 | 321,192 | 618,986 | 1,487,292 | 1.9 | 33 | 81 |
| 110 | CAT 5 | ACT 1 | 303,108 | 627,072 | 1,524,755 | 2.1 | 32 | 82 |
| 111 | CAT 5 | ACT 1 | 202,428 | 411,768 | 936,726 | 2 | 32 | 83 |
| 112 | CAT 5 | ACT 1 | 245,721 | 443,140 | 952,494 | 1.8 | 36 | 84 |
| 113 | CAT 5 | ACT 1 | 211,379 | 433,571 | 978,309 | 2.1 | 34 | 84 |
| 114 | CAT 5 | MAO | 128,881 | 192,953 | 350,394 | 1.5 | | |
| 115 | CAT 5 | MAO | 56,633 | 192,829 | 608,781 | 3.4 | | |
| 116 | CAT 5 | MAO | 95,612 | 204,775 | 592,058 | 2.1 | | |
| 117 | CAT 5 | MAO | 110,917 | 244,991 | 621,972 | 2.2 | | |
| 118 | CAT 5 | MAO | 126,773 | 232,240 | 605,152 | 1.8 | | |
| 119 | CAT 5 | MAO | 94,883 | 217,392 | 601,226 | 2.3 | | |

Overall, catalysts, catalyst systems, and processes of the present disclosure can provide high temperature ethylene polymerization, propylene polymerization, or copolymerization as the Lewis base catalysts are stable at high polymerization temperatures and have good activity at the high polymerization temperatures. The stable catalysts with good activity can provide formation of polymers having one or more of: a high melting point, high isotacticity, controllable molecular weight, as well as the ability to make an increased amount of polymer in a given reactor, as compared to conventional catalysts. The non-metallocene catalysts, catalysts systems, and processes of the present disclosure can provide ethylene or propylene based polymers having high Tm values which can provide a harder and more thermally stable material, as compared to materials formed using polymers with lower Tm values.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

The invention claimed is:

1. A catalyst compound represented by Formula (I):

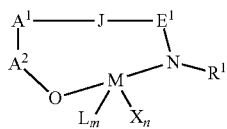

(I)

wherein:
M is a group 3, 4, 5, or 6 metal;
each of $A^1$ and $A^2$ is independently selected from the group consisting of arylene, substituted arylene, heteroarylene group, and substituted heteroarylene group;
J comprises a heterocyclic Lewis base;
$E^1$ is selected from the group consisting of hydrocarbylene, substituted hydrocarbylene, silylene, and substituted silylene, wherein J and $E^1$ are optionally joined to form one or more hydrocarbyl rings, substituted hydrocarbyl rings, heterocyclic rings, or substituted heterocyclic rings;
each L is independently a Lewis base;
each X is independently an anionic ligand;
n is 1, 2 or 3;
m is 0, 1, or 2;
n+m is not greater than 4;
$R^1$ is selected from the group consisting of $C_1$-$C_{40}$ hydrocarbyl, substituted $C_1$-$C_{40}$ hydrocarbyl, a heteroatom-containing group, and substituted heteroatom-containing group;
any two L groups may be joined together to form a bidentate Lewis base;
an X group may be joined to an L group to form a monoanionic bidentate group; and
any two X groups may be joined together to form a dianionic ligand group.

2. The catalyst compound of claim 1, wherein the catalyst compound comprises an eight-membered metallocycle ring and a five-membered metallocycle ring.

3. The catalyst compound of claim 1, wherein $E^1$ is selected from the group consisting of $C(R^8)(R^9)$ and $Si(R^8)(R^9)$, wherein each of $R^8$, and $R^9$ is independently selected from the group consisting of hydrogen, $C_1$-$C_{40}$ hydrocarbyl, substituted $C_1$-$C_{40}$ hydrocarbyl, a heteroatom, heteroatom containing group, and substituted heteroatom-containing group, or $R^8$ and $R^9$ may be joined to form one or more $C_3$-$C_{20}$ alkyl groups, hydrocarbyl rings, substituted hydrocarbyl rings, heterocyclic rings, or substituted heterocyclic rings each having 5, 6, 7, or 8 ring atoms, and wherein substitutions on the ring may join to form additional rings.

4. The catalyst compound of claim 1, wherein J is represented by the formula:

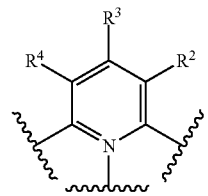

wherein each of $R^2$, $R^3$, and $R^4$ is independently selected from the group consisting of hydrogen, $C_1$-$C_{40}$ hydrocarbyl, substituted $C_1$-$C_{40}$ hydrocarbyl, a heteroatom, and heteroatom-containing group, or one or more of $R^2$ and $R^3$ or $R^3$ and $R^4$ may be joined to form one or more hydrocarbyl rings, substituted hydrocarbyl rings, heterocyclic rings, or substituted heterocyclic rings each having 5, 6, 7, or 8 ring atoms, and where substitutions on the ring may join to form additional rings.

5. The catalyst compound of claim 1, wherein J and $E^1$ are joined to form a ring represented by the formula:

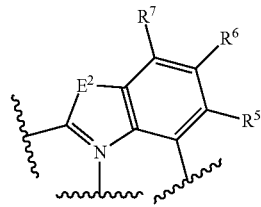

wherein $E^2$ is selected from O, S, $N(R^{10})$, wherein each of $R^5$, $R^6$, $R^7$, and $R^{10}$ is independently selected from the group consisting of hydrogen, $C_1$-$C_{40}$ hydrocarbyl, substituted $C_1$-$C_{40}$ hydrocarbyl, a heteroatom, heteroatom-containing group, and substituted heteroatom-containing group, or one or more of $R^5$ and $R^6$ or $R^6$ and $R^7$ may be joined to form one or more hydrocarbyl 5 rings, substituted hydrocarbyl rings, heterocyclic rings, or substituted heterocyclic rings each having 5, 6, 7, or 8 ring atoms, and where substitutions on the ring may join to form additional rings.

6. The catalyst compound of claim 1, wherein J and $E^1$ are joined to form a ring represented by the formula:

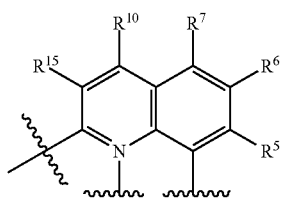

wherein each of $R^5$, $R^6$, $R^7$, $R^{10}$ and $R^{15}$ is independently selected from the group consisting of hydrogen, $C_1$-$C_{40}$ hydrocarbyl, substituted $C_1$-$C_{40}$ hydrocarbyl, a heteroatom, heteroatom-containing group, and substituted heteroatom-containing group, or one or more of $R^5$ and $R^6$ or $R^6$ and $R^7$ or $R^7$ and $R^{10}$ or $R^{10}$ and $R^{15}$ may be joined to form one or more hydrocarbyl rings, substituted hydrocarbyl rings, heterocyclic rings, or substituted heterocyclic rings each having 5, 6, 7, or 8 ring atoms, and where substitutions on the ring may join to form additional rings.

7. The catalyst compound of claim 1, wherein M is a group 4 transition metal and $A^1$ is arylene or substituted arylene.

8. The catalyst compound of claim 1, wherein $A^2$ is represented by the formula:

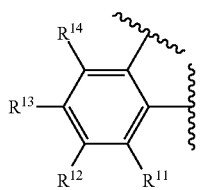

wherein each of $R^{11}$, $R^{12}$, $R^{13}$, and $R^{14}$ is independently selected from the group consisting of hydrogen, $C_1$-$C_{40}$ hydrocarbyl, substituted $C_1$-$C_{40}$ hydrocarbyl, a heteroatom, heteroatom-containing group, and a substituted heteroatom-containing group.

9. The catalyst compound of claim 8, wherein $R^{11}$ is a $C_1$-$C_{20}$ hydrocarbyl or substituted hydrocarbyl, is a tert-butyl, is a di-tert-butylphenyl group, or $R^{11}$ is represented by the formula:

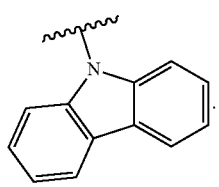 [SMILES: *n1c2ccccc2c2ccccc21]

10. The catalyst compound of claim 5, wherein $E^2$ selected from the group consisting of NH, $C_1$-$C_{20}$ alkyl-N, and $C_4$-$C_{20}$ aryl-N.

11. The catalyst compound of claim 4, wherein each of $R^2$, $R^3$, and $R^4$ is independently selected from the group consisting of hydrogen and $C_1$-$C_{10}$ alkyl.

12. The catalyst compound of claim 1, wherein $R^1$ is a di-tert-butylphenyl group.

13. The catalyst compound of claim 1, wherein $E^1$ is $C(R^8)(R^9)$ with $R^8$ being hydrogen and $R^9$ being a tert-butylphenyl group, or $E^1$ is $CH_2$.

14. The catalyst compound of claim 1, wherein the catalyst compound is selected from the group consisting of:

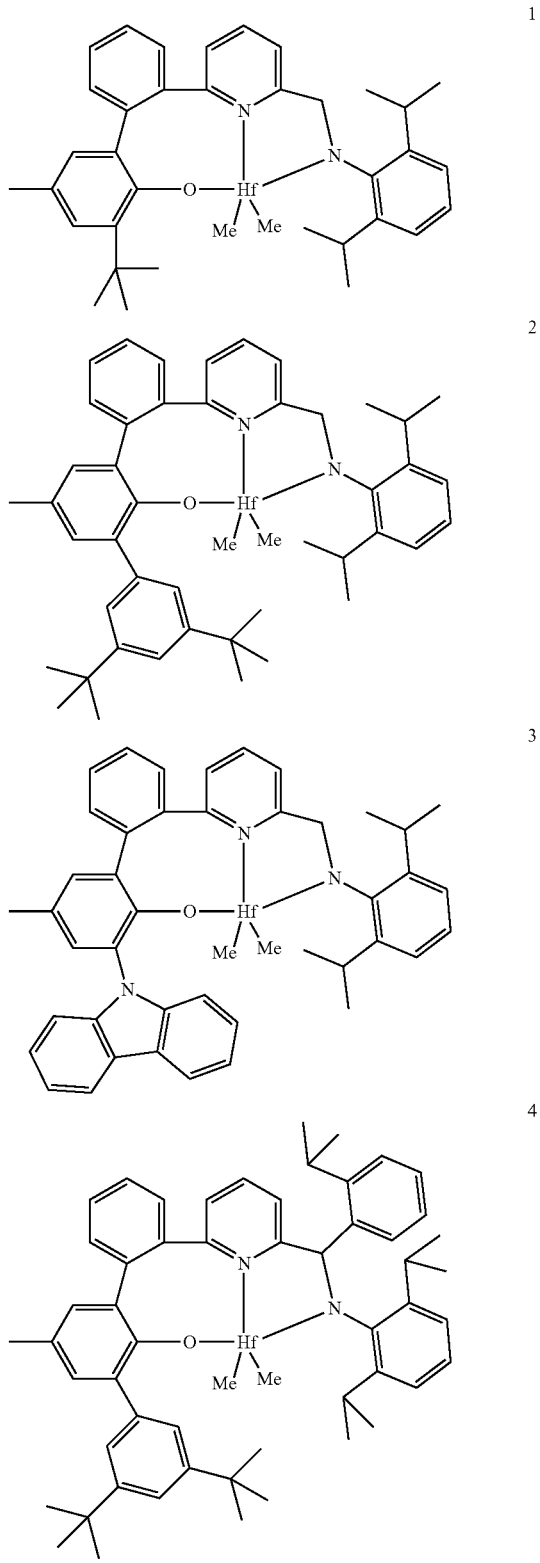

97
-continued
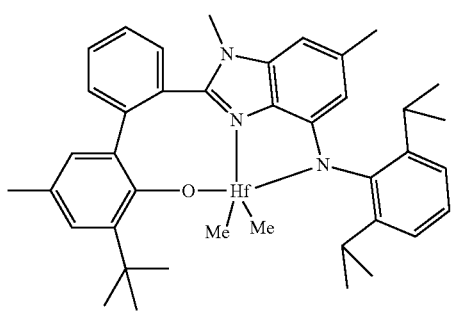
5
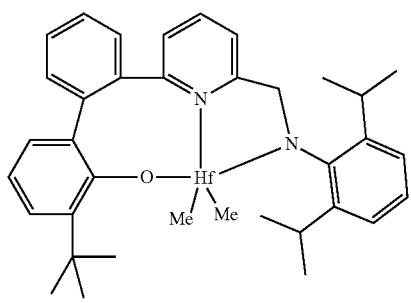
6
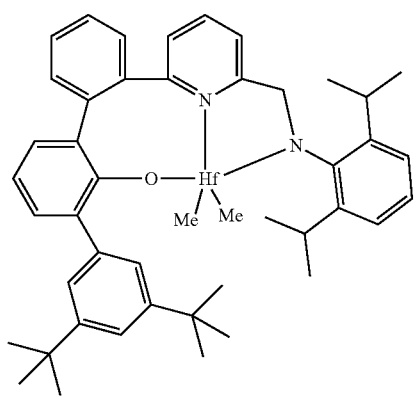
7
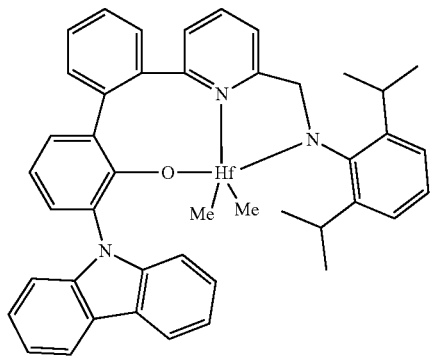
8
98
-continued
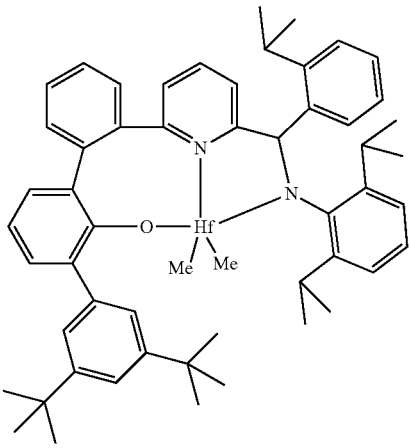
9
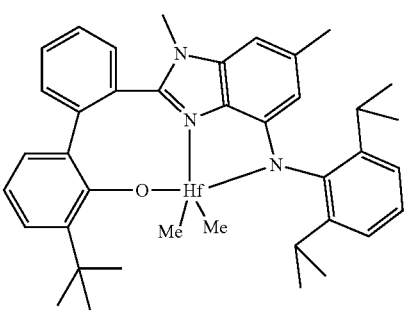
10
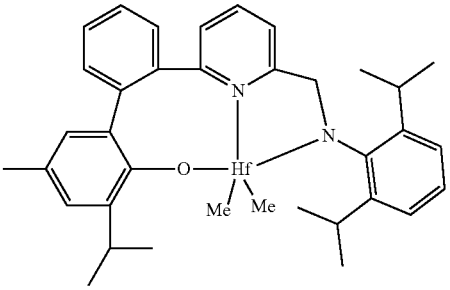
11
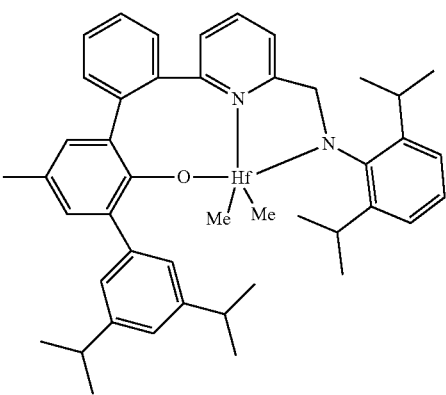
12

13
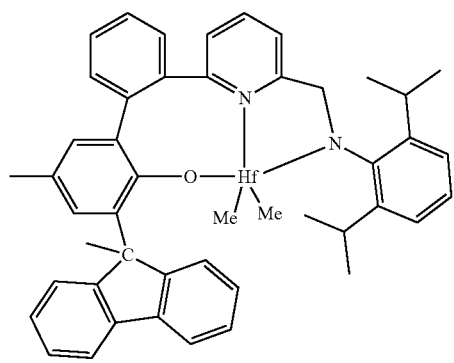
14
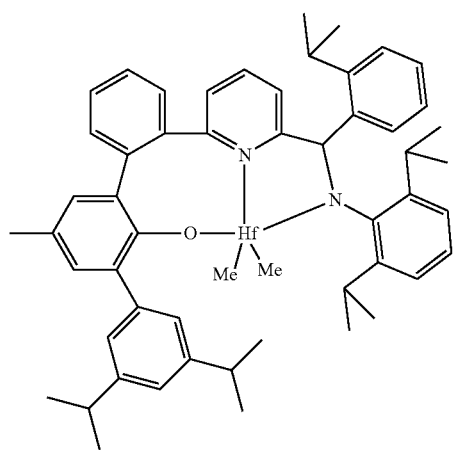
15
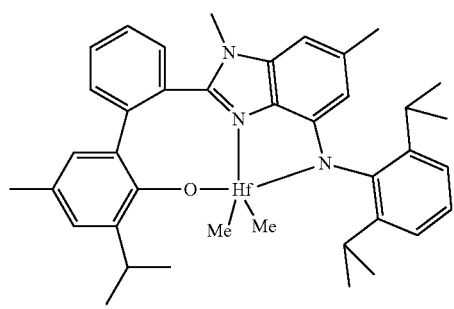
16
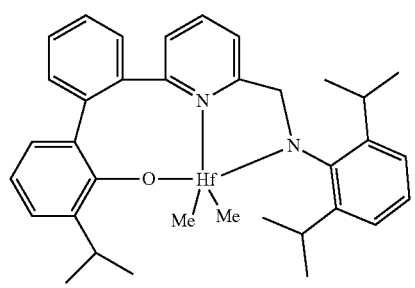
17
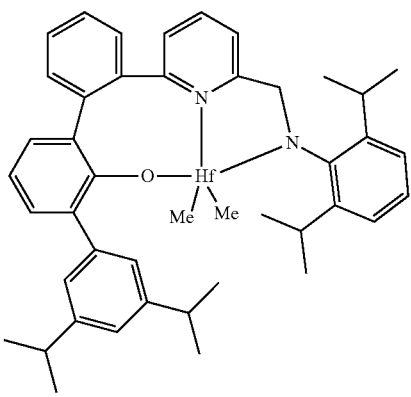
18
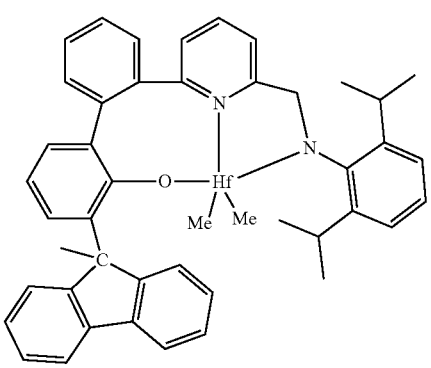
19
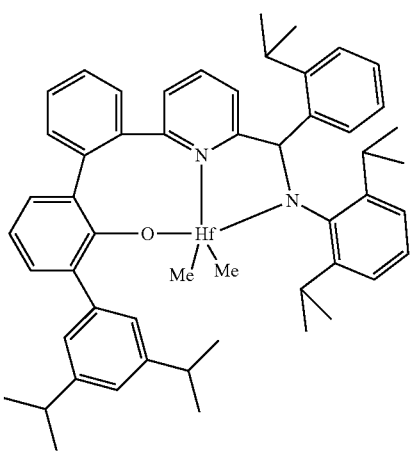
20
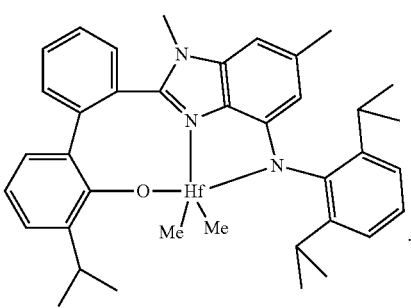

15. The catalyst compound of claim 1, wherein the catalyst compound is:

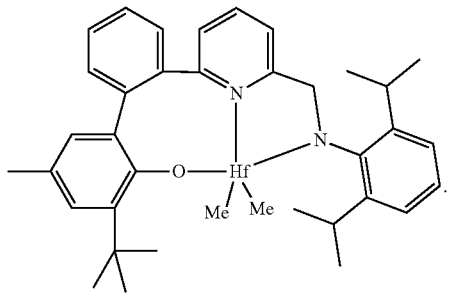

16. A catalyst system comprising an activator and the catalyst compound of claim 1.

17. The catalyst system of claim 16, wherein the activator is represented by the formula:

$(Z^{d+})(A^{d-})$ wherein Z is (L-H) or a reducible Lewis Acid, L is a Lewis base; H is hydrogen; $(L-H)^{d+}$ is a Bronsted acid; $A^{d-}$ is a non-coordinating anion having the charge d−; and d is an integer from 1 to 3, or wherein $A^{d-}$ is a non-coordinating anion having the charge d−; d is an integer from 1 to 3, and Z is a reducible Lewis acid represented by the formula: $(Ar_3C)$, where Ar is aryl or aryl substituted with a heteroatom, a $C_1$ to $C_{40}$ hydrocarbyl, or a substituted $C_1$ to $C_{40}$ hydrocarbyl.

18. The catalyst system of claim 16, wherein the activator is represented by the Formula (AI):

$[R^1R^2R^3EH]_d^+[M^{k+}Q_n]^{d-}$ (AI)

wherein:
E is nitrogen or phosphorous;
d is 1, 2 or 3; k is 1, 2, or 3; n is 1, 2, 3, 4, 5, or 6; n−k=d;
each of $R^1$, $R^2$, and $R^3$ is independently hydrogen, a $C_1$-$C_{40}$ alkyl, or a $C_5$-$C_{50}$-aryl, wherein each of $R^1$, $R^2$, and $R^3$ is independently unsubstituted or substituted; wherein $R^1$, $R^2$, and $R^3$ together comprise 15 or more carbon atoms;
M is an element selected from group 13 of the Periodic Table of the Elements; and
each Q is independently selected from the group consisting of hydrogen, bridged or unbridged dialkylamido, halide, alkoxy, substituted alkoxy, aryloxy, substituted aryloxy, hydrocarbyl, substituted hydrocarbyl, halocarbyl, substituted halocarbyl, and halo-substituted-hydrocarbyl radical.

19. The catalyst system of claim 16, further comprising a metal hydrocarbenyl chain transfer agent represented by the formula:

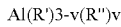

Al(R')3-v(R")v wherein each R' independently is a $C_1$-$C_{30}$ hydrocarbyl group; each R", independently, is a $C_4$-$C_{20}$ hydrocarbenyl group having an end-vinyl group; and v is from 0.1 to 3.

20. The catalyst system of claim 16, wherein the activator comprises an alumoxane at a molar ratio of aluminum to catalyst compound transition metal of 100:1 or more.

21. A process for the production of a polymer comprising:
polymerizing an alkene by contacting the alkene with a catalyst system that includes an activator and catalyst compound, wherein the catalyst compound is represented by Formula (I):

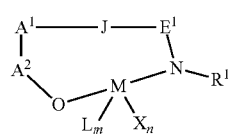

(I)

wherein:
M is a group 3, 4, 5, or 6 metal;
each of $A^1$ and $A^2$ is independently selected from the group consisting of arylene, substituted arylene, heteroarylene group, and substituted heteroarylene group;
J comprises a heterocyclic Lewis base;
$E^1$ is selected from the group consisting of hydrocarbylene, substituted hydrocarbylene, silylene, and substituted silylene, wherein J and $E^1$ are optionally joined to form one or more hydrocarbyl rings, substituted hydrocarbyl rings, heterocyclic rings, or substituted heterocyclic rings;
each L is independently a Lewis base;
each X is independently an anionic ligand;
n is 1, 2 or 3;
m is 0, 1, or 2;
n+m is not greater than 4;
$R^1$ is selected from the group consisting of $C_1$-$C_{40}$ hydrocarbyl, substituted $C_1$-$C_{40}$ hydrocarbyl, a heteroatom-containing group, and substituted heteroatom-containing group;
any two L groups may be joined together to form a bidentate Lewis base;
an X group may be joined to an L group to form a monoanionic bidentate group; and
any two X groups may be joined together to form a dianionic ligand group; and
wherein the polymerizing is performed in one or more continuous stirred tank reactors or loop reactors, in series or in parallel, at a reactor pressure of from 0.05 MPa to 1,500 MPa and a reactor temperature of from 30° C. to 230° C.

22. The process of claim 21, wherein the polymer is homopolyethylene and the alkene is ethylene, wherein the homopolyethylene has a Mw value of from 155,000 g/mol to 1,200,000 g/mol, Mn value of from 90,000 to 550,000, Mz value of from 350,000 to 4,000,000, and a PDI of from 1.5 to 3.

23. The process of claim 22, wherein:
a melting temperature of the polymer is between about 135° C. and 138° C., and
the catalyst compound is represented by the formula:

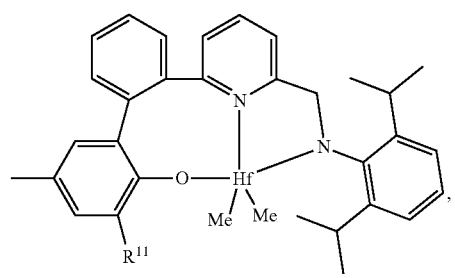

wherein $R^{11}$ is selected from the group consisting of hydrogen, $C_1$-$C_{40}$ hydrocarbyl, substituted $C_1$-$C_{40}$ hydrocarbyl, a heteroatom, and a heteroatom-containing group.

24. The process of claim 21, wherein:
a melting temperature of the polymer is between about 135° C. and 138° C., and the catalyst compound is:

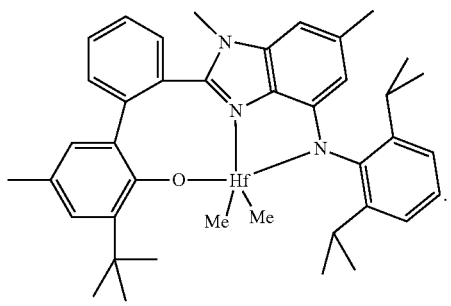

25. The process of claim 21, wherein:
the polymer is an ethylene-octene copolymer,
the ethylene-octene copolymer has a $M_w$ value of from 100,000 to 3,600,000, $M_n$ value of from 50,000 to 2,250,000, At value of from 225,000 to 6,200,000, and a PDI of from 1.5 to 3.

26. The process of claim 25, wherein:
a melting temperature of the polymer is from 104° C. to 126° C., and
the catalyst compound is represented by the formula:

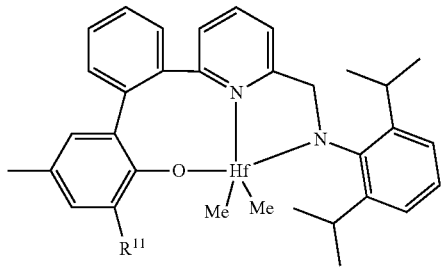

wherein $R^{11}$ is selected from the group consisting of hydrogen, $C_1$-$C_{40}$ hydrocarbyl, substituted $C_1$-$C_{40}$ hydrocarbyl, a heteroatom, and a heteroatom-containing group.

27. The process of claim 26, wherein:
$R^{11}$ is tert-butyl, and
the melting temperature of the polymer is from 121° C. to 126° C.

28. The process of claim 21, wherein:
the alkene is propylene,
the polymer is homopolypropylene, and
the homopolypropylene has:
a $M_w$ value of from 85,000 g/mol to 750,000 g/mol,
$M_n$ value of from 55,000 g/mol to 400,000 g/mol,
$M_z$ value of from 165,000 g/mol to 1,600,000 g/mol, and
a PDI of from 1.6 to 2.1.

29. The process of claim 28, wherein:
the reactor temperature is between about 60° C. and 80° C.,
a melting temperature of the polymer is from 146° C. to 147° C., and
the catalyst compound is:

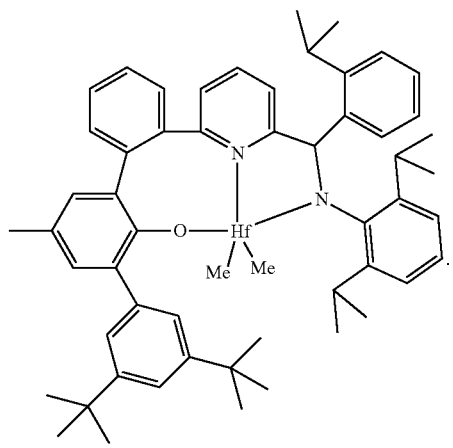

* * * * *